US008849792B2

(12) United States Patent
Obayashi et al.

(10) Patent No.: US 8,849,792 B2
(45) Date of Patent: Sep. 30, 2014

(54) INFORMATION MANAGEMENT METHOD AND INFORMATION MANAGEMENT APPARATUS

(75) Inventors: Toshifumi Obayashi, Toyota (JP); Mio Okunishi, Gifu (JP); Kyohei Tamai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 94 days.

(21) Appl. No.: 13/562,672

(22) Filed: Jul. 31, 2012

(65) Prior Publication Data

US 2013/0073550 A1 Mar. 21, 2013

(30) Foreign Application Priority Data

Sep. 15, 2011 (JP) ................. 2011-202443

(51) Int. Cl.
*G06F 17/30* (2006.01)
*H04W 4/02* (2009.01)
*H04W 4/20* (2009.01)

(52) U.S. Cl.
CPC ...... *G06F 17/3097* (2013.01); *G06F 17/30321* (2013.01); *G06F 17/30241* (2013.01); *G06F 17/30333* (2013.01); *H04W 4/02* (2013.01); *H04W 4/20* (2013.01)
USPC .......................................... 707/715; 707/741

(58) Field of Classification Search
None
See application file for complete search history.

(56) References Cited

U.S. PATENT DOCUMENTS

| 2005/0251325 | A1 | 11/2005 | Kudo et al. | |
| 2005/0280557 | A1* | 12/2005 | Jha et al. ...................... | 340/988 |
| 2006/0145839 | A1* | 7/2006 | Sandage .................. | 340/539.17 |
| 2008/0162519 | A1 | 7/2008 | Hsieh | |
| 2009/0307263 | A1* | 12/2009 | Skibiski et al. ........... | 707/103 R |

FOREIGN PATENT DOCUMENTS

| JP | 2001-175662 | 6/2001 |
| JP | 2009-008684 | 1/2009 |
| WO | WO 2012171128 A1 * | 12/2012 |

OTHER PUBLICATIONS

Anonymous: "Indexes", 8 Jun. 2011, pp. 1-4, XP055061356, retrieved from the Internet: URL:http://web.archive.org/web/20110608010323/http://www.mong.odb.org/display/Docs/Indexes.
Anonymous: "Geospatial Indexing", May 29, 2011, pp. 1-4, XP055061355, retrieved from the Internet: URL:http://web.archive.org/web/20110529114948/http://www.mongodb.org/display/Docs/Geospatial+Indexing.
Extended European Search Report issued Sep. 25, 2013 in European Patent Application No. 12178034.0-1951/2570942.

* cited by examiner

*Primary Examiner* — William Spieler
(74) *Attorney, Agent, or Firm* — Staas & Halsey LLP

(57) ABSTRACT

An information management method to be executed by a computer, the information management method includes; accepting a registration request that includes identification information of a mobile device, and position information of the mobile device that includes latitude and longitude; generating a value that includes the identification information followed by information that indicates a date and time when the registration request is accepted; storing the position information in a first storage unit in a manner correlated with the value; generating another value that includes the information that indicates the date and time followed by the identification information; storing the position information in a second storage unit in a manner correlated with the other value; storing the position information in a third storage unit in a manner correlated with the identification information; and storing the identification information in a fourth storage unit in a manner correlated with the position information.

6 Claims, 68 Drawing Sheets

FIG. 6

| POSITION AND SIZE OF FIRST RECTANGULAR REGION |
|---|
| POSITION AND SIZE OF SECOND RECTANGULAR REGION |
| ⋮ |
| POSITION AND SIZE OF n'TH RECTANGULAR REGION |

FIG. 8

| KEY (ID TIME KEY) | VALUE 131 | |
|---|---|---|
| id1234 9223370724422077825 | ATTRIBUTE INFORMATION | POSITION INFORMATION |
| MOBILE DEVICE ID / DATE AND TIME | | |

ATTRIBUTE INFORMATION:

| ITEM | VALUE | REGISTRATION DATE AND TIME |
|---|---|---|
| ATTRIBUTE INFORMATION | ... | ... |

POSITION INFORMATION:

| ITEM | VALUE | REGISTRATION DATE AND TIME |
|---|---|---|
| REPRESENTATIVE POSITION DATE AND TIME | 139.1234,35.5678 | ... |
| SIZE INFORMATION | ... | ... |

FIG. 10

| KEY (ID TIME KEY) | VALUE | | | | | | |
|---|---|---|---|---|---|---|---|
| 9223370724422077825:id1234 | ATTRIBUTE INFORMATION | | | POSITION INFORMATION | | | |
| {DATE AND TIME}{MOBILE DEVICE ID} | ITEM | VALUE | REGISTRATION DATE AND TIME | ITEM | VALUE | REGISTRATION DATE AND TIME | |
| | ATTRIBUTE INFORMATION | ... | ... | REPRESENTATIVE POSITION DATE AND TIME | 139.1234,35.5678 | ... | |
| | | | | SIZE INFORMATION | ... | ... | |

| KEY (ID KEY) | VALUE | | | | | | |
|---|---|---|---|---|---|---|---|
| | ATTRIBUTE INFORMATION | | | POSITION INFORMATION | | | |
| | ITEM | VALUE | REGISTRATION DATE AND TIME | ITEM | VALUE | REGISTRATION DATE AND TIME | |
| id1234 | ATTRIBUTE INFORMATION | ... | ... | REPRESENTATIVE POSITION DATE AND TIME | 139.1234, 35.5678 | ... | |
| | | | | SIZE INFORMATION | ... | ... | |

| KEY (POSITION KEY) | VALUE | | |
|---|---|---|---|
| ++10339515263748 | id | ATTRIBUTES | REGISTRATION DATE AND TIME |
| | id1234 | REPRESENTATIVE POSITION SIZE INFORMATION ⋮ | ... |

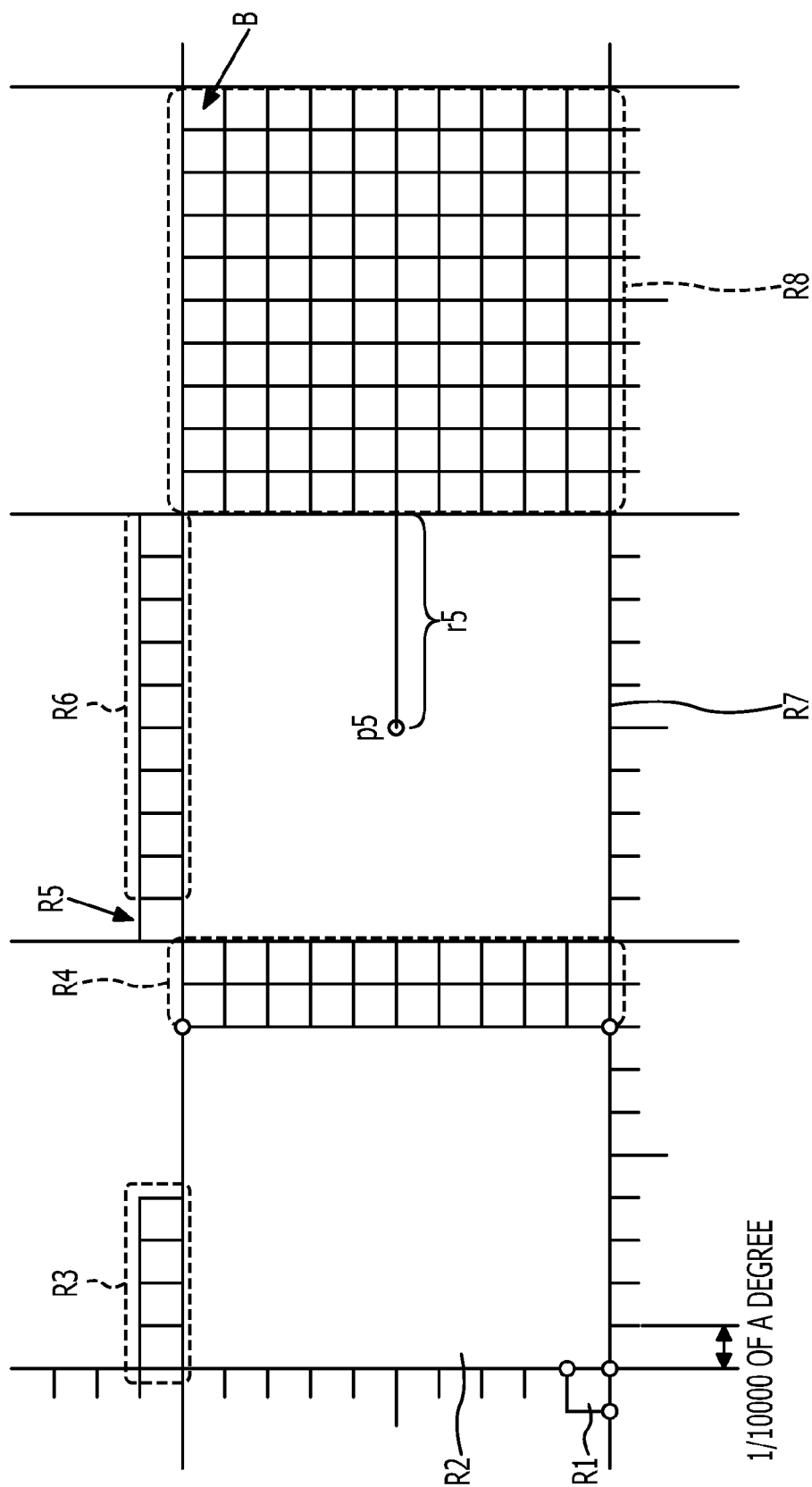

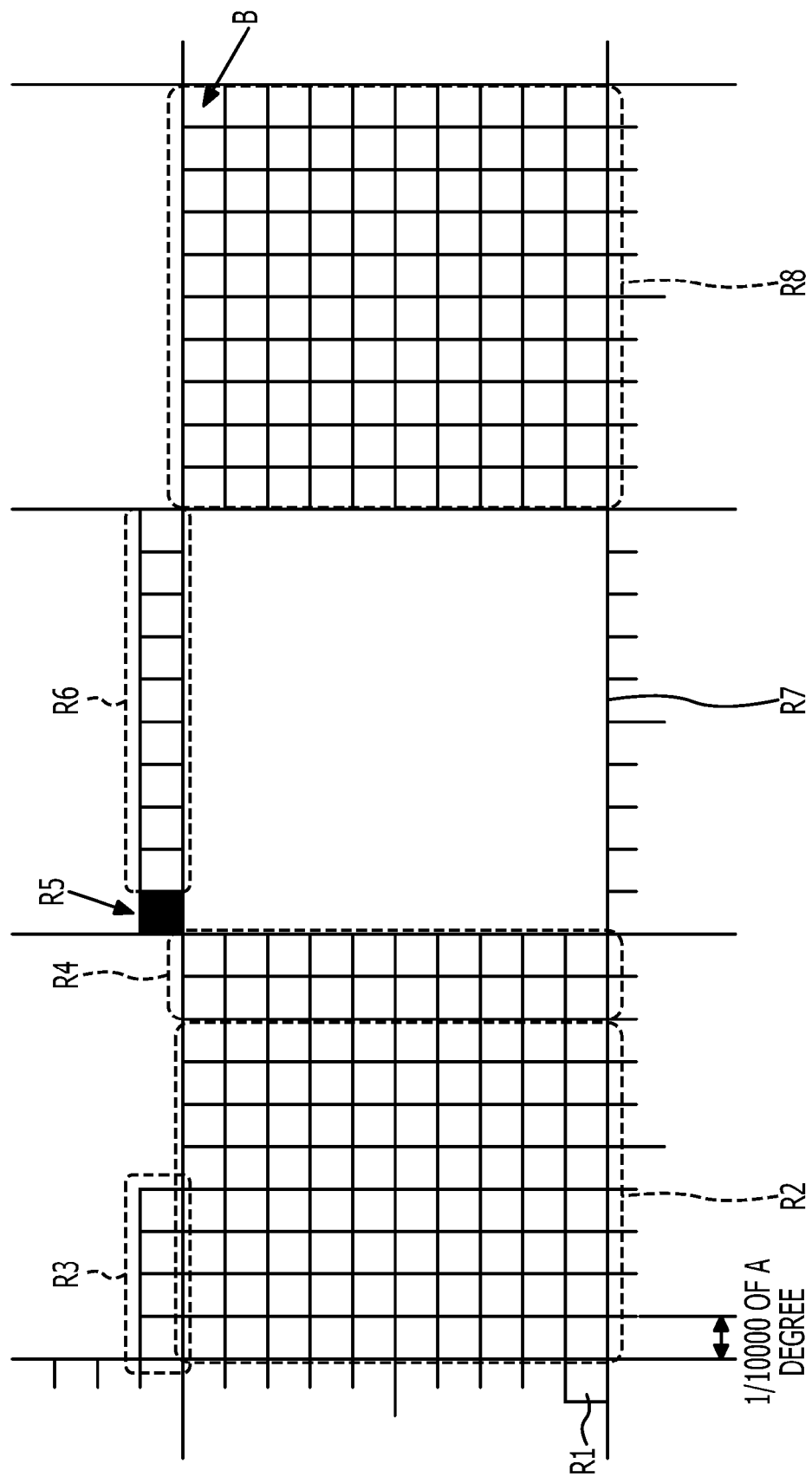

FIG. 35

| MOBILE DEVICE ID | COUNTER | ATTRIBUTE INFORMATION, ETC. |
|---|---|---|
| id2222 | 0 | ... |
|  |  |  |

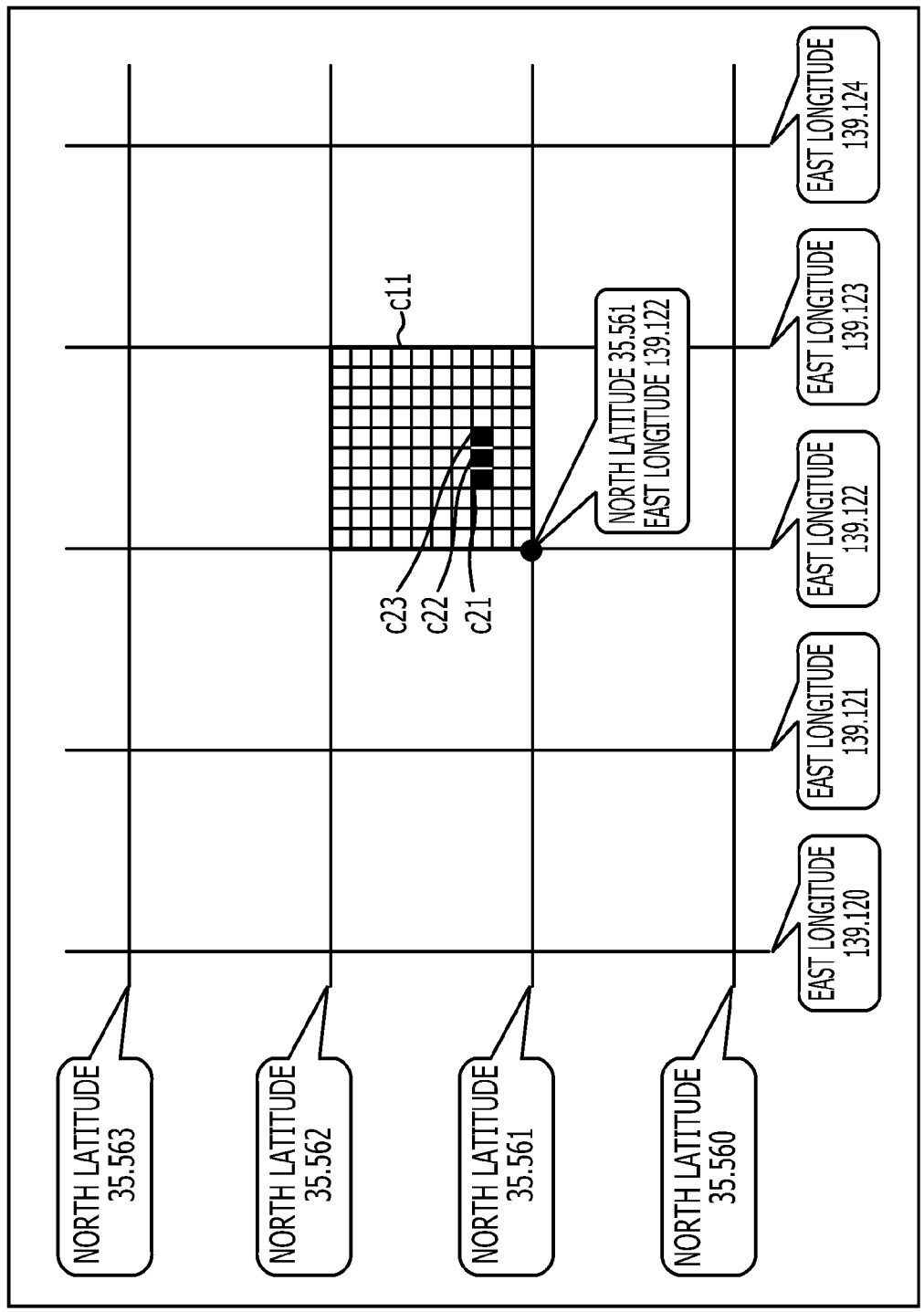

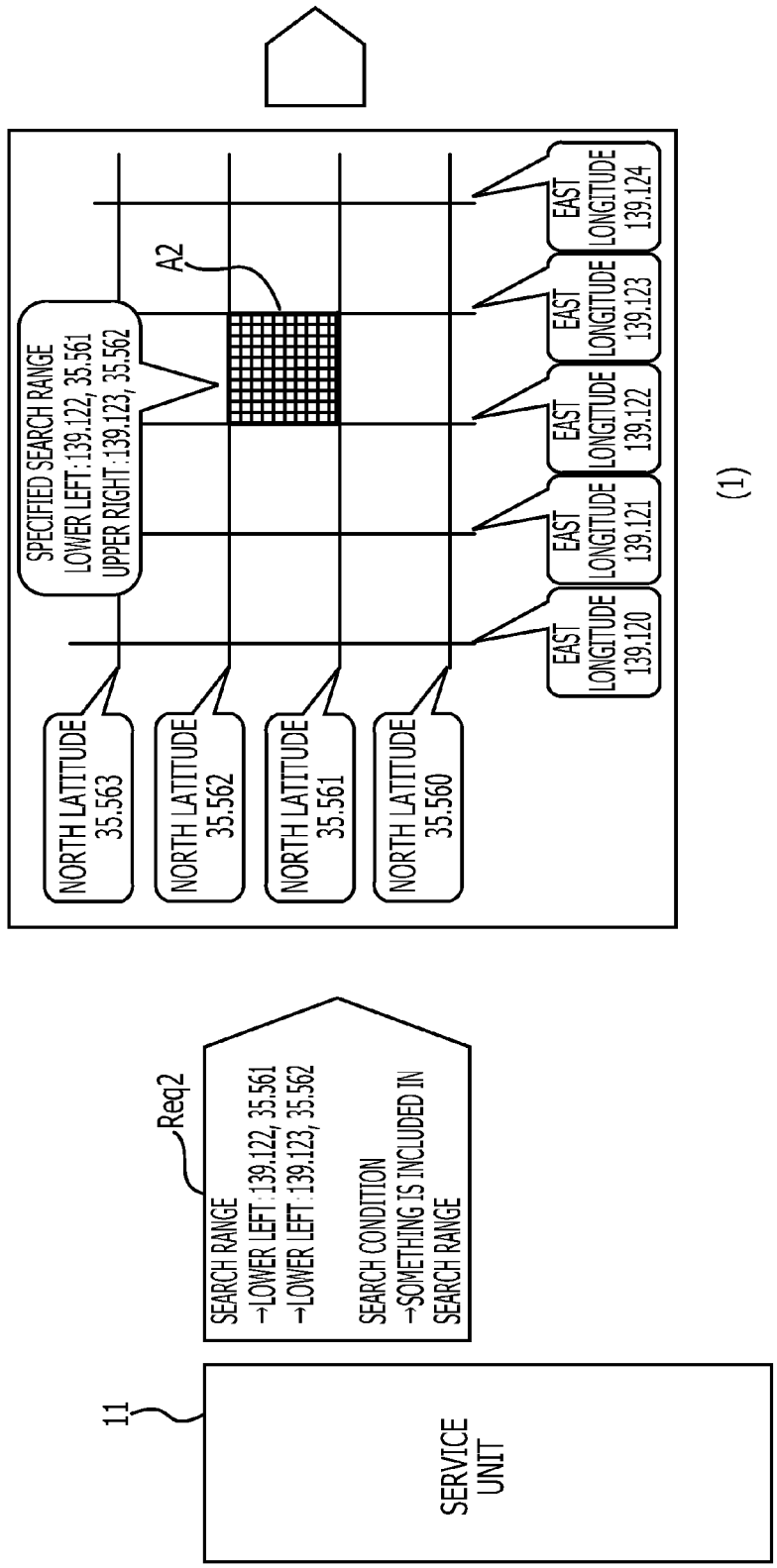

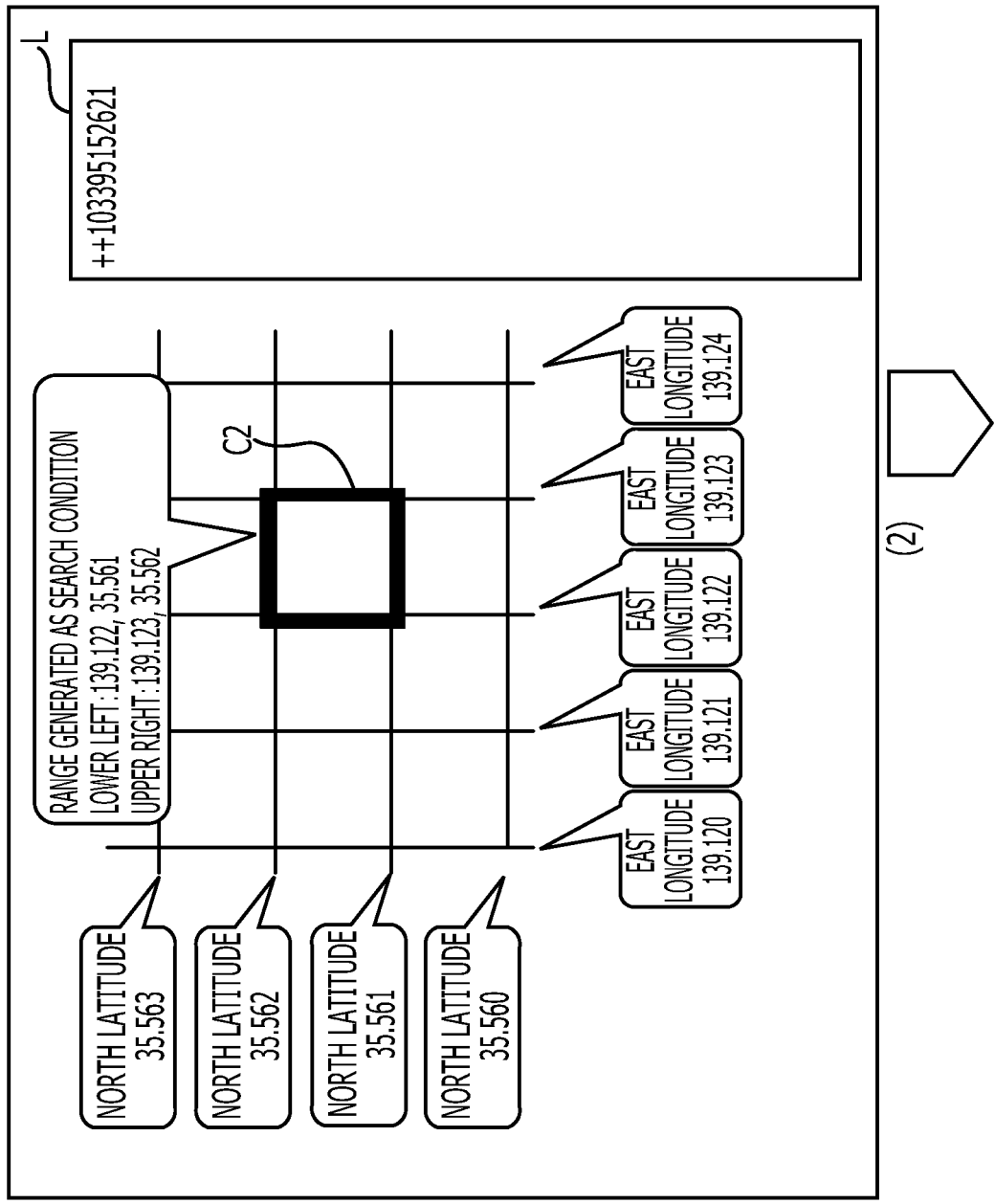

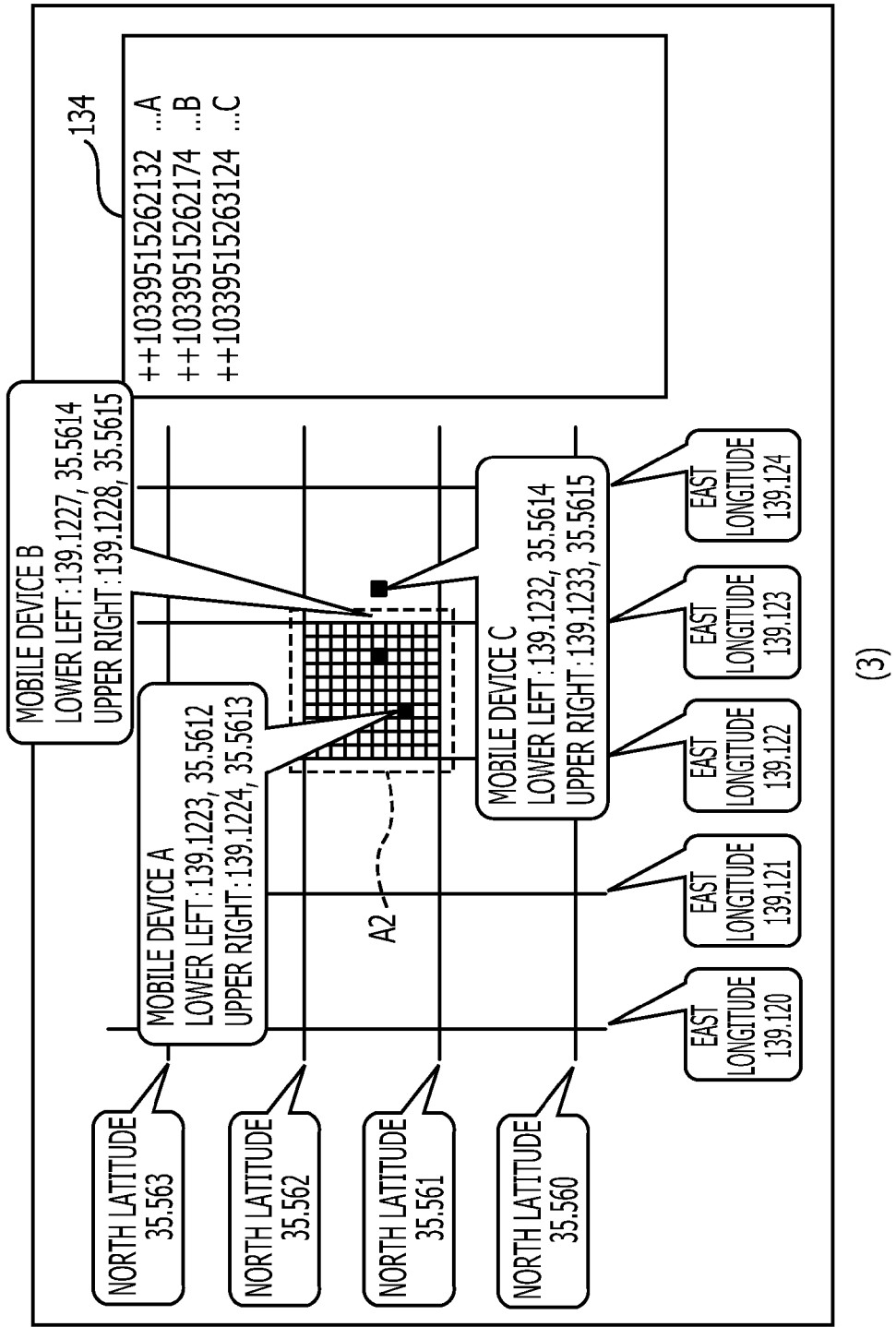

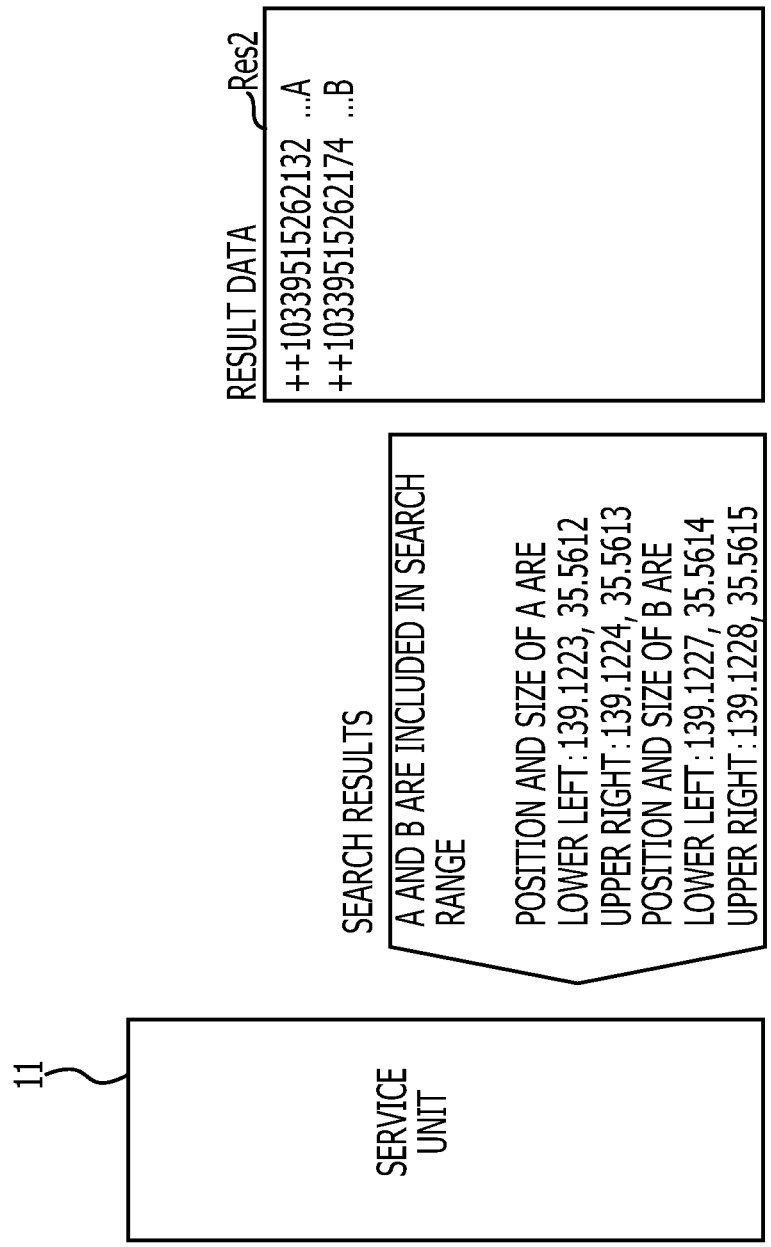

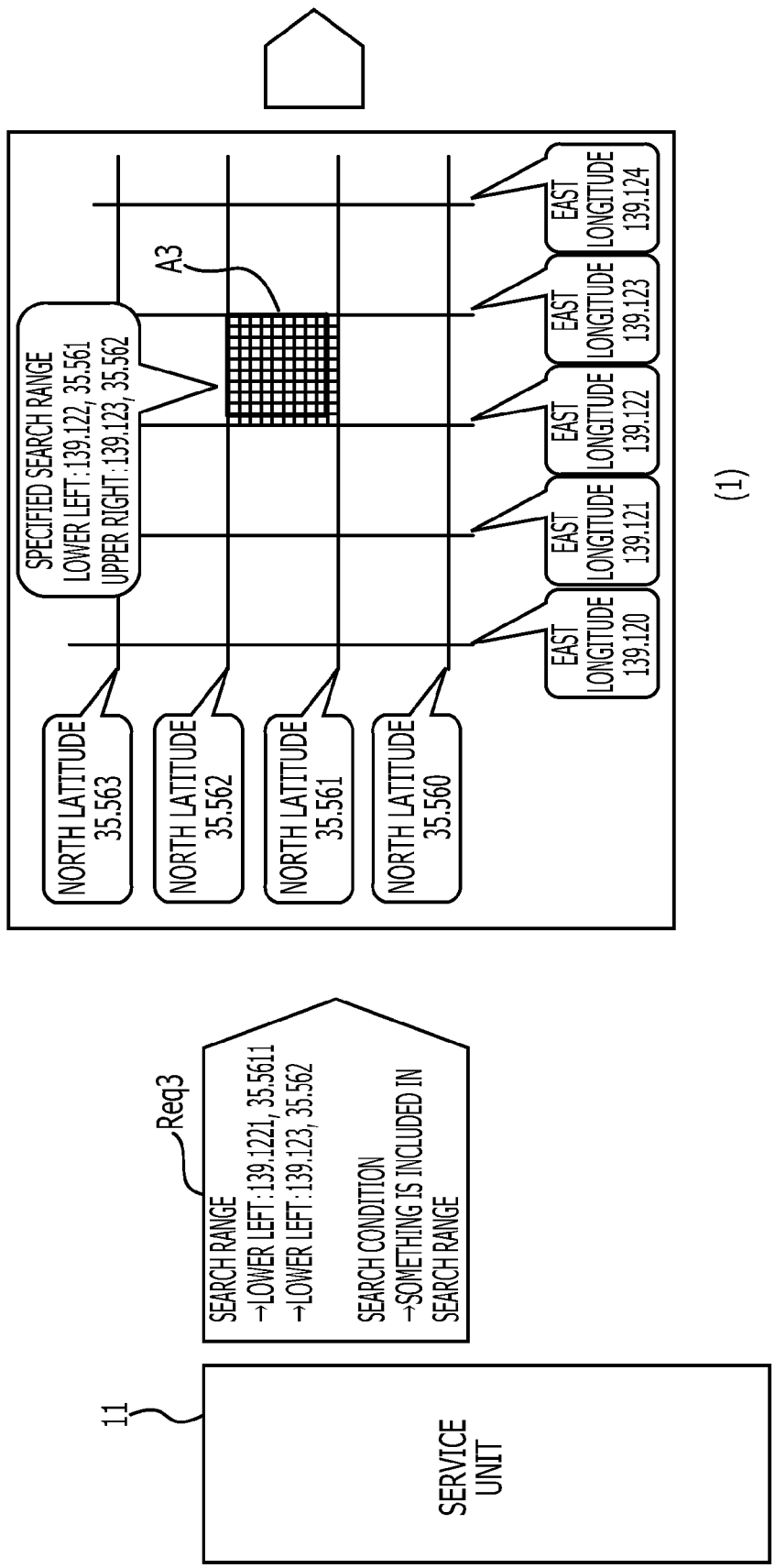

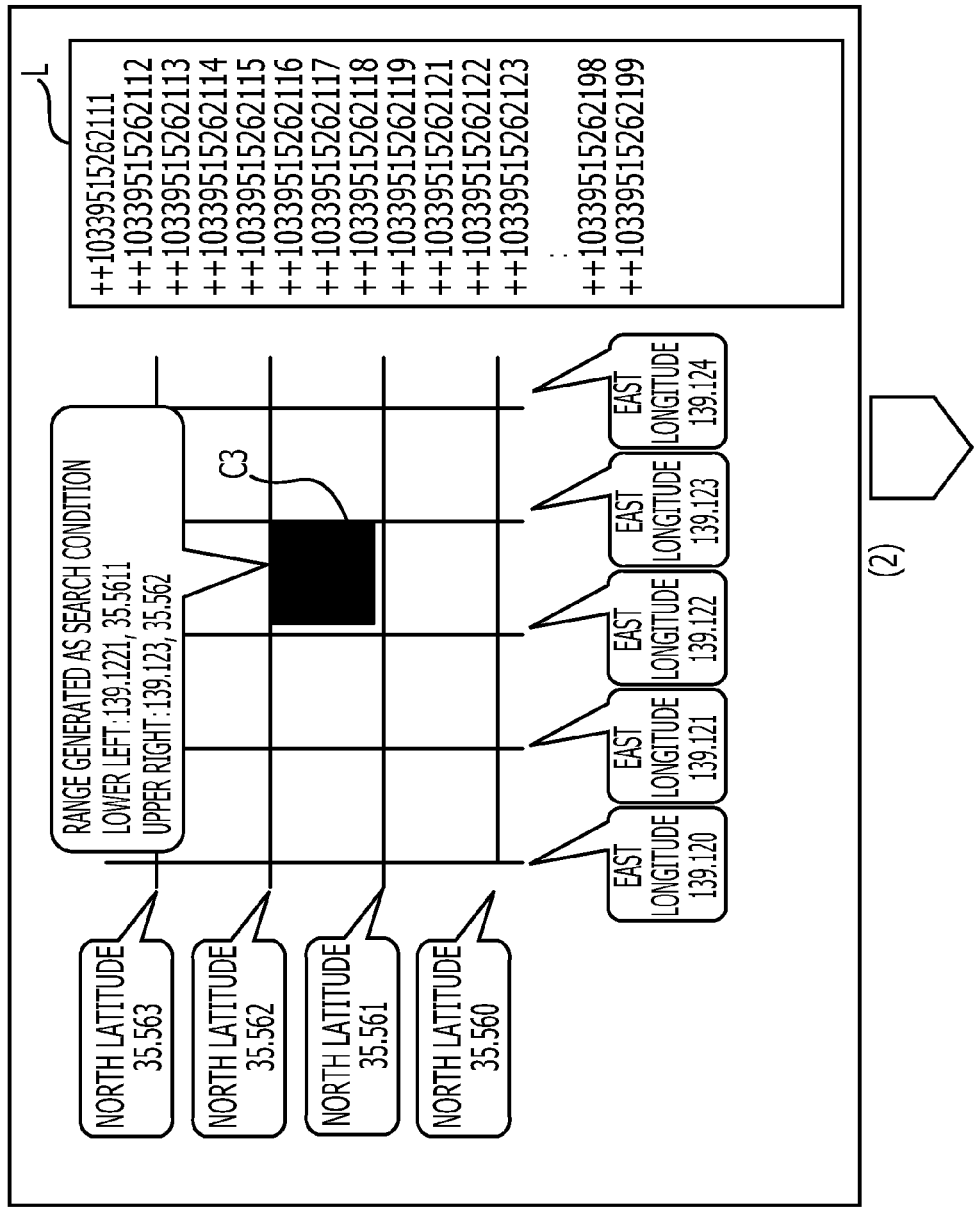

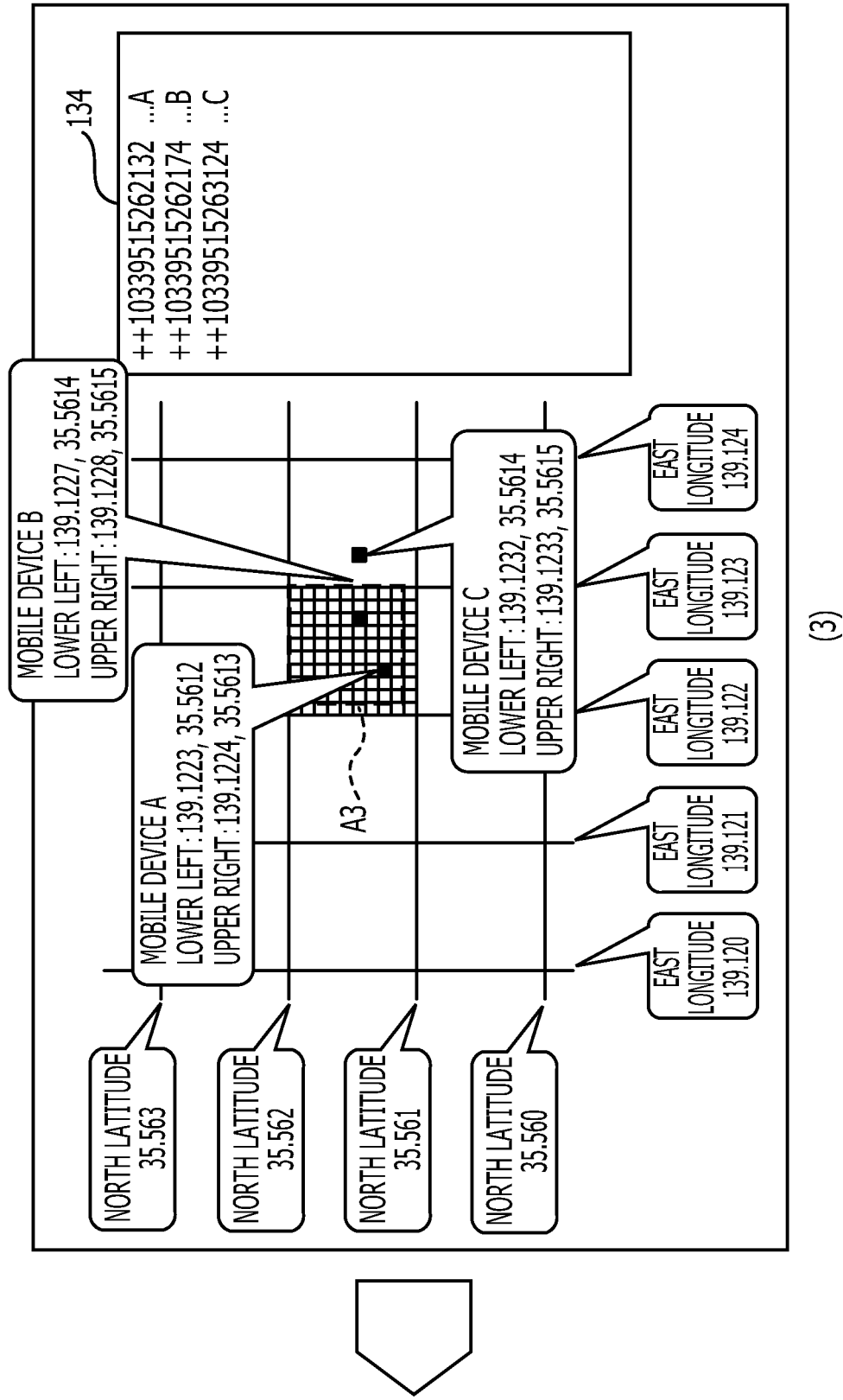

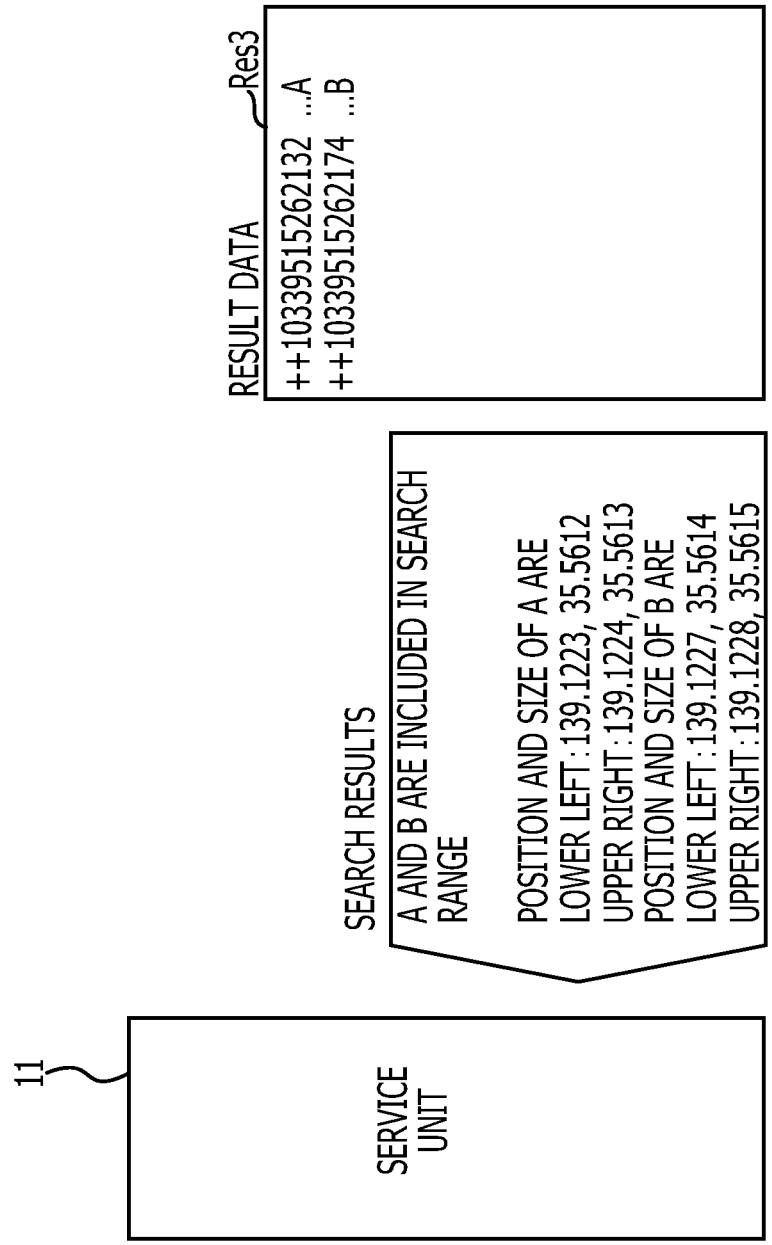

FIG. 40A
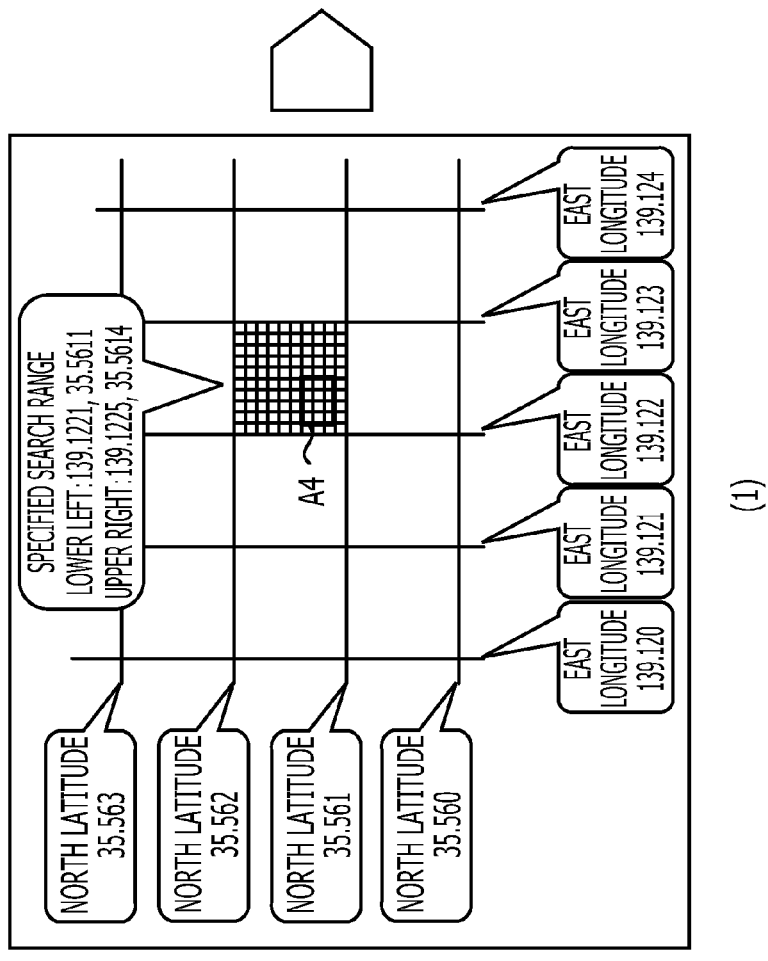
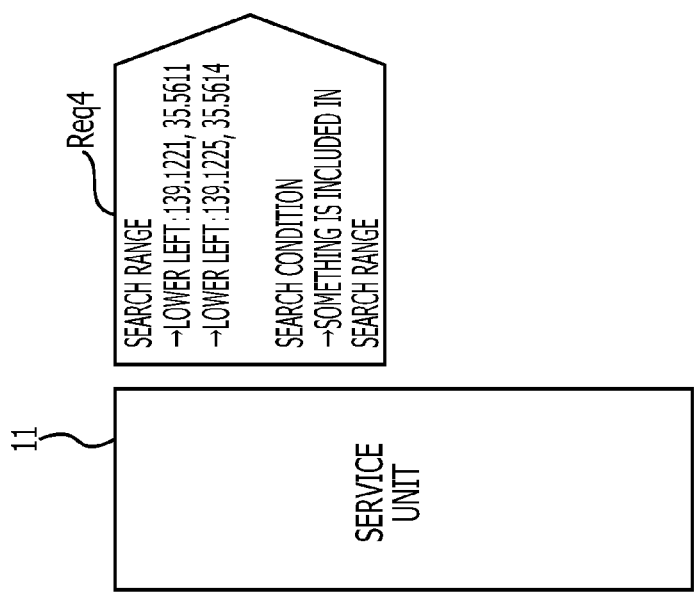

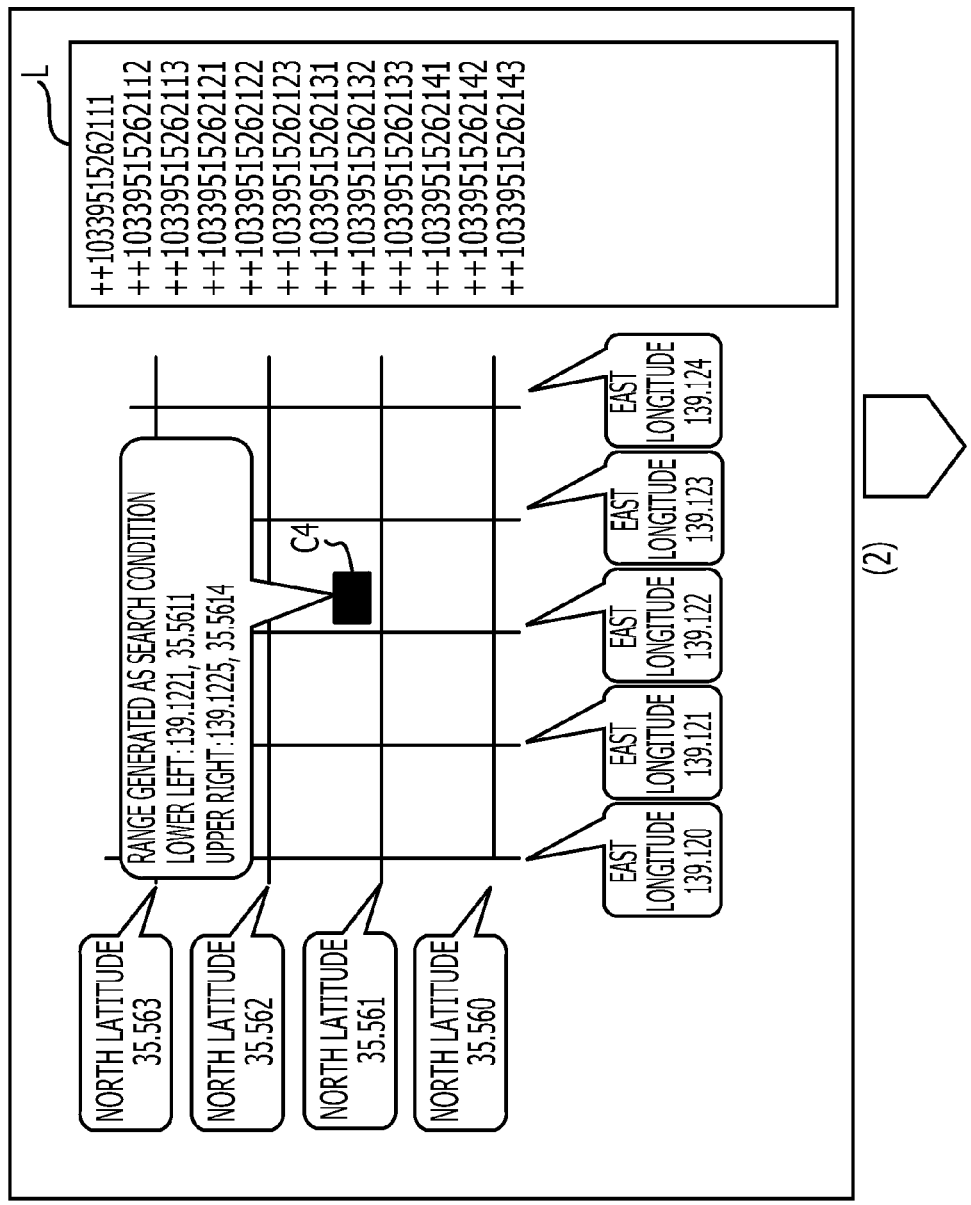

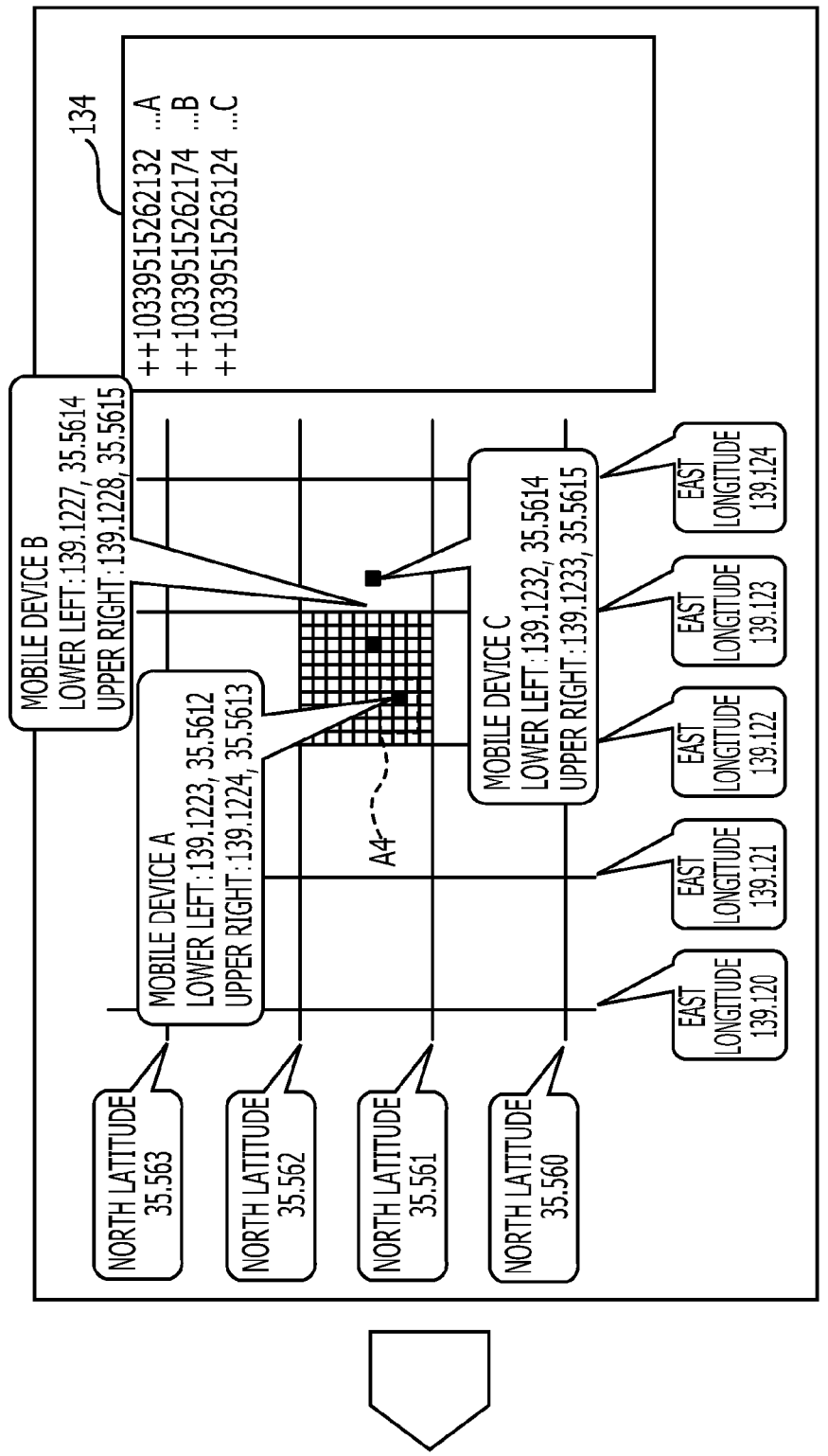

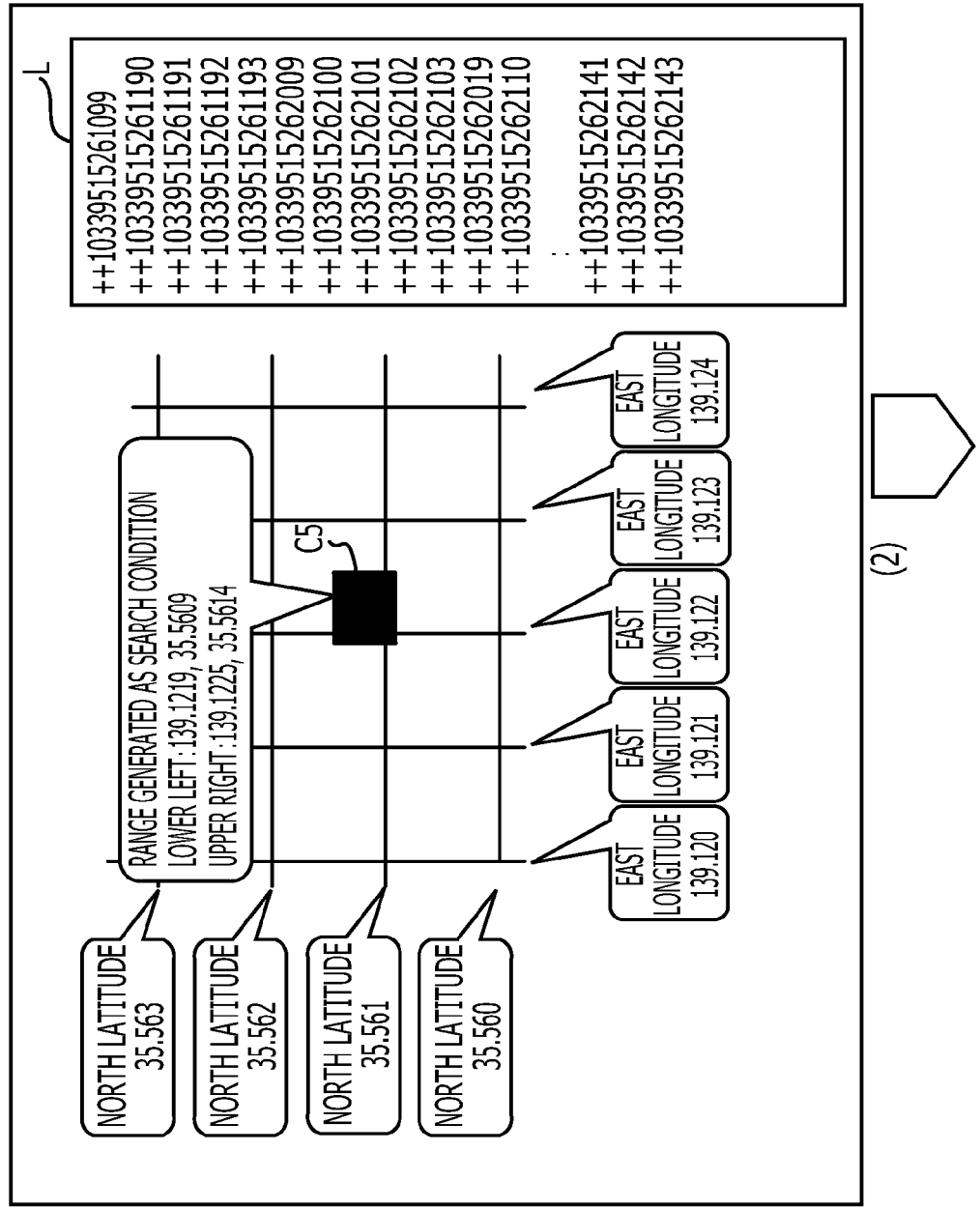

FIG. 41C
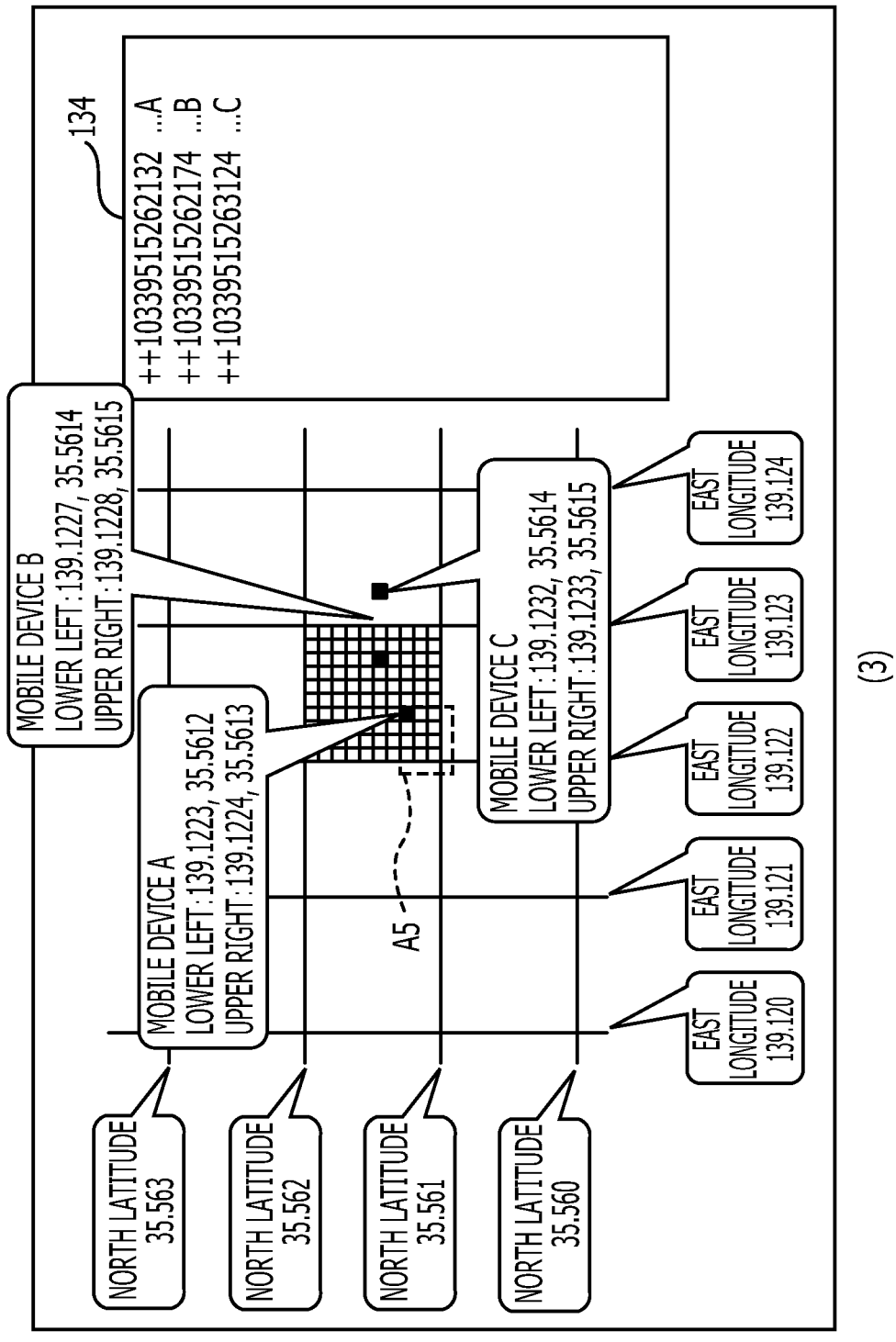
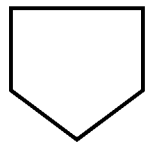

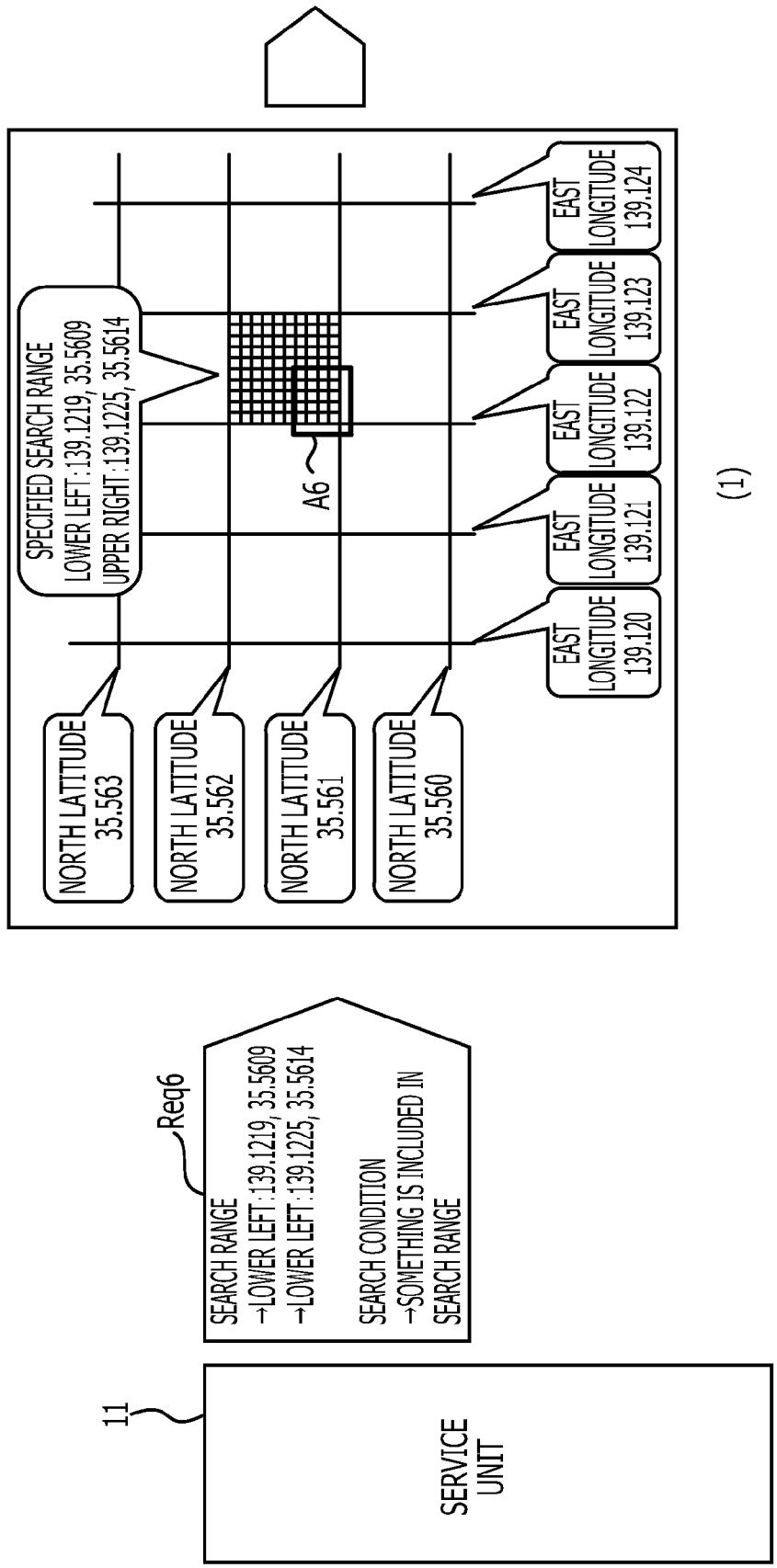

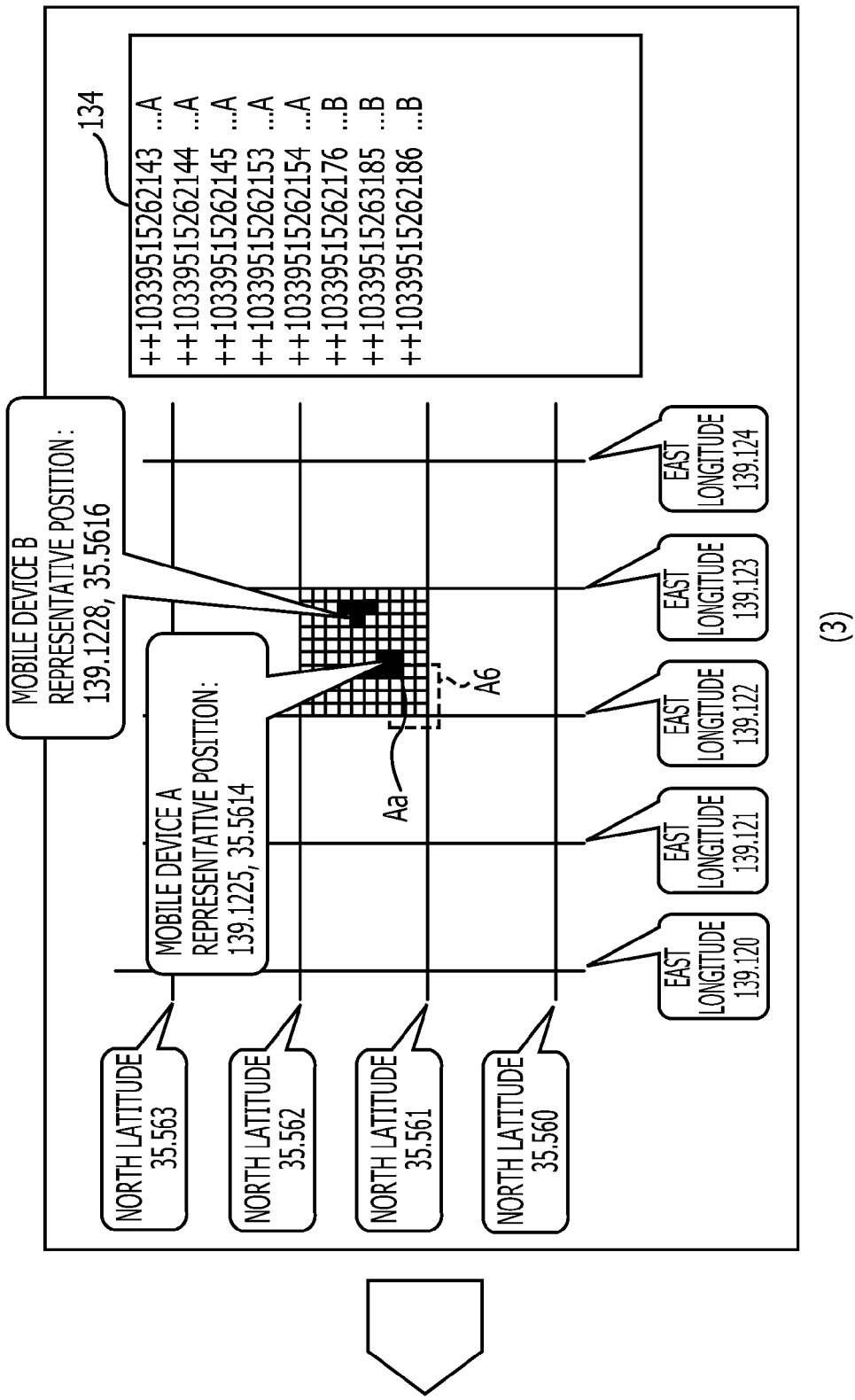

FIG. 43A
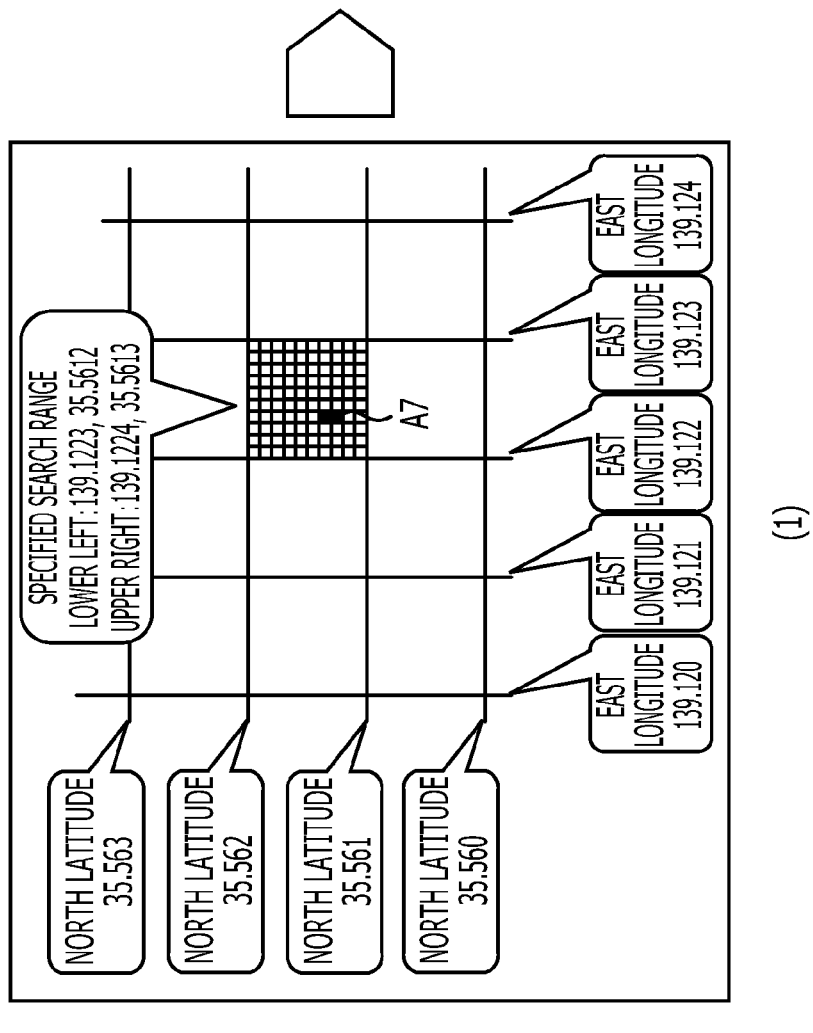
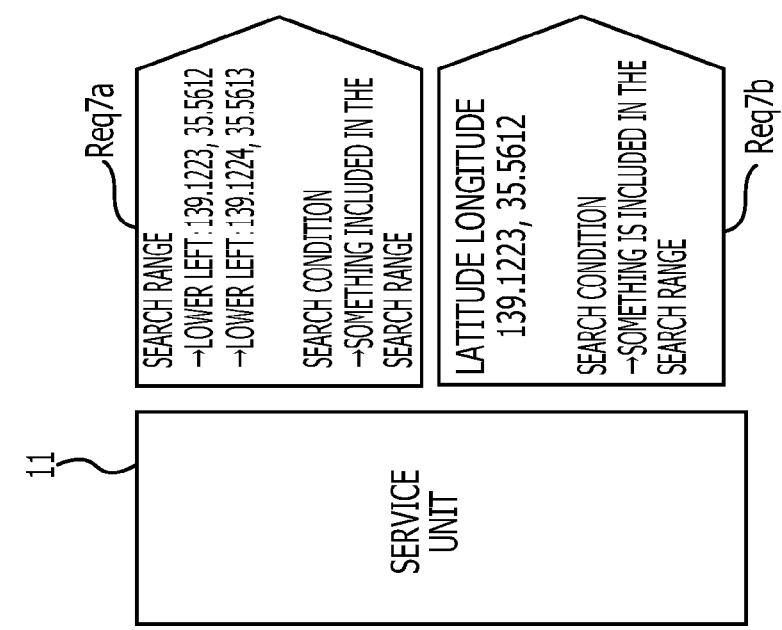

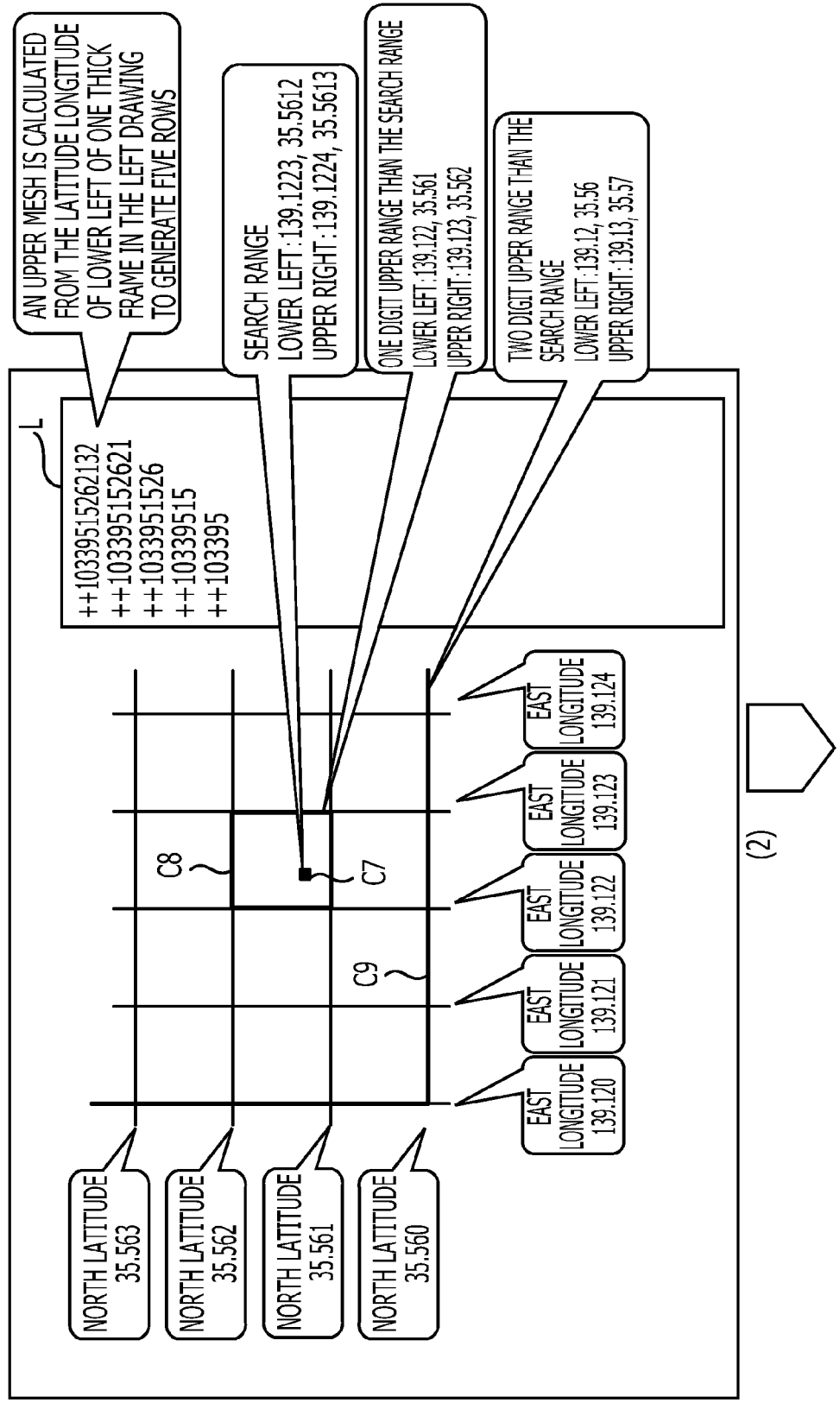

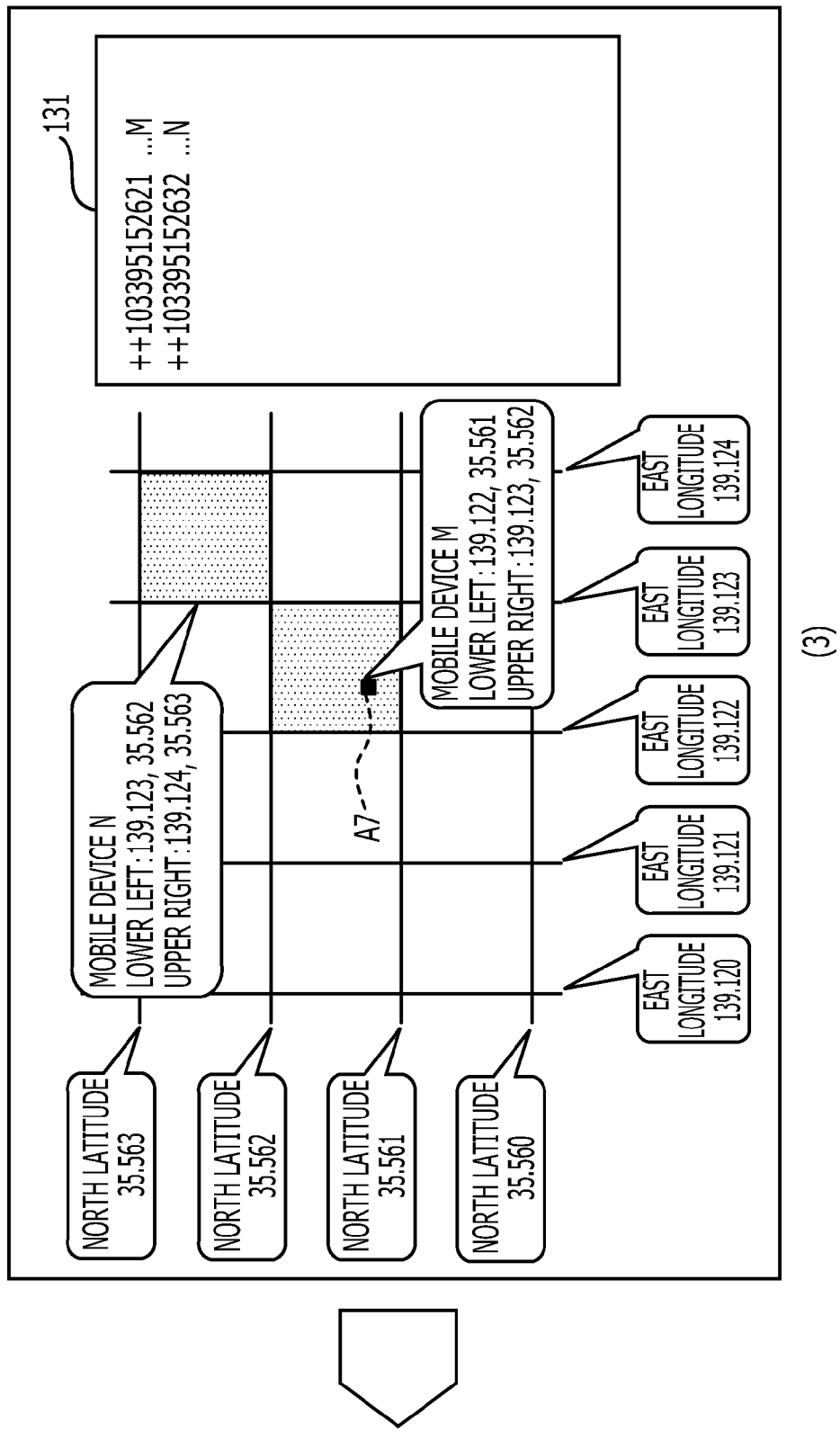

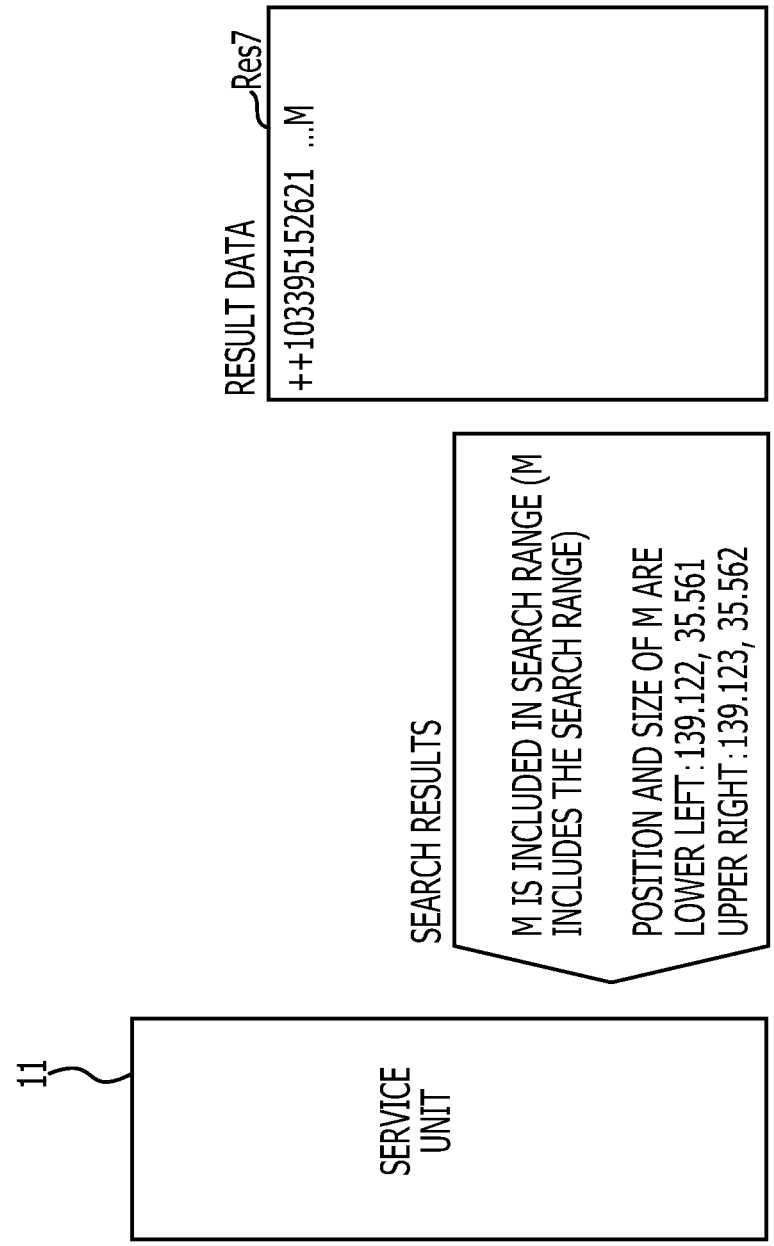

INFORMATION MANAGEMENT METHOD AND INFORMATION MANAGEMENT APPARATUS

CROSS-REFERENCE TO RELATED APPLICATION

This application is based upon and claims the benefit of priority of the prior Japanese Patent Application No. 2011-202443, filed on Sep. 15, 2011, the entire contents of which are incorporated herein by reference.

FIELD

The present disclosure relates to an information management method and an information management apparatus, and specifically relates to an information management method and an information management apparatus regarding mobile devices.

BACKGROUND

The present inventor and others have studied to collect and manage position information and so forth of a plurality of mobile devices and to provide a search service relating to the mobile devices. The mobile devices mentioned here are apparatuses, such as in-vehicle devices, cellular phones, or tablet-type terminals, and are principally mobile terminals having a communication function that takes advantage of a mobile communication network, or devices or persons carrying such a terminal. Examples of related art that takes advantage of position information include techniques disclosed in Japanese Laid-open Patent Publication No. 2001-175662 and Japanese Laid-open Patent Publication No. 2009-8684.

SUMMARY

According to an aspect of the invention, an information management method to be executed by a computer, the information management method includes accepting a registration request that includes identification information of a mobile device, and position information of the mobile device that includes latitude and longitude; generating a value that includes the identification information followed by information that indicates a date and time when the registration request is accepted; storing the position information in a first storage unit in a manner correlated with the value as a first key; generating another value that includes the information that indicates the date and time followed by the identification information; storing the position information in a second storage unit in a manner correlated with the other value as a second key; storing the position information in a third storage unit in a manner correlated with the identification information as a third key; and storing the identification information in a fourth storage unit in a manner correlated with the position information as a fourth key.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a data structure for size information;

FIG. 8 is a diagram illustrating an example of a configuration of the ID time storage unit;

FIG. 10 is a diagram illustrating an example of a configuration of the time ID storage unit;

FIG. 12 is a diagram illustrating an example of a configuration of the ID storage unit;

FIG. 14 is a diagram illustrating an example of a configuration of the position storage unit;

FIG. 20 is a diagram illustrating an example of a rectangular region group;

FIG. 21 is a diagram illustrating an example of division of a rectangular region to a cell group;

FIG. 35 is a diagram illustrating an example of a configuration of a management table;

FIG. 36 is a diagram illustrating an example wherein a single rounded-off search key is common to a plurality of original search keys;

FIGS. 38A, 38B, 38C and 38D are diagrams illustrating a second specific example of search processing of the position storage unit;

FIGS. 39A, 39B, 39C and 39D are diagrams illustrating a third specific example of search processing of the position storage unit;

FIGS. 40A, 40B, 40C and 40D are diagrams illustrating a fourth specific example of search processing from the position storage unit;

FIGS. 41A, 41B, 41C and 41D are diagrams illustrating a fifth specific example of search processing from the position storage unit;

FIGS. 42A, 42B, 42C and 42D are diagrams illustrating a sixth specific example of search processing of the position storage unit; and FIGS. 43A, 43B, 43C and 43D are diagrams illustrating a seventh specific example of search processing of the position storage unit.

DESCRIPTION OF EMBODIMENTS

A search request mode in relation to a mobile device may be conceived as, for example, a search request for the position information of a particular mobile device, a search request for a mobile device included in a certain range, and so forth. Also, a conception of time is vital for movement, and accordingly, a search request in which a time is specified may also be conceived. For example, a search request for the history of the position information of a particular mobile device, a search request for the position information of each mobile device at a certain date and time, and so forth may also be conceived.

Here, mobile devices that are objects to be managed include not only an in-vehicle device installed in a vehicle but also a terminal carried by a person. Accordingly, the number of records may extend to several tens of millions or may exceed several tens of millions. With regard to such a large quantity of information, there a high-speed response to the various types of search requests as described above is desired.

Therefore, a technique disclosed in the present embodiment replies with practical performance to a variety of search requests that relate to a mobile device.

Figure 1:
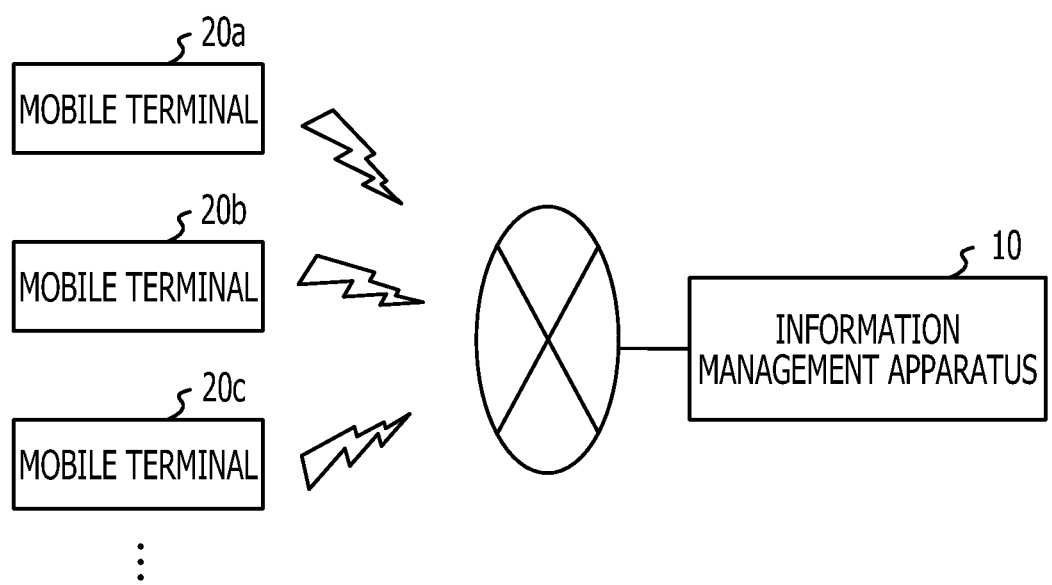
FIG. 1 is a diagram illustrating an example of a configuration of an information management system according to an embodiment of the present disclosure.

Hereinafter, an embodiment of the present disclosure will be described based on the drawings. FIG. 1 is a diagram illustrating an example of the configuration of an information management system according to an embodiment of the present disclosure. With an information management system 1 as displayed in the drawing, a plurality of mobile terminals 20 such as mobile terminals 20a, 20b, and 20c and so forth, and an information management apparatus 10 are configured so as to communicate via a mobile communication network or the like.

The mobile terminals 20 are employed to recognize the position of a mobile device that is an object to be managed. Accordingly, the mobile terminals 20 are suitably movable terminals having a communication function that takes advantage of a mobile device communication network and a GPS (Global Positioning System) function, such as in-vehicle devices, cellular phones, smart phones, tablet-type terminals, or the like. The mobile devices mentioned here are subjects that move the mobile terminals 20, such as a vehicle in which the mobile terminal 20 is installed, a person carrying the mobile terminal 20, and so forth. However, the mobile terminals 20 themselves may be recognized as mobile devices. Also, even objects to which a device for measuring a position is not installed, such as typhoons, rain clouds, thundercloud, fronts, or the like, may be comprehended as being a mobile device if the position thereof may be externally observed or measured.

The information management apparatus 10 is a computer for managing information, such as position information, for the mobile devices. The position information includes latitude and longitude information. A plurality of computers may make up the information management apparatus 10. Information that the information management apparatus 10 manages may be searched using the mobile terminals 20. Alternatively, the information thereof may be searched from a fixed terminal, such as a personal computer (PC) or the like.

Figure 2:
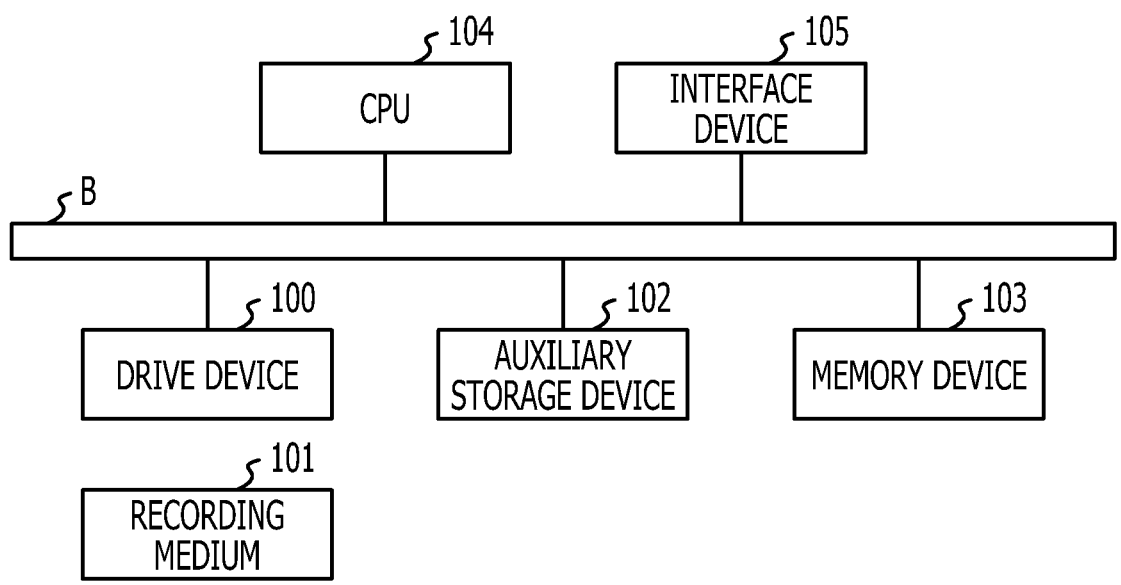
FIG. 2 is a diagram illustrating an example of a hardware configuration of an information management apparatus according to an embodiment of the present disclosure.

FIG. 2 is a diagram illustrating a hardware configuration example of an information management apparatus according to an embodiment of the present disclosure. The information management apparatus 10 in FIG. 2 includes a drive device 100, an auxiliary storage device 102, a memory device 103, a central processing unit (CPU) 104, an interface device 105, and so forth which are mutually connected by a bus B.

A program for realizing processing at the information management apparatus 10 is provided via a recording medium 101. When the recording medium 101 in which the program is recorded is set in the drive device 100, the program may be installed in the auxiliary storage device 102 from the recording medium 101 via the drive device 100. However, installation of the program is not preferentially performed from the recording medium 101, and the program may be downloaded from another computer via a network. The auxiliary storage device 102 stores the installed program, and also stores files, data, and so forth.

If a program activation instruction is received, the memory device 103 reads out and stores the program from the auxiliary storage device 102. The CPU 104 executes a function according to the information management apparatus 10 in accordance with the program stored in the memory device 103. The interface device 105 is employed as an interface to connect to a network.

Note that examples of the recording medium 101 include portable-type recording media such as CD-ROM, DVD discs, USB memory, and so forth. Also, examples of the auxiliary storage device 102 include a hard disk drive (HDD), flash memory, and so forth. Either of the recording medium 101 and auxiliary storage device 102 is equivalent to a computer-readable recording medium.

Figure 3:
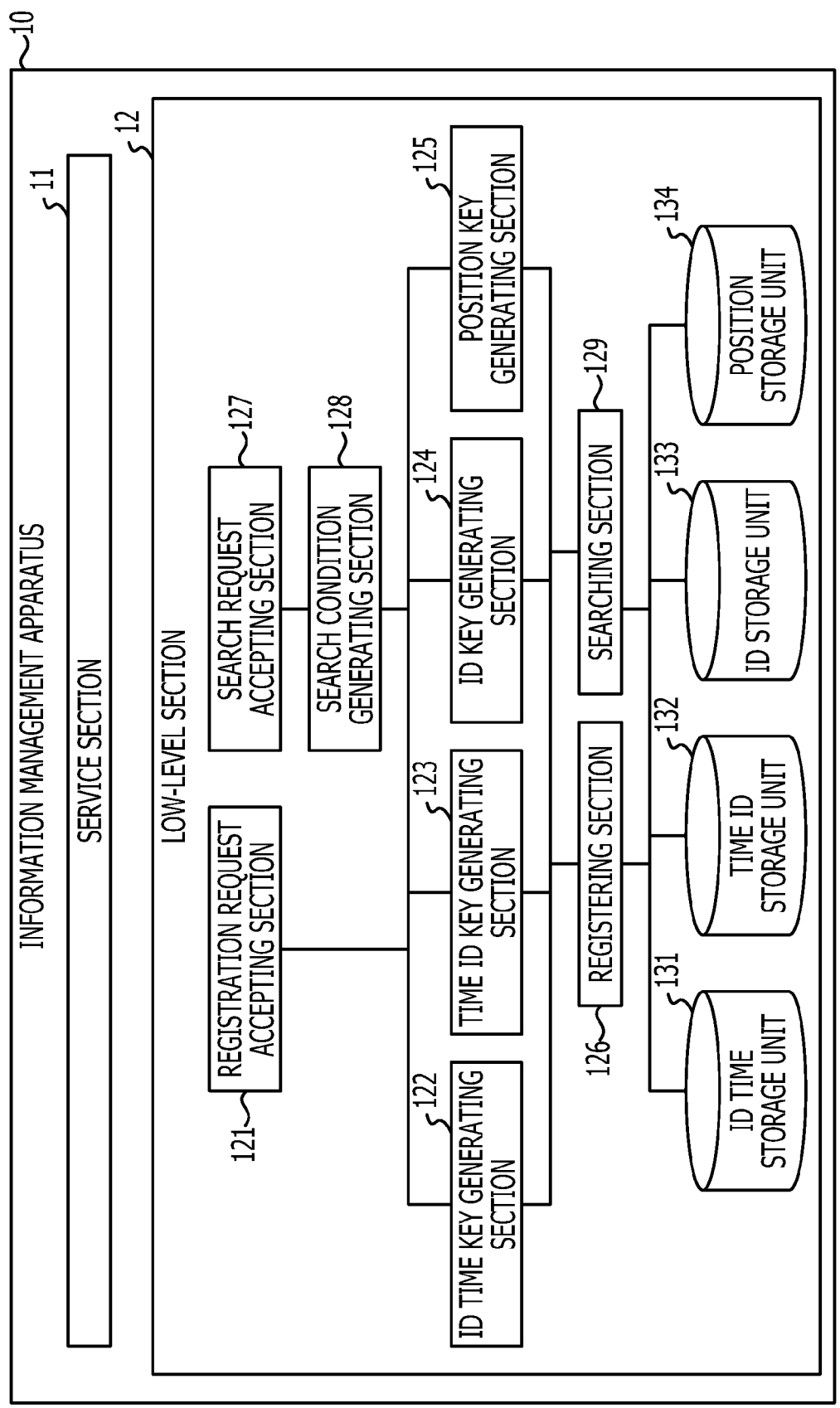
FIG. 3 is a diagram illustrating an example of a function configuration of an information management apparatus according to an embodiment of the present disclosure.

FIG. 3 is a diagram illustrating an example of a function configuration of the information management apparatus according to an embodiment of the present disclosure. In the drawing, the information management apparatus 10 includes a service section 11 and a low-level section 12.

The low-level section 12 provides, as an information management function of the information management apparatus 10, a substrate-like or basic function to the service section 11. Accordingly, in general, the client of the low-level section 12 is the service section 11. The service section 11 uses a function provided by the low-level section 12 to realize an applied function, thereby providing a service to a device such as the mobile terminals 20. Accordingly, in general, the clients of the service section 11 are devices such as the mobile terminals 20. Note that the function of the low-level section 12 may be used via an application program interface (API) that the low-level section 12 has.

The low-level section 12 includes a registration request accepting section 121, an ID time key generating section 122, a time ID key generating section 123, an ID key generating section 124, a position key generating section 125, a registering section 126, a search request accepting section 127, a search condition generating section 128, a searching section 129, and so forth. These sections are realized by processing that a program installed in the information management apparatus 10 causes the CPU 104 to execute. The low-level section 12 also includes an ID time storage unit 131, a time ID storage unit 132, an ID storage unit 133, a position storage unit 134, and so forth. These storage units may be realized by employing a storage device that is to be connected to the auxiliary storage device 102 or information management apparatus 10 via the network, or the like.

The registration request accepting section 121 accepts a registration request for information such as position information or attribute information of a mobile device from the service section 11, which has received or obtained mobile information. Hereinafter, position information and attribute information and so forth of a mobile device may be referred to as mobile information. That is to say, the registration request accepting section 121 is a portion of an API that the low-level section 12 provides. The service section 11 may directly receive mobile information from the mobile terminals 20 via a mobile communication network, or may obtain or receive mobile information from another computer system that manages mobile information. With the latter, the other computer system does not have to be restricted to one type. Examples of the other computer system include a computer system that provides a telematics service. Note that the time when mobile information is obtained may differ for each of the mobile terminals 20. That is to say, with regard to all of the mobile terminals 20, mobile information at the same time does not have to be received.

The ID time key generating section 122 generates an ID time key based on a mobile ID included in the mobile information accepted by the registration request accepting section 121, and the date and time when the registration request was received. The key mentioned here is a key in a key-value store (KVS). That is to say, with the present embodiment, mobile information is managed with a KVS. The ID time key is a key for the ID time storage unit 131, and is a character string whereby a character string that indicates the reception date and time of the registration request is appended to a character string that indicates a mobile ID. That is to say, the ID time key is a character string in which the date and time converted into a character string is appended to a mobile ID converted into a character string.

The time ID key generating section 123 generates a time ID key based on the date and time when a registration request is received, and a mobile ID included in the mobile information accepted by the registration request accepting section 121. The time ID key is a key for the time ID storage unit 132, and is a character string where in a character string that indicates a mobile ID is appended to a character string that indicates the date and time when a registration request was received (hereinafter, a "received date and time"). That is to say, the time ID key is a character string where in a date and time converted into a character string is appended to a mobile ID converted into a character string.

The ID key generating section 124 generates an ID key based on a mobile ID included in the mobile information accepted by the registration request accepting section 121. The ID key is a key for the ID storage unit 133, and is a key obtained by a mobile ID being converted into a character string.

The position key generating section 125 generates a position key based on latitude and longitude for the position of a mobile, which is included in the mobile information accepted by the registration request accepting section 121. The position key is a key for the position storage unit 134.

The registering section 126 registers mobile information in the ID time storage unit 131, time ID storage unit 132, ID storage unit 133, or position storage unit 134 in a manner correlated with an ID time key, time ID key, ID key, or position key.

The ID time storage unit 131 is a KVS-type database that stores mobile information in a manner correlated with an ID time key. The time ID storage unit 132 is a KVS-type database that stores mobile information in a manner correlated with a time ID key. The ID storage unit 133 is a KVS-type database that stores mobile information in a manner correlated with an ID key. The position storage unit 134 is a KVS-type database that stores mobile information in a manner correlated with a position key.

The search request accepting section 127 accepts a search request for mobile information from the service section 11. The search condition generating section 128 generates a search condition adapted to search the ID time storage unit 131, time ID storage unit 132, ID storage unit 133, or position storage unit 134 based on a parameter specified in a search request. The searching section 129 uses the search condition generated by the search condition generating section 128 to search the ID time storage unit 131, time ID storage unit 132, ID storage unit 133, or position storage unit 134.

Figure 4:
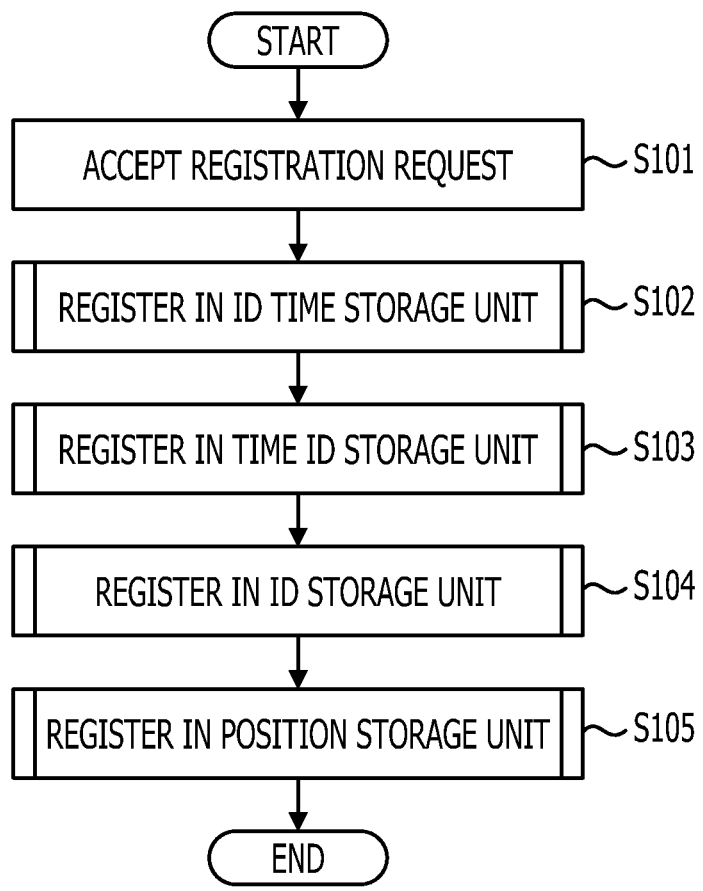
FIG. 4 is a flowchart for describing an example of a procedure for registration processing of mobile information.

Hereinafter, description is given regarding a processing procedure that the information management apparatus 10 executes. FIG. 4 is a flowchart for describing an example of a procedure for registration processing of mobile information.

In step S101, the registration request accepting section 121 receives a request to register mobile information (a "registration request") (S101). The attribute information in mobile information includes, for example, a mobile ID, position information of a representative position, size information of a mobile device, and so forth. The mobile ID is identification information of a mobile device whereby each mobile device may be uniquely identified. Note that other attribute information for a mobile device may be included in mobile information.

The size information is information wherein a range occupied by a mobile device with respect to a two-dimensional coordinate system of latitude and longitude is represented with a group of one or more rectangular regions. Examples of a method for specifying the rectangular regions that make up the range of a mobile device include three methods as illustrated in FIG. 5.

Figure 5:
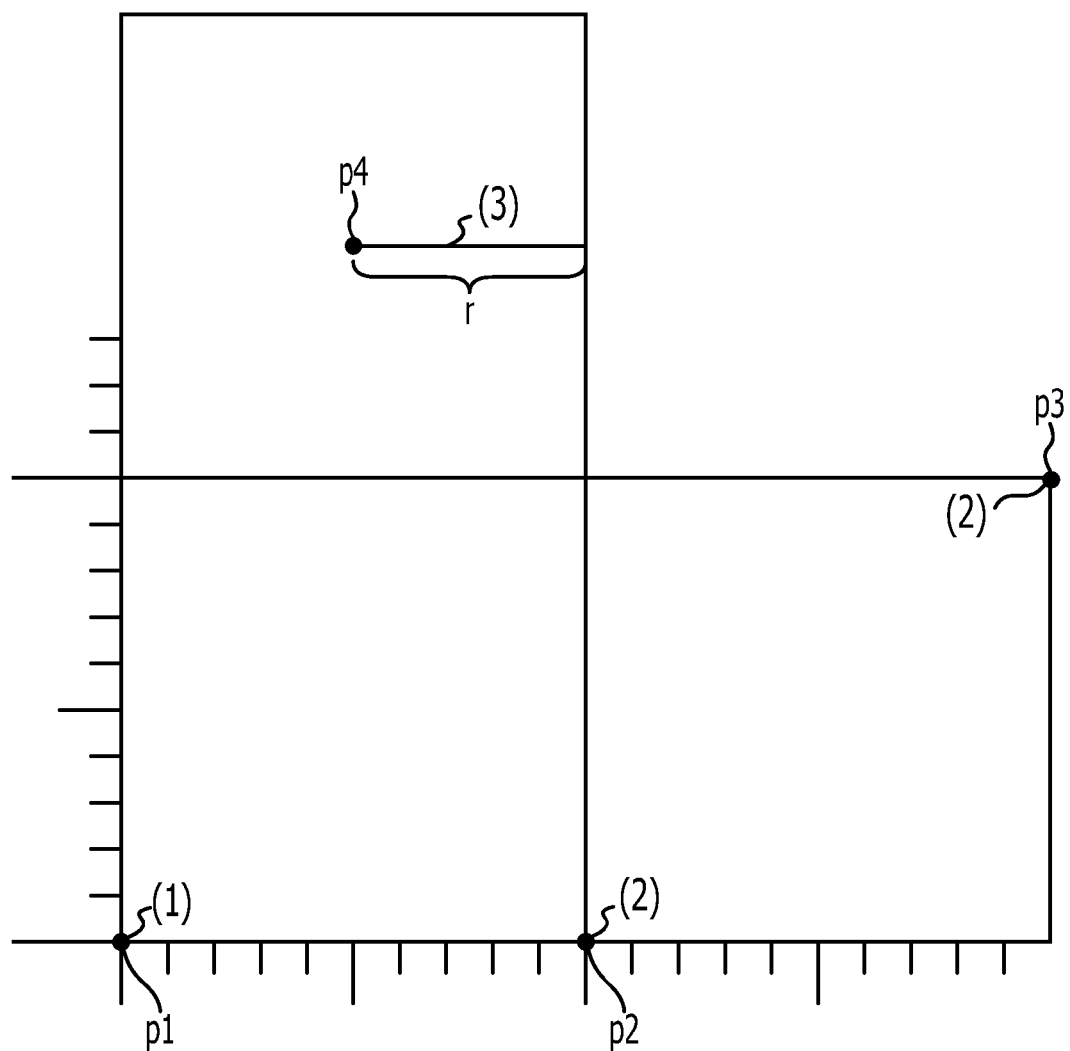
FIG. 5 is a diagram illustrating an example of a method for specifying the rectangular regions making up the range of a mobile device.

FIG. 5 is a diagram illustrating an example of a method for specifying the rectangular regions making up the range of a mobile device. In FIG. 5, the horizontal direction in the drawing represents longitude, and the vertical direction in the drawing represents latitude. In the drawing, three methods (1) through (3) are exemplified.

The method in (1) is a method for specifying one set of latitude and longitude. Method (1) specifies a rectangular region with the latitude and longitude being taken as a lower left apex p1 as well as units, according to the precision of the latitude and longitude, that are taken as the length of one side. The precision of the latitude and longitude mentioned here is an effective number of digits below the decimal point of latitude and longitude. For example, if the precision of latitude and longitude is $1/1000$, a rectangular region with one side being $1/1000$ degree is specified. In addition, if the precision of latitude and longitude is $1/10000$, a rectangular region with one side being $1/10000$ degree is specified. Note that, with the present embodiment, the lower left apex for a certain range mentioned here is a position that the minimum value of latitude and the minimum value of longitude in this range indicate. In addition, the upper right apex for a certain range mentioned here is a position that the maximum value of latitude and the maximum value of longitude in this range indicate.

The method in (2) is a method for specifying two sets of latitude and longitude. Method (2) specifies a rectangular region in which the first set of latitude and longitude is taken as a lower left apex p2, and the second set of latitude and longitude is taken as an upper right apex p3.

The method in (3) is a method for specifying one set of latitude and longitude, and a half side. Method (3) a rectangular region in which the set of latitude and longitude is taken as a central point p4 (an intersecting point of diagonal lines), and this half side r being taken as distance from the central point to four directions is specified. For example, meter may be conceived as the unit of distance specified for a half side.

A rectangular region may be specified by a method other than the above (1) through (3). Also, if a plurality of rectangular regions are specified by size information (that is, if the range of a mobile device is a group of a plurality of rectangular regions), the specifying methods in the above (1) through (3) may be combined. Accordingly, size information has a data structure as illustrated in FIG. 6, for example.

FIG. 6 is a diagram illustrating an example of the date structure of size information. As illustrated in the drawing, size information is information that includes the position and size of a representative position for each rectangular region. Note that, with the size, a specifying method and a value are specified. The specifying method of the size is equivalent to one of the above (1) through (3), for example. The value corresponds to the above (1) through (3), for example.

The position information for a representative position is the latitude and longitude of a representative position of a mobile device. The representative position mentioned here is, where a mobile device is represented with one point, the position of the point.

Next, the ID time key generating section 122 and registering section 126 and so forth execute registration processing for the ID time storage unit 131 regarding mobile information (S102). Next, the time ID key generating section 123 and registering section 126 and so forth execute registration processing for the time ID storage unit 132 regarding mobile information (S103). Next, the ID key generating section 124 and registering section 126 and so forth execute registration processing for the ID storage unit 133 regarding mobile information (S104). Next, the position key generating section 125 and registering section 126 and so forth execute registration processing for the position storage unit 134 regarding mobile information (S105). Steps S102, S103, S104, and S105 may be executed in any sequence.

Figure 7:
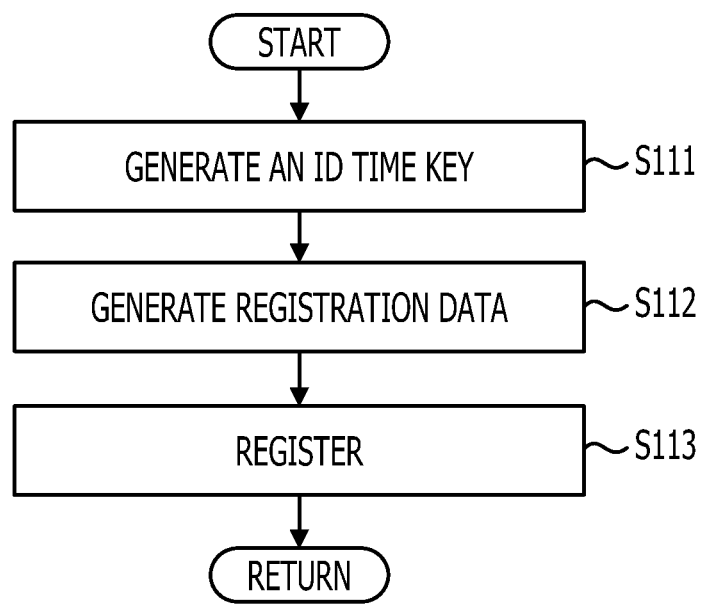
FIG. 7 is a flowchart for describing an example of a procedure for registration processing for an ID time storage unit.

Next, the details of step S102 will be described. FIG. 7 is a flowchart for describing an example of a procedure for the registration processing for the ID time storage unit 131.

In step S111, the ID time key generating section 122 generates an ID time key. Specifically, the ID time key generating section 122 connects a character string that indicates the date and time when a registration request was received with a character string that indicates a mobile ID to generate an ID time key. The received date and time is corrected to be a value obtained by subtracting, from the maximum value of an integer-type variable, the elapsed time (that is, number of milliseconds) from a given date and time to the received date and time. The given date and time is hereinafter referred to as reference date and time. This is performed so that the ID time key for the latter date and time is smaller than the given date and time.

Accordingly, a character string is generated as an ID time key wherein a character string indicating a mobile ID, and a character string indicating the value after the correction are connected. The reference date and time may be 00:00:00.000 Jan. 1, 1970 of Greenwich Mean Time (GMT), for example. Also, the maximum value for integer-type editing is, for example, if using a long-type in Java (registered trademark), 9223372036854775807.

Next, the registering section 126 generates data to be correlated with the ID time key at the ID time storage unit 131 based on information specified in the registration request (S112). For example, the position information of a representative position, size information, and so forth are converted into a given format.

Next, the registering section 126 registers the ID time key as a key and the generated data as a value in the ID time storage unit 131, which is a KVS-type database (S113). That is to say, this data is stored in the ID time storage unit 131 in a manner correlated with the ID time key.

FIG. 8 is a diagram illustrating an example of the configuration of the ID time storage unit. As illustrated in the drawing, the ID time storage unit 131 stores a value in a manner correlated with a key. An ID time key is stored as the key. For an ID time key there may be difficulty in finding a separation between a mobile ID, and date and time, and accordingly, a mobile ID portion and a date and time portion are indicated in the drawing for convenience. The value includes two columns. Attribute information other than position information is stored in the first column, and position information is stored in the second column. The second column includes two rows, wherein each row includes the value of an item corresponding to the row, and date and time when the item was registered. The first row is a representative position, and a value thereof is latitude and longitude that indicates the representative position. The second row is size information; a value thereof is a group of latitude and longitude included in the size information. The size information may have the data structured exemplified in FIG. 6, for example.

Figure 9:
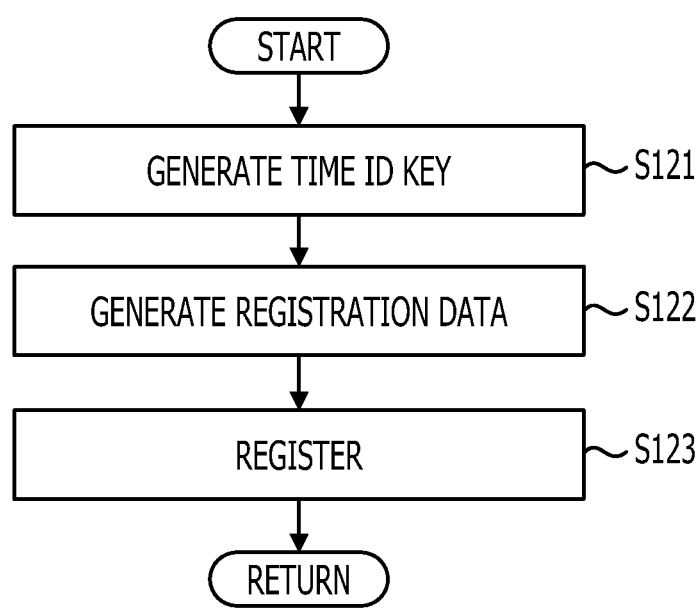
FIG. 9 is a flowchart for describing an example of a procedure for registration processing for a time ID storage unit.

Next, the details of step S103 in FIG. 4 will be described. FIG. 9 is a flowchart for describing an example of a procedure for registration processing for the time ID storage unit.

In step S121, the time ID key generating section 123 generates a time ID key. Specifically, the time ID key generating section 123 connects a character string that indicates the received date and time for a registration request with a character string that indicates a mobile ID in order to generate a time ID key. Note that the received date and time is, in the same way as with an ID time key, corrected as a value obtained by subtracting, from the maximum value of an integer-type variable, elapsed time (in milliseconds) from reference date and time to this received date and time.

Next, the registering section 126 generates, at the time ID storage unit, data to be correlated with the time ID key based on information specified in the registration request (S122). For example, the position information of a representative position, size information, and so forth are converted into a given format.

Next, the registering section 126 registers the time ID key as a key and the generated data as a value in the time ID storage unit 132, which is a KVS-type database (S123). That is to say, the data is stored in the time ID storage unit 132 in a manner correlated with the time ID key.

FIG. 10 is a diagram illustrating an example of the configuration of the time ID storage unit. As illustrated in the drawing, the time ID storage unit 132 stores a value in a manner correlated with a key. A time ID key is stored as the key. The configuration of the value is the same as with the ID time storage unit 131, and accordingly, description thereof is omitted. In the drawing, a date and time portion and a mobile ID portion are illustrated for convenience.

Figure 11:
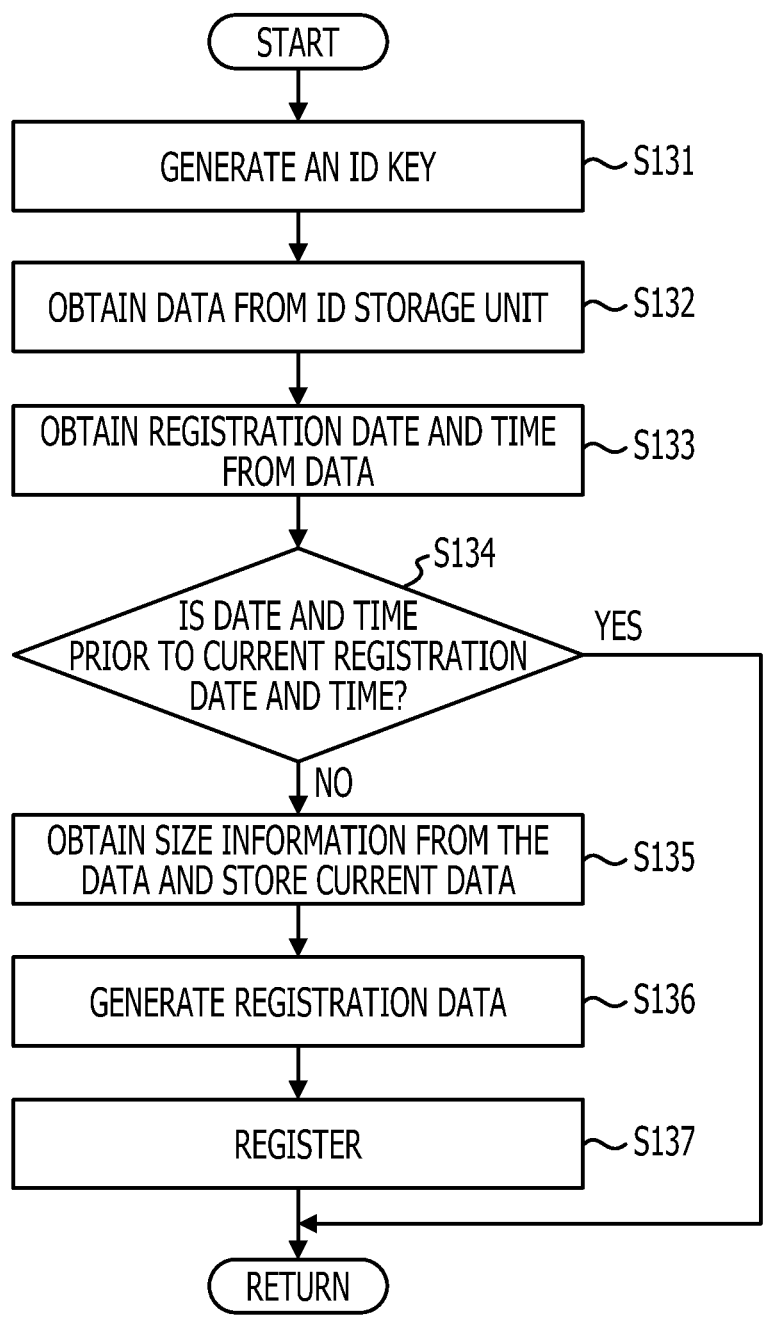
FIG. 11 is a flowchart for describing an example of a procedure for registration processing for an ID storage unit.

Next, the details of step S104 in FIG. 4 will be described. FIG. 11 is a flowchart for describing an example of a procedure for registration processing for the ID storage unit.

In step S131, the ID key generating section 124 generates an ID key. Specifically, the ID key generating section 124 converts the mobile ID specified in the registration request into a character string to generate an ID key. Next, the registering section 126 obtains data (that is, a value) that corresponds to the ID key from the ID storage unit 133 (S132).

FIG. 12 is a diagram illustrating an example of the configuration of the ID storage unit. As illustrated in the drawing, the ID storage unit 133 stores a value in a manner correlated with a key. An ID key is stored as the key. The configuration of the value is the same as with the ID time storage unit 131, and accordingly, description thereof is omitted.

Next, the registering section 126 obtains a registration date and time from the obtained data (S133). Specifically, registration date and time for a representative position or size information is obtained. Next, the registering section 126 determines whether the received date and time for the registration request is prior to the registration date and time (S134). Generally, the received date and time for the registration request is after the registration date and time for already registered data. Accordingly, the determination is effective if date and time is specified in a registration request.

If the registration date and time is after the received date and time for the registration request (Yes in S134), the information to be registered is older than already registered information, and accordingly, registration of mobile information according to the registration request is not performed. On the other hand, if the registration date and time is before the received date and time of the registration request (No in S134), the registering section 126 obtains and holds size information from the data obtained in step S132 (S135). For example, this size information is stored in the memory device 103.

Next, the registering section 126 generates data to be registered in a manner correlated with the ID key, based on information specified in the registration request (S136). Next, the registering section 126 registers the ID key as a key and the generated data as a value in the ID storage unit 133, which is a KVS-type database (S137). That is to say, the data is stored in the ID storage unit 133 in a manner correlated with the ID key.

Figure 13:
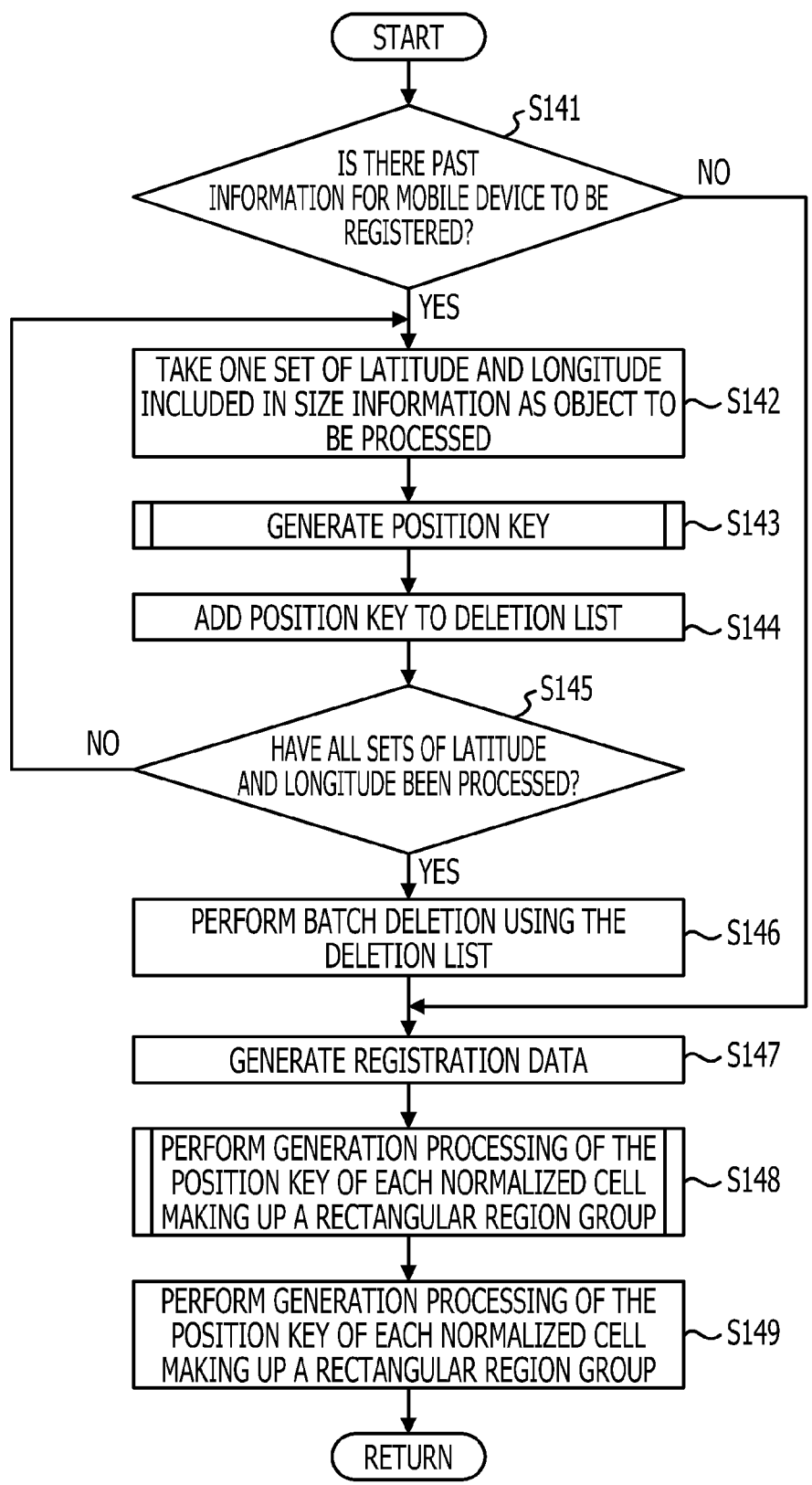
FIG. 13 is a flowchart for describing an example of a procedure for registration processing for a position storage unit.

Next, the details of step S105 in FIG. 4 are described. FIG. 13 is a flowchart for describing an example of a procedure for registration processing for the position storage unit.

In step S141, the registering section 126 determines whether past information regarding a mobile device to be registered has been registered in the position storage unit 134. The determination is performed based on whether past size information corresponding to the mobile ID is held, which is determined in step S135 in FIG. 11. Specifically, if the size information is held, the registering section 126 determines that past information for the mobile device to be registered has been registered in the position storage unit 134. On the other hand, if the size information is not held, the registering section 126 determines that past information for the mobile device to be registered has not been registered in the position storage unit 134.

If the size information is not held (No in S141), the processing proceeds to step S147. If the size information is held (Yes in S141), the registering section 126 takes one set of latitude and longitude included in the size information as the object to be processed (S142). Next, the position key generating section 125 generates a position key based on the latitude and longitude (S143). The details of a method for generating a position key will be described later. Next, the registering section 126 adds the generated position key to a deletion list (S144). The deletion list mentioned here is a list-formatted variable for storing a position key of data to be deleted.

Upon steps S142 through S144 being executed for all sets of latitude and longitude in a list of latitude and longitude in the past size information that corresponds to a mobile ID (Yes in S145), the registering section 126 deletes a position key included in the deletion list and a value correlated with this position key from the position storage unit 134 (S146). As a result thereof, information corresponding to past positions for a mobile device to be registered is deleted from the position storage unit 134.

Next, the registering section 126 generates data to be registered as a value corresponding to the position key based on information specified in the registration request (S147).

Next, the position key generating section 125 executes generation processing for each cell's position key (S148). With the present processing, each cell for which a position key is to be generated is a normalized cell making up a rectangular region group that size information indicates.

With the present embodiment, cells are unit regions used to represent a certain range, and are squares formed with a mesh or grid or intersection of latitude and longitude with the same digits (that is, precision) in a two-dimensional coordinate system that uses latitude and longitude. The length of one side of a cell is determined based on the precision of latitude and longitude of the lower left apex of the cell. For example, if the precision of latitude and longitude of the lower left apex is specified with $1/1000$ degree, a rectangular region with one side of $1/1000$ degree is specified. If the precision of latitude and longitude of the lower left apex is specified with $1/10000$ degree, a rectangular region with one side of $1/10000$ degree is specified. Also, normalization of cell groups means to combine cell groups if there are cell groups that may be combined into an upper digit for cell groups with a certain precision. Cell groups that may be combined into an upper digit are, for example, if there are cell groups with $1/10000$, a group of 100 cells included in cells with a unit of $1/1000$. Also, the position key of a cell, or a position key corresponding to a cell means a position key generated based on the latitude and longitude of the lower left apex of a cell.

Accordingly, in step S148, a rectangular region making up a range that size information indicates is converted into one or more cells, and a position key of the lower left apex is generated for each of the cells. Note that, if the number of the cells is more than one, the precision of the cells may be different. As described above, this is because normalization of the cell groups may be performed.

Next, the registering section 126 registers the data generated in step S147 in the position storage unit 134, which is a KVS-type store, in a manner correlated to a value for each generated position key (S149).

FIG. 14 is a diagram illustrating an example of the configuration of the position storage unit. As illustrated in the drawing, the position storage unit 134 stores a value in a manner correlated with a key. A character string generated based on latitude and longitude is stored in the key. The key is a position key. The value includes three items (columns). The first is an id, the second is an attribute, and the third is registration date and time. A mobile ID is stored in the id. Latitude and longitude indicating a representative position, size information, other attribution information, and so forth are stored in the attribute. Size information may have the date structure exemplified in FIG. 6, for example.

Note that, if the range of one mobile device straddles a plurality of cells, a position key is assigned to the mobile device for each cell, and a value is stored in the position storage unit 134 for each position key.

Figure 15:
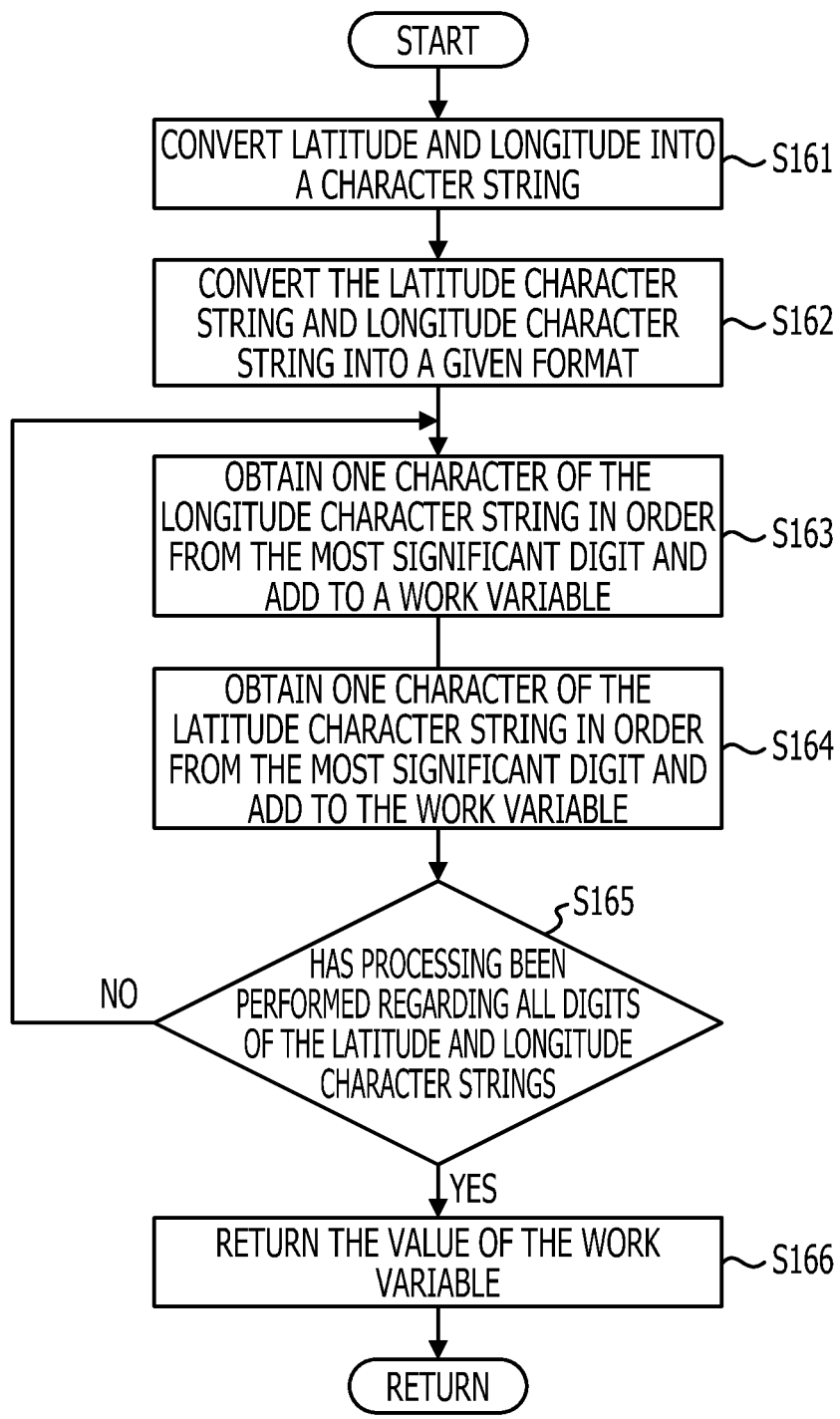
FIG. 15 is a flowchart for describing an example of a procedure for generation processing for a position key.

Next, the details of step S143 in FIG. 13 are described. FIG. 15 is a flowchart for describing an example of a procedure for position key generation processing.

In step S161, the position key generating section 125 converts each latitude and longitude to be processed from a numeric value to a character string. Accordingly, a character string indicating latitude (hereinafter, "latitude character string"), and a character string indicating longitude (hereinafter, "longitude character string") are generated. Here, say that latitude and longitude to be processed are (35.5678, 139.1234). Accordingly, the latitude character string is "35.5678", and the longitude character string is "139.1234". Say that the range of latitude is +90 degrees (north latitude) through −90 degrees (south latitude). That is to say, say that south latitude is represented with a minus sign (−). Also, say that the range of longitude is +180 degrees (east longitude) through −180 degrees (west longitude). That is to say, west longitude is represented with a minus sign (−). Note that, although north latitude and east longitude are represented with a plus sign (+), "+" does not have to explicitly be added to north latitude and east longitude, which are numeric values. Also, for latitude and longitude, which angular range is taken as "+" and which angular range is taken as "−" are not restricted to the above example.

Next, the position key generating section 125 converts the latitude character string and longitude character string into a given format (S162). First, if the integer portion is made up of one digit or two digits, the character 0 (zero) is inserted onto the head thereof so as to have a 3-digit integer portion. Accordingly, the latitude character string becomes "035.5678". The longitude character string is still "139.1234" since the integer portion thereof is originally made up of three digits in this example. Also, "+" or "−" is added to the heads of the latitude character string and longitude character string based on the latitude and longitude serving as the original numeric values. Accordingly, the latitude character string becomes "+035.5678", and the longitude character string becomes "+139.1234". Also, the character ".", which indicates a decimal point, is deleted from both. Consequently, the latitude character string becomes "+0355678", and the longitude character string becomes "+1391234".

Then the conversion to a given format ends.

Next, the position key generating section 125 removes one character from the front of the longitude character string, and adds to the head of the work variable (S163). The work variable is a character string variable for work of this character. Accordingly, when step S163 is first executed, "+" is obtained from "+1391234", and added to the work variable.

Next, the position key generating section 125 removes one character from the front of the latitude character string, and adds the character to the head of the work variable (S164). Accordingly, when step S164 is first executed, "+" is obtained from "+0355678", and added to the work variable. The work variable in step S164 is the same as the work variable in step S163. Accordingly, when steps S163 and S164 are first completed, the contents of the work variable becomes "++". The execution sequence of steps S163 and S164 may be changed.

Steps S163 and S164 are repeatedly executed until all of the digits of the latitude character string and longitude character string are processed (S165). As a result, a character string, wherein the character at the same position is alternately arrayed one position at a time in order from the front of each of the latitude character string and longitude character string, is stored in the work variable. With the above example, a character string of "++10339515263748" is stored in the work variable. This character string serves as a position key. Accordingly, the position key generating section 125 returns the value stored in the work variable, that is, the position key (S166).

Next, the details of step S148 in FIG. 13 are described. FIG. 16 through FIG. 19 are flowcharts for describing an example of a procedure for generation processing of the position key for each normalized cell making up a rectangular region group.

In step S201, the position key generating section takes one rectangular region out of the rectangular region group, specified with a data structure as illustrated in FIG. 6, as the target to be processed. Hereinafter, a region to be processed will be referred to as "target rectangular region".

Now, let us say that a rectangular region group as illustrated in FIG. 20 has been specified. FIG. 20 is a diagram illustrating an example of a rectangular region group. In the drawing, let us say that the minimum scale is $1/10000$ degrees in both the latitude direction and longitude direction. In the drawing, a rectangular region R1, a rectangular region R2, a rectangular region group R3, a rectangular region group R4, a rectangular region R5, a rectangular region group R6, a rectangular region R7, and a rectangular region group R8 make up the specified rectangular region group.

The rectangular region R1 is a rectangular region with $1/10000$ degrees as one side specified by two sets of latitude and longitude of precision of $1/10000$ degrees. The rectangular region R2 is a rectangular region with a length in the latitude direction of $1/1000$ degrees and a length of the longitude direction is $8/10000$ degrees, wherein the first set of latitude and longitude is specified with precision of $1/1000$ degrees and the second set of latitude and longitude is specified with precision of $1/10000$ degrees. The rectangular region group R3 is a group of four rectangular regions each of which is specified by a set of latitude and longitude with precision of $1/10000$ degrees. The rectangular region group R4 is a group of 20 rectangular regions each of which is specified by a set of latitude and longitude with precision of $1/10000$ degrees. The rectangular region R5 is one rectangular region specified by one set of latitude and longitude with precision of $1/10000$ degrees. The rectangular region group R6 is a group of nine rectangular regions each of which is specified by a set of latitude and longitude with precision of 1/10000 degrees. The rectangular region R7 is a rectangular region specified by a central point p5 and a half side r5 and with one side being 1/1000 degrees. The rectangular region group R8 is a group of 99 rectangular regions each of which is specified by a set of latitude and longitude with precision of 1/10000 degrees. That is to say, a portion indicated by B is not included in the rectangular region group R8.

In step S201, one rectangular region is taken as a target rectangular region. With regard to a plurality of rectangular regions included in each of the rectangular region groups R3, R4, R6, and R8 as well, each thereof is taken as the target to be processed one at a time.

Next, the position key generating section 125 determines whether the target rectangular region has been specified by a central point and a half side (S202). If the target rectangular region has been specified by a central point and a half side (Yes in S202), the position key generating section 125 calculates the latitude and longitude of the lower left apex, and the latitude and longitude of the upper right apex of a range determined by the latitude of the central point, the longitude of the central point, and a half side (meter) (S203). It is sufficient for a calculation method to follow a known method.

If the target rectangular region has not been specified with a central point and a half side (No in S202), the position key generating section 125 determines whether the target rectangular region has been specified with one set of latitude and longitude (S204). If the target rectangular region has been specified with one set of latitude and longitude (Yes in S204), the position key generating section 125 takes this latitude and longitude as the lower left apex, and obtains the latitude and longitude of the upper right apex of a cell with length according to the precision of the latitude and longitude being taken as one side (S205).

If the target rectangular region has not been specified with one set of latitude and longitude (No in S204), in the present embodiment, the target rectangular region has been specified with two sets of latitude and longitude. Accordingly, in this case, the position key generating section 125 does not perform special processing.

In other words, in step S206 and thereafter, the target rectangular region is determined by the latitude and longitude of each of the lower left apex and upper right apex.

Next, the position key generating section 125 assigns a value obtained by subtracting the latitude of the lower left apex from the latitude of the upper right apex of the target rectangular region to a variable called WLAT (hereinafter, "latitude width WLAT"). Next, the position key generating section 125 assigns a value obtained by subtracting the longitude of the lower left apex from the longitude of the upper right apex of the target rectangular region to a variable called WLON (hereinafter, "longitude width WLON") (S207). Next, the position key generating section 125 assigns the digits below the decimal point of the latitude width WLAT to a variable called KLAT (S208). Next, the position key generating section 125 assigns the digits below a decimal point of the longitude width WLON to a variable called KLON (S209). Next, the position key generating section 125 assigns the maximum value of the variable KLAT and the KLON to a variable called KMAX (hereinafter, "effective number of digits KMAX") (S210 through S212).

Next, if the effective number of digits KMAX is greater than the limit for the number of digits below a decimal point (for example, "5" or the like) (Yes in S213), the position key generating section 125 corrects the value of the effective number of digits KMAX to reflect this limit value (S214).

Next, in steps S215 through S222, the position key generating section 125 divides the target rectangular region into cell groups that have a size according to the precision of the effective number of digits KMAX, and generates the position key for each cell. With regard to this point, a description is given with reference to the drawings.

FIG. 21 is a diagram illustrating an example of division into cell groups of a rectangular region. For example, if the rectangular region R2 is the target rectangular region, the effective number of digits KMAX is 4 (that is, 1/10000). Accordingly, the rectangular region R2 is divided into 80 cell groups with a granularity of 1/10000 degrees. Also, if the rectangular region R5 is the target rectangular region, the effective number of digits KMAX is 5 (that is, 1/100000). Accordingly, the rectangular region R5 is divided into 100 cell groups with a granularity of 1/100000 degrees. The above division processing is performed in steps S215 through S222.

In step S215, the position key generating section 125 assigns the longitude of the lower left apex of the target rectangular region to a variable LLON (hereinafter, "target longitude LLON"). Next, the position key generating section 125 assigns the latitude of the lower left apex to a variable LLAT (hereinafter, "target latitude LLAT") (S216). Next, the position key generating section 125 generates a position key based on the target latitude LLAT and target longitude LLON (S217). Processing to generate a position key is illustrated in FIG. 15.

Next, the position key generating section 125 adds the generated position key to a list L (S218). The list L is a temporary storage region in which a position key is stored. The list L may be realized by the memory device 103 or auxiliary storage device 102 or the like, for example. Next, the position key generating section 125 adds a value, obtained by raising 0.1 to the effective number of digits KMAX power, to the target latitude LLAT (S219). With the rectangular region R2 in FIG. 21, the fourth power of 0.1=0.0001 is added. Next, the position key generating section 125 determines whether the value of the target latitude LLAT reaches the latitude of the upper right apex of the target rectangular region (S220). If the value of the target latitude LLAT does not reach the latitude of the upper right apex of the target rectangular region (No in S220), the position key generating section 125 repeats step S217 to S220.

Next, if the value of the target latitude LLAT reaches the latitude of the upper right apex of the target rectangular region (Yes in S220), the position key generating section 125 adds the value, obtained by raising 0.1 to the effective number of digits KMAX power, to the object longitude LLOT (S221). With the rectangular region R2 in FIG. 21, 0.0001 is added. Next, the position key generating section 125 determines whether the value of the target longitude LLON reaches the longitude of the upper right apex of the target rectangular region (S222). If the value of the target longitude LLON does not reach the longitude of the upper right apex of the target rectangular region (No in S222), the position key generating section 125 repeats step S216 to S222.

If the value of the target longitude LLON reaches the longitude of the upper right apex of the target rectangular region (Yes in S222), the target rectangular region is, such as with the rectangular region R2 in FIG. 21, divided into cells with a size according to the precision of the effective number of digits KMAX, and is in a state in which the position key corresponding to the lower left apex of each cell is recorded in the list L.

Figure 17A:
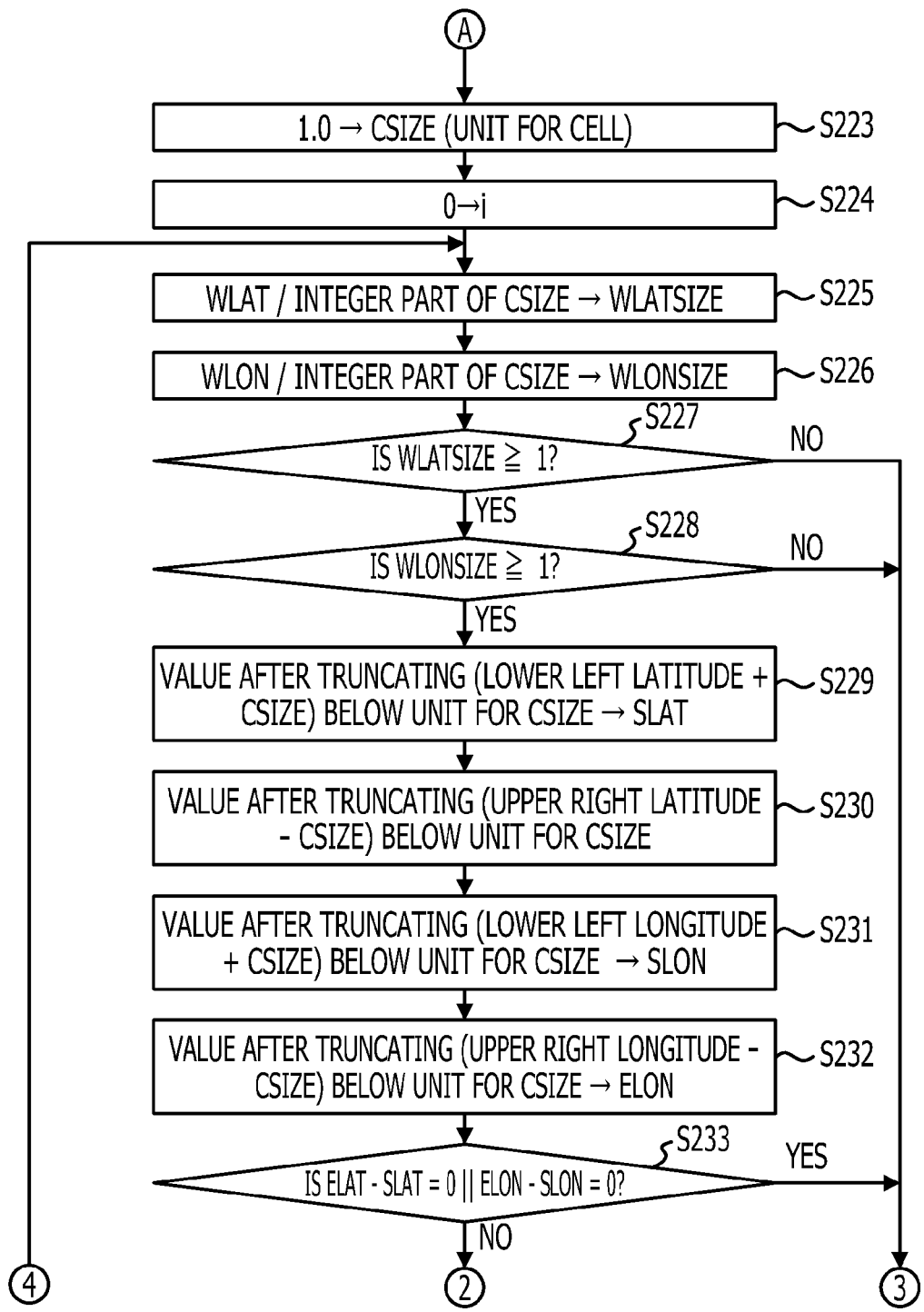
FIGS. 17A and 17B are flowcharts for describing an example of a procedure of generation processing for the position key of each normalized cell making up a rectangular region group.
Figure 17B:
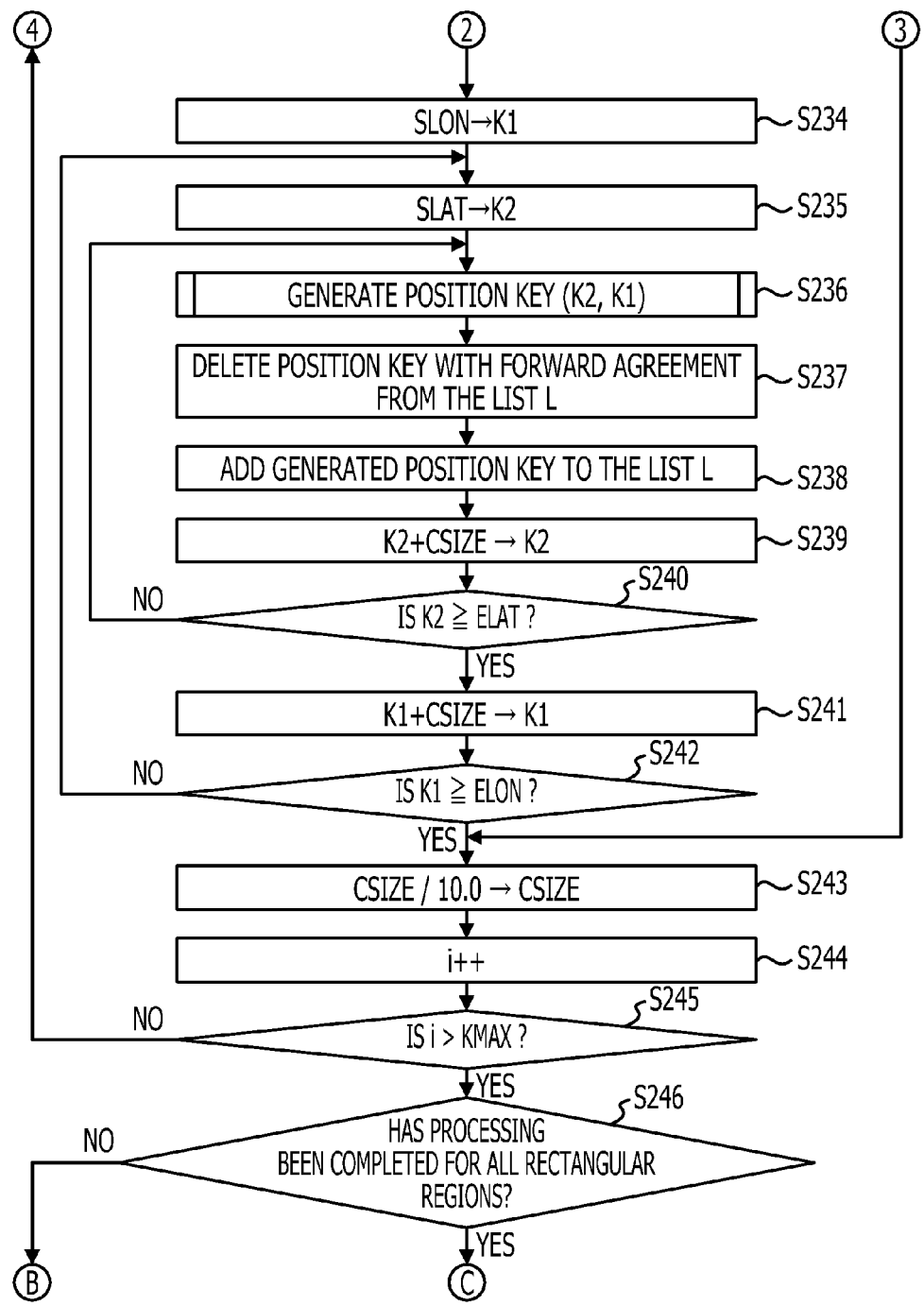

Next, in steps S223 in FIG. 17A through S245 in FIG. 17B, the position key generating section 125 executes processing to combine, of the cell groups generated above, cells that may be combined into a cell with precision of an upper digit. For example, if the rectangular region R5 is the target rectangular region, 100 cell groups included in the rectangular region R5 in FIG. 21 are combined into one cell with 1/10000 degrees. In other words, the rectangular region R5 originally specified with precision of 1/100000 degrees is converted into a cell with precision of 1/10000 degrees. The above processing is executed in steps S223 through S245.

In step S223, the position key generating section 125 assigns 1.0 to a variable CSIZE (S223). The variable CSIZE has a granularity of a cell to be combined (that is, the length of one side). Specifically, first, an attempt is made regarding whether one side may be combined into a cell with 1.0 degree. Hereinafter, the variable CSIZE for a combined cell is referred to as "combined granularity CSIZE". Next, the position key generating section 125 assigns 0 to a variable i (S224). The variable i holds the number of times that steps S225 through S244 have been executed. Note that steps S225 through S244 are repeated the number of times that the effective number of digits KMAX indicates.

Next, the position key generating section 125 assigns the integer portion of a value obtained by dividing the latitude width WLAT by the combined granularity CSIZE to a variable called WLATSIZE (S225). That is to say, for the latitude width WLAT, a size with the combined granularity CSIZE as units is assigned to the variable WLATSIZE. Next, the position key generating section 125 assigns the integer portion of a value obtained by dividing the longitude width WLON by the combined granularity CSIZE to a variable WLONSIZE (S226). That is to say, for the longitude width WLON, a size with the combined granularity CSIZE as units is assigned to the variable WLONSIZE.

Next, the position key generating section 125 determines whether each of the value of the variable WLATSIZE, and the value of the variable WLONSIZE is greater than or equal to 1 (S227, S228). That is to say, whether the target rectangular region has a size that includes a cell of the combined granularity CSIZE is determined.

If either the value of the variable WLATSIZE or the value of the variable WLONSIZE is less than 1 (No in S227 or No in S228), the processing proceeds to step S243, where the position key generating section 125 divides the value of the combined granularity CSIZE by 10.0. Next, the position key generating section 125 adds 1 to the variable i (S244). Next, the position key generating section 125 determines whether the value of the variable i is greater than effective number of digits KMAX" (S245). If the value of the variable i is not greater than the effective number of digits KMAX (No in S245), the position key generating section 125 repeats steps S225 to S245. Accordingly, the value of the combined granularity CSIZE becomes 1/10 of the previous value each time steps S225 to S245 are repeated.

With a process wherein step S225 and thereafter are repeated, if the values of both of the variable WLATSIZE and variable WLONSIZE become greater than or equal to 1 (Yes in S227 and Yes in S228), the position key generating section 125 assigns a value, obtained by truncating below units of the combined granularity CSIZE (below effective digits of combined granularity) of a result of adding combined granularity CSIZE to the latitude of the lower left apex of the target rectangular region, to a variable SLAT (S229). That is to say, the minimum value with units (precision) of the combined granularity CSIZE, that is, is a value greater than or equal to the latitude of the lower left apex of the target rectangular region, is stored in the variable SLAT (hereinafter, "combined lower left latitude SLAT"). For example, if the value of the combined granularity CSIZE is "0.001", and the latitude of the lower left apex of the target rectangular region is "139.1219", "139.122" is assigned to the combined lower left latitude SLAT.

Next, the position key generating section 125 assigns a value, obtained by truncating below the units of the combined granularity CSIZE (below the effective digits of combined granularity) of a result of subtracting combined granularity CSIZE from the latitude of the upper right apex of the target rectangular region, to a variable ELAT (S230). That is to say, the maximum value with units (that is, precision) of the combined granularity CSIZE, that is, a value equal to or smaller than the latitude of the upper right apex of the target rectangular region, is stored in the variable ELAT (hereinafter, "combined upper right latitude ELAT"). For example, if the value of the combined granularity CSIZE is "0.001", and the latitude of the upper right apex of the target rectangular region is "139.1231", "139.123" is assigned to the combined upper right latitude ELAT.

Next, the position key generating section 125 assigns a value obtained by truncating the result, of adding the combined granularity CSIZE to the longitude of the lower left apex of the target rectangular region, below the units of the combined granularity CSIZE (below the effective digits of combined granularity) to a variable SLON (S231). That is to say, the minimum value with units (precision) of the combined granularity CSIZE, that is, a value greater than the longitude of the lower left apex of the target rectangular region, is stored in the variable SLON (hereinafter, "combined lower left longitude SLON"). For example, if the value of the combined granularity CSIZE is "0.001", and the longitude of the lower left apex of the target rectangular region is "35.5609", "35.561" is assigned to the combined lower left longitude SLON.

Next, the position key generating section 125 assigns a value obtained by truncating the longitude of the upper right apex of the target rectangular region below the units of the combined granularity CSIZE (below the effective digits of combined granularity) to a variable ELON (S232). That is to say, the maximum value with units of the combined granularity CSIZE, that is, a value equal to or smaller than the longitude of the upper right apex of the target rectangular region, is stored in the variable ELON (hereinafter, "combined upper right longitude ELON"). For example, if the value of the combined granularity CSIZE is "0.001", and the longitude of the upper right apex of the target rectangular region is "35.5621", "35.562" is assigned to the combined upper right longitude ELON.

Next, the position key generating section 125 determines whether the value of subtracting combined lower left latitude SLAT from the combined upper right latitude ELAT is 0, or whether the value of subtracting combined lower left longitude SLON from the combined upper right longitude ELON is 0 (S233). If this determination is positive (Yes in S233), the processing proceeds to step S243. If this determination is negative (No in S233), a rectangular region with (combined lower left latitude SLAT, combined lower left longitude SLON) being taken as the lower left apex and with (combined upper right latitude ELAT, combined upper right longitude ELON) being taken as the upper right apex includes one or more cells with units of the combined granularity CSIZE. Therefore, in step S234 and thereafter, the position key generating section 125 combines cell groups included in this rectangular region to form a cell with units of the combined granularity CSIZE.

In step S234, the position key generating section 125 assigns the combined lower left longitude SLON to a variable K1 (hereinafter, "target lower left longitude K1"). Next, the position key generating section 125 assigns the combined lower left latitude SLAT to a variable K2 (hereinafter, "target lower left latitude K2") (S235). Next, the position key generating section 125 performs generation processing (FIG. 15) of a position key based on the target lower left latitude K2 and target lower left longitude K1 (S236). Next, the position key generating section 125 deletes a position key group forward-agreeing with the generated position key from the list L (S237). That is to say, the position keys of a cell group included in a cell that the generated position key indicates are deleted from the list L. Next, the position key generating section 125 adds the generated position key to the list L (S238).

Next, the position key generating section 125 adds the combined granularity CSIZE to the target lower left latitude K2 (S239). Next, the position key generating section 125 determines whether the target lower left latitude K2 reaches the combined upper right latitude ELAT (S240). If the target lower left latitude K2 does not reach the combined upper right latitude ELAT (No in S240), the position key generating section 125 repeats step S236 to S240.

If the target lower left latitude K2 reaches the combined upper right latitude ELAT (Yes in S240), the position key generating section 125 adds the combined granularity CSIZE to the target lower left longitude K1 (S241). Next, the position key generating section 125 determines whether the target lower left longitude K1 reaches the combined upper right longitude ELON (S242). If the target lower left longitude K1 does not reach the combined upper right longitude ELON (No in S242), the position key generating section 125 repeats step S235 to S242.

If the target lower left longitude K1 reaches the combined upper right longitude ELON (Yes in S242), the position key generating section 125 executes the above steps S243 through S245. Unification into a cell of the combined granularity CSIZE is performed while changing the combined granularity CSIZE to one order of precision higher than the precision of the latitude and longitude of the target rectangular region.

Upon steps S201 through S246 being executed for all of the rectangular regions to be processed (Yes in S246), of cell groups included in the target rectangular region, cell groups that may be combined into an upper digit are combined into an upper digit cell group.

However, for example, although a rectangular region with both the rectangular regions R2 and R4 in FIG. 21 may be combined into one rectangular region with units of 1/1000 degrees, these regions are not combined in steps S201 through S246. This is because in steps S201 through S246, processing is performed for each specified rectangular region, and accordingly, integration of cell groups straddling a rectangular region is not performed. In other words, rectangular regions exceeding a certain rectangular region are not combined.

Figure 18:
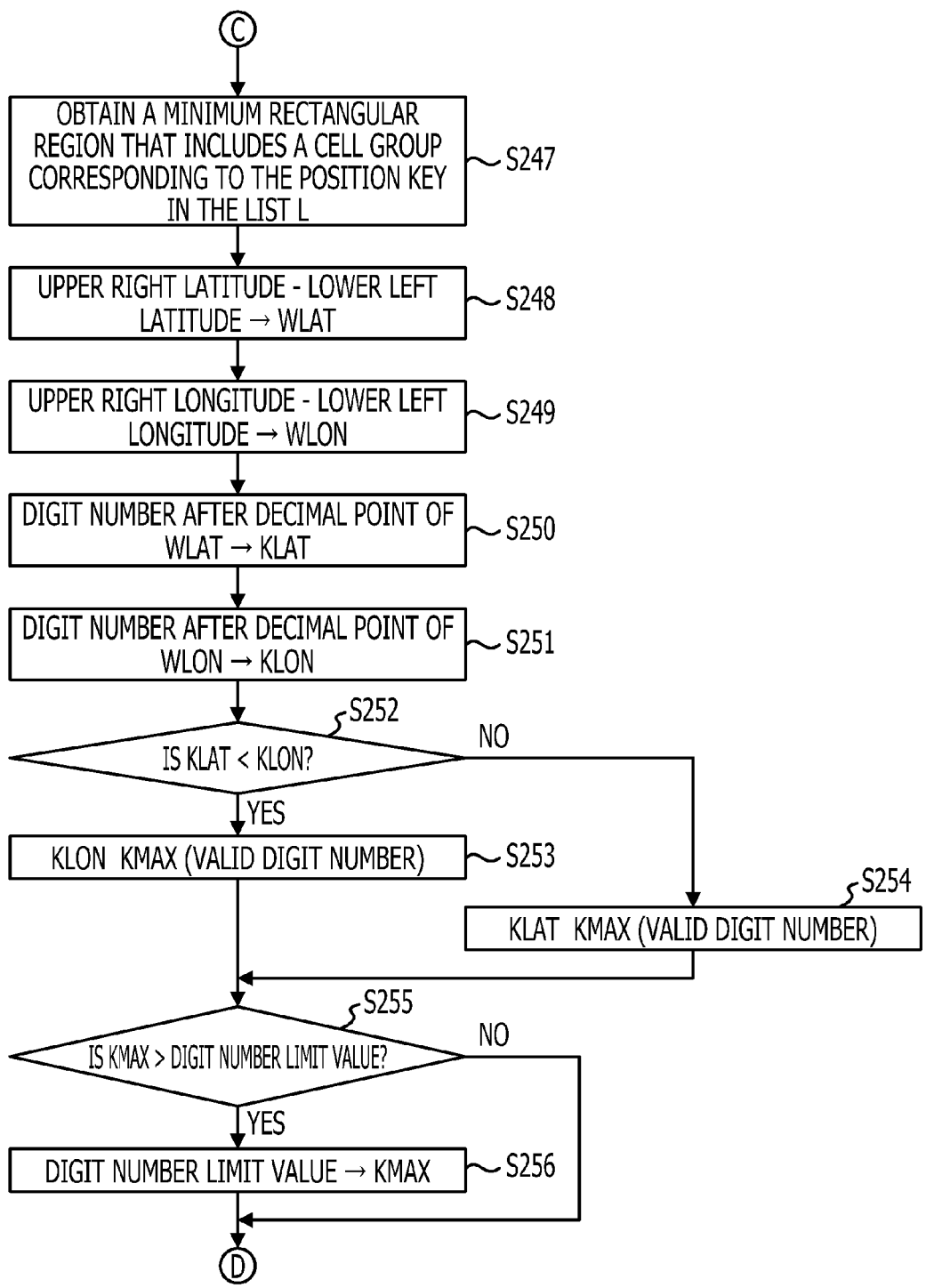
FIG. 18 is a flowchart for describing an example of a procedure of generation processing for the position key of each normalized cell making up a rectangular region group.

Therefore, the position key generating section 125 executes integration processing for cell groups that straddle a specified rectangular region in step S247 and thereafter in FIG. 18.

In step S247, the position key generating section 125 obtains the minimum rectangular region that includes all of the cell groups corresponding to the position keys included in the list L. That is to say, the minimum rectangular region that includes all of the specified rectangular regions is obtained.

Figure 22:
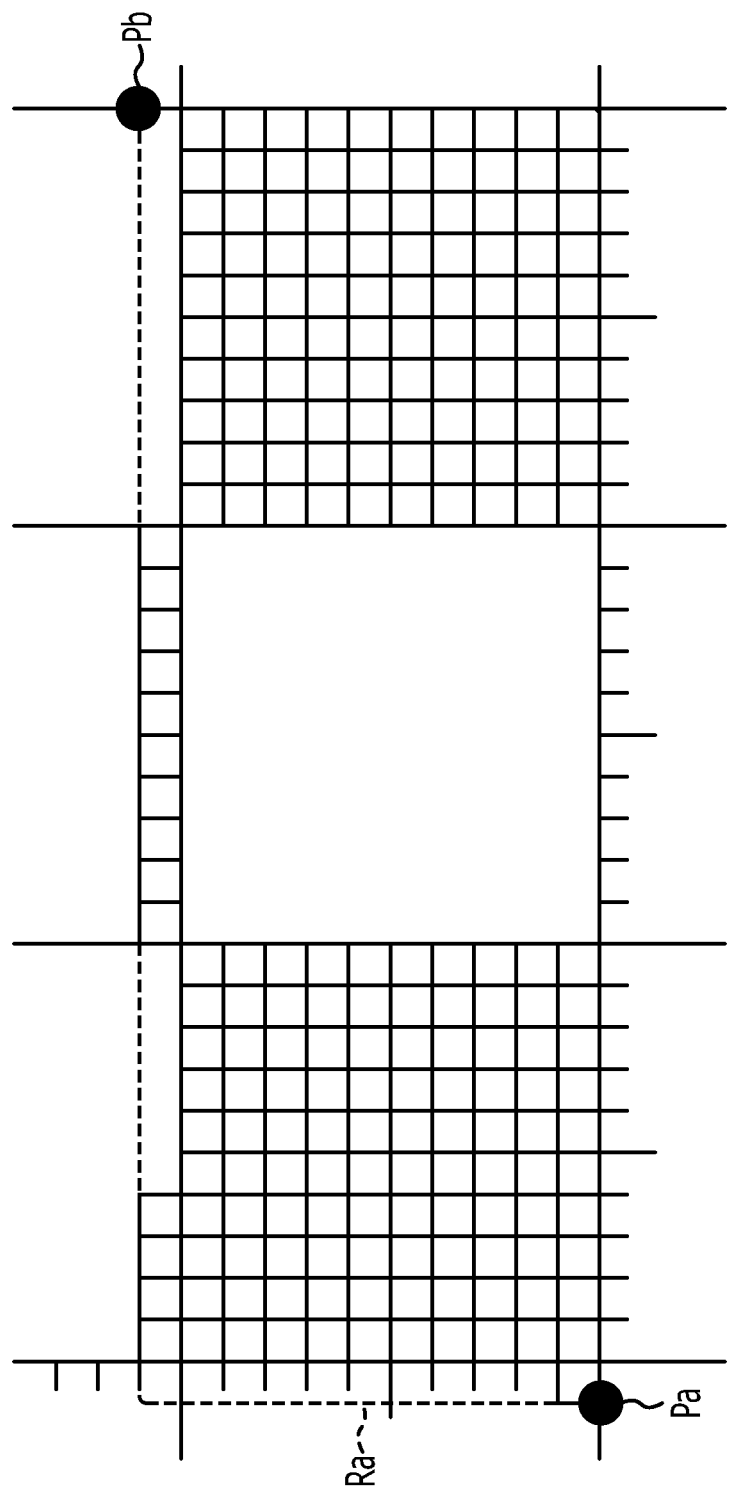
FIG. 22 is a diagram for describing a minimal rectangular region that includes all of specified rectangular regions.

FIG. 22 is a diagram for describing the minimum rectangular region that includes all of the specified rectangular regions. As illustrated in the drawing, the minimum rectangular region including specified rectangular regions is a rectangular region Ra (hereinafter, "inclusion region Ra"). Inclusion region Ra has the minimum latitude and longitude of the lower left apex of the specified rectangular regions as a lower left apex Pa, and the maximum latitude and longitude of the upper right apex of the specified rectangular regions as an upper right apex Pb. In step S247, the latitude and longitude of the lower left apex Pa, and the latitude and longitude of the upper right apex Pb are obtained.

Figure 16A:
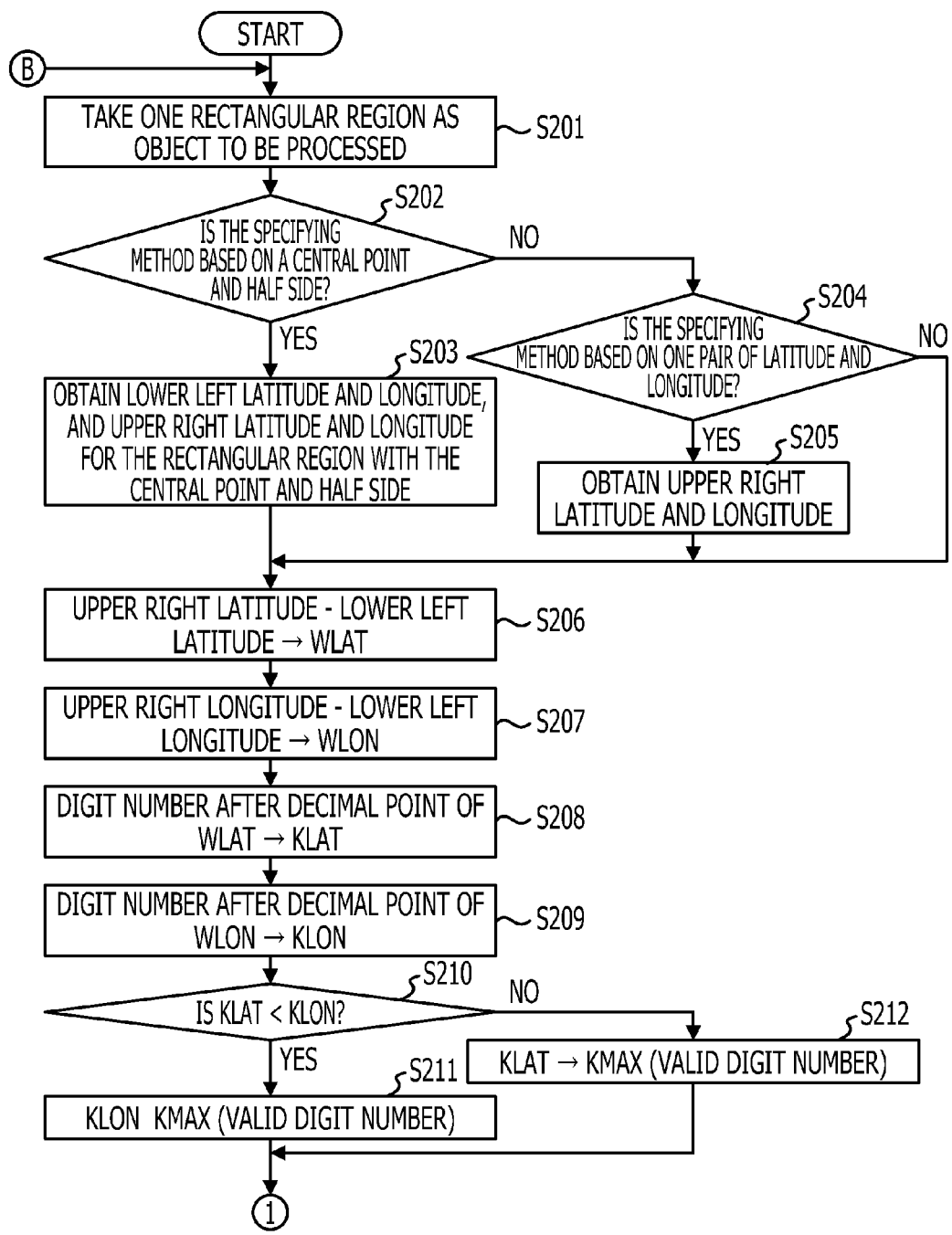
FIGS. 16A and 16B are flowcharts for describing an example of a procedure for generation processing for the position key of each normalized cell making up a rectangular region group.
Figure 16B:
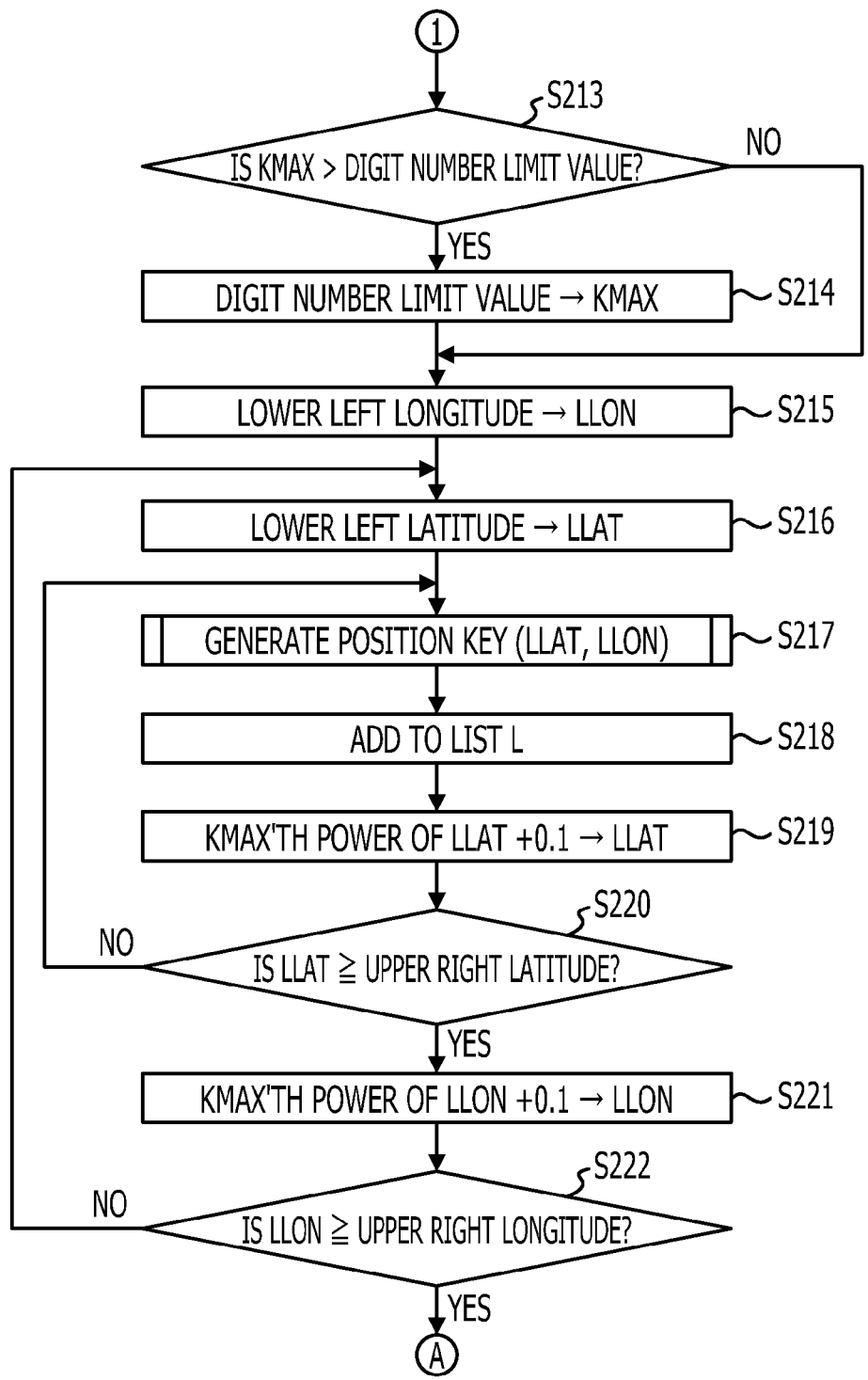
Figure 19A:
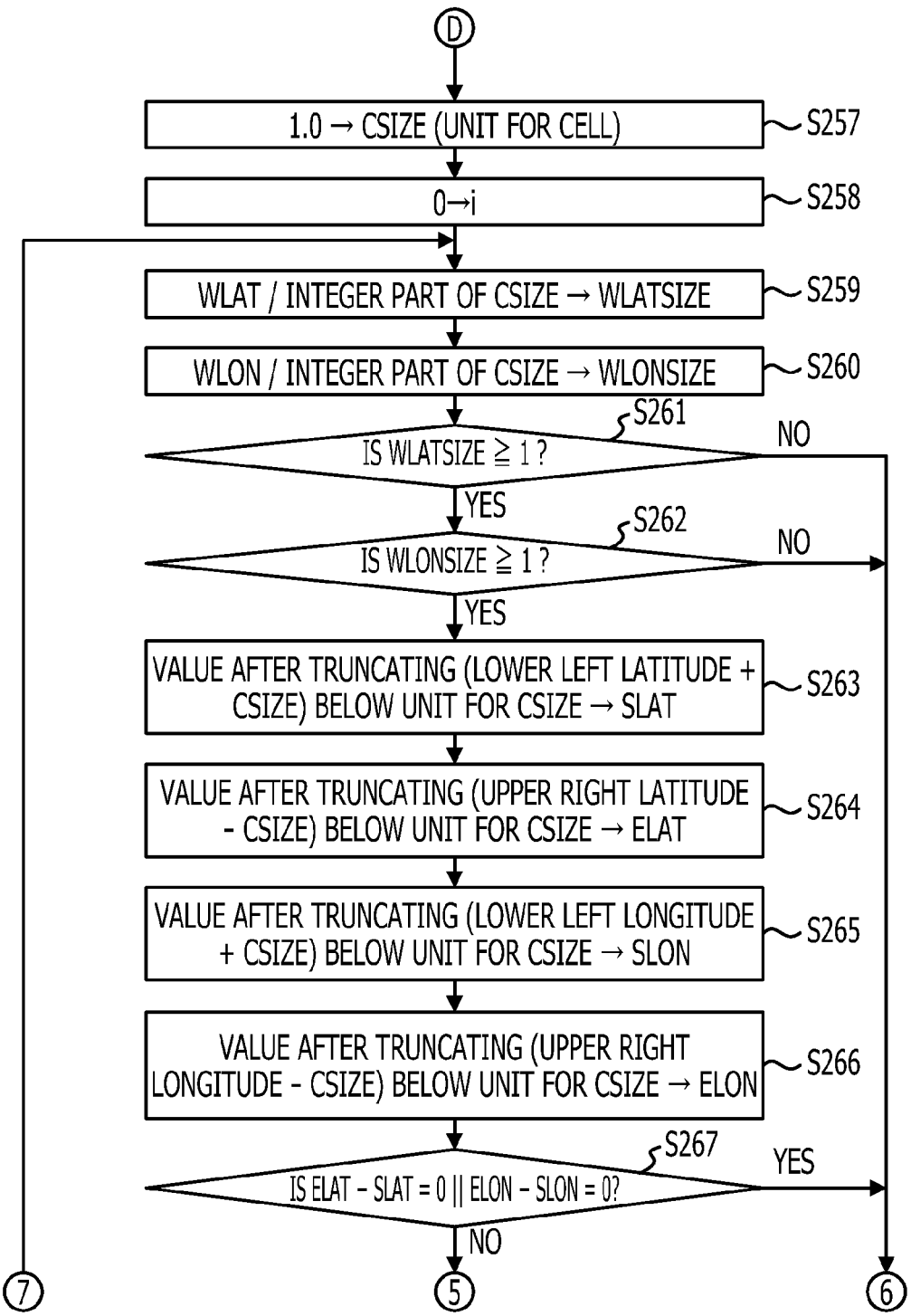
FIGS. 19A and 19B are flowcharts for describing an example of a procedure of generation processing for the position key of each normalized cell making up a rectangular region group.
Figure 19B:
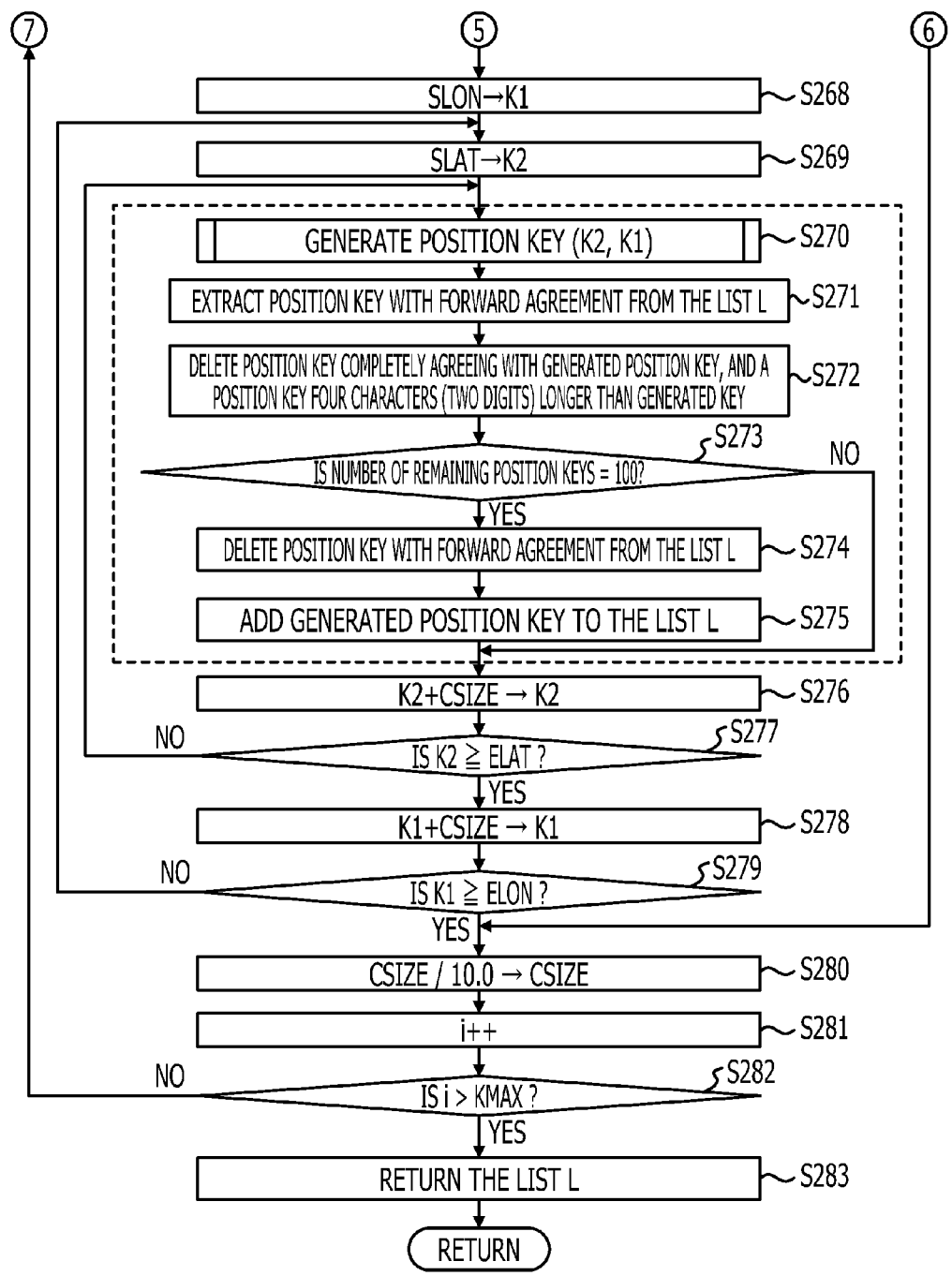
Figure 23:
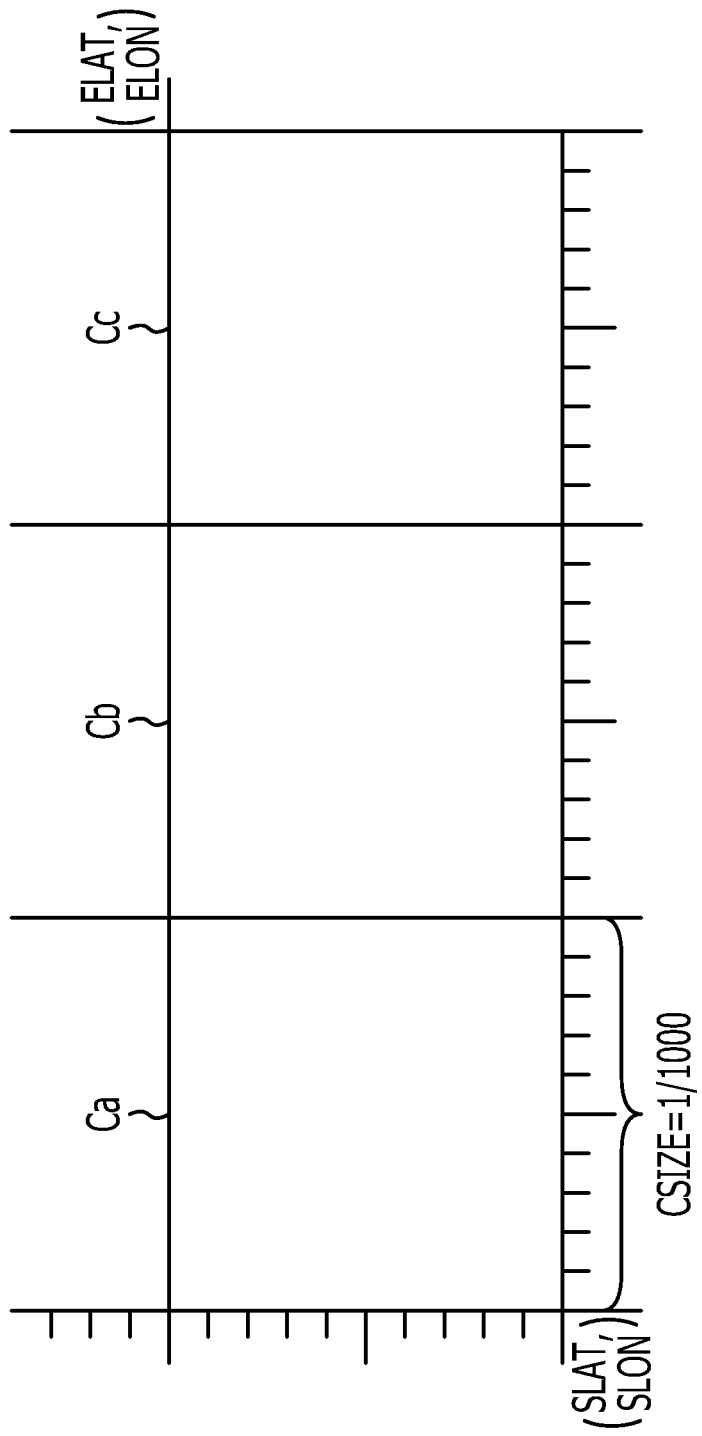
FIG. 23 is a diagram illustrating an example of cells in combined granularity of CSIZE units in an inclusion region.

In subsequent steps S248 in FIG. 18 through S282 in FIG. 19B, the same processing as with step S206 in FIG. 16A through step S245 in FIG. 17B is executed for the inclusion region Ra except for the steps surrounded with dashed lines in FIG. 19B. Accordingly, if No has been determined in step S267 in FIG. 19A, a state as illustrated in FIG. 23 has been determined. If No has been determined in step S267 in FIG. 19A, this corresponds to a case where No has been determined in step S233 in FIG. 17A.

FIG. 23 is a diagram illustrating an example of cells in units of the combined granularity CSIZE determined in an inclusion region. As illustrated in the drawing, it is determined that three cells Ca, Cb, and Cc in units of 1/1000 degrees are included within a rectangular region with (combined lower left latitude SLAT, combined lower left longitude SLON) as the lower left apex, and with (combined upper right latitude ELAT, combined upper right longitude ELON) as the upper right apex.

Accordingly, determination is made for each of these three cells regarding whether integration into the cells may be performed for cell groups included in the cells. Now, the steps surrounded with dashed lines in FIG. 19B will be described.

In step S270, the position key generating section 125 generates a position key based on the target lower left latitude K2 and target lower left longitude K1 (FIG. 15). With the example in FIG. 23, the value of the target lower left latitude K2 when step S270 is first executed is the value of the combined lower left latitude SLAT, and the value of the target lower left longitude K1 is the value of the combined lower left longitude SLON. That is to say, the target lower left latitude K2 and target lower left longitude K1 are the latitude and longitude of the lower left apex of the cell Ca.

Next, the position key generating section 125 extracts a position key group forward-agreeing with the generated position key from the list L (S271). With the present embodiment, if another position key forward-agreeing with one position key, this means that a cell associated with the other position key is included in the cell associated with the one position key. Accordingly, a position key group for a cell group included in the cell Ca is extracted. Next, the position key generating section 125 removes a position key that completely agrees with the generated position key as well as a position key that is four or more characters longer than the generated position key from the position key group extracted in step S271 (S272). Next, the position key generating section 125 determines whether the number of remaining position keys in the group is 100 (S273). That is to say, if combining a cell group one digit higher in precision (one digit of granularity lower) than the cell Ca into the cell Ca, 10×10=100 cells one digit precision higher than the cell Ca have to be included in the cell Ca after combining. Accordingly, whether there are 100 cell groups within the cell Ca is determined.

Note that a position key four characters longer than the generated position key in step S272 is a position key with precision at least two digits higher than a cell corresponding to the generated position key, in other words, a position key of a cell with granularity two digits smaller than the generated position key. The reason to remove a cell with precision at least two digits higher is, for example, in light of a case where there are 99 cells one digit higher in precision, and there is at least one cell two digits higher in precision in the region of the remaining one cell. Tentatively, if there is one cell at least two digits higher in precision, a determination is made that 100 cells are included in the cell to be combined. That is to say, in order to obtain the number of cell groups one digit higher in precision than the cell to be combined, a position key four characters longer than the generated position key is removed. In addition, a cell associated with a position key that completely agrees with the generated position key is also not a cell that is one digit higher in precision than the cell to be combined. Accordingly, a position key that completely agrees with the generated position key is also removed.

If the number of the remaining keys in the position key group is 100 (Yes in S273), the position key generating section 125 deletes a position key that forward-agrees with the generated position key from the list L (S274). Next, the position key generating section 125 adds the generated position key to the list L (S275). If the number of the remaining position key groups is not 100 (No in S273), steps S274 and S275 are not executed.

Figure 24:
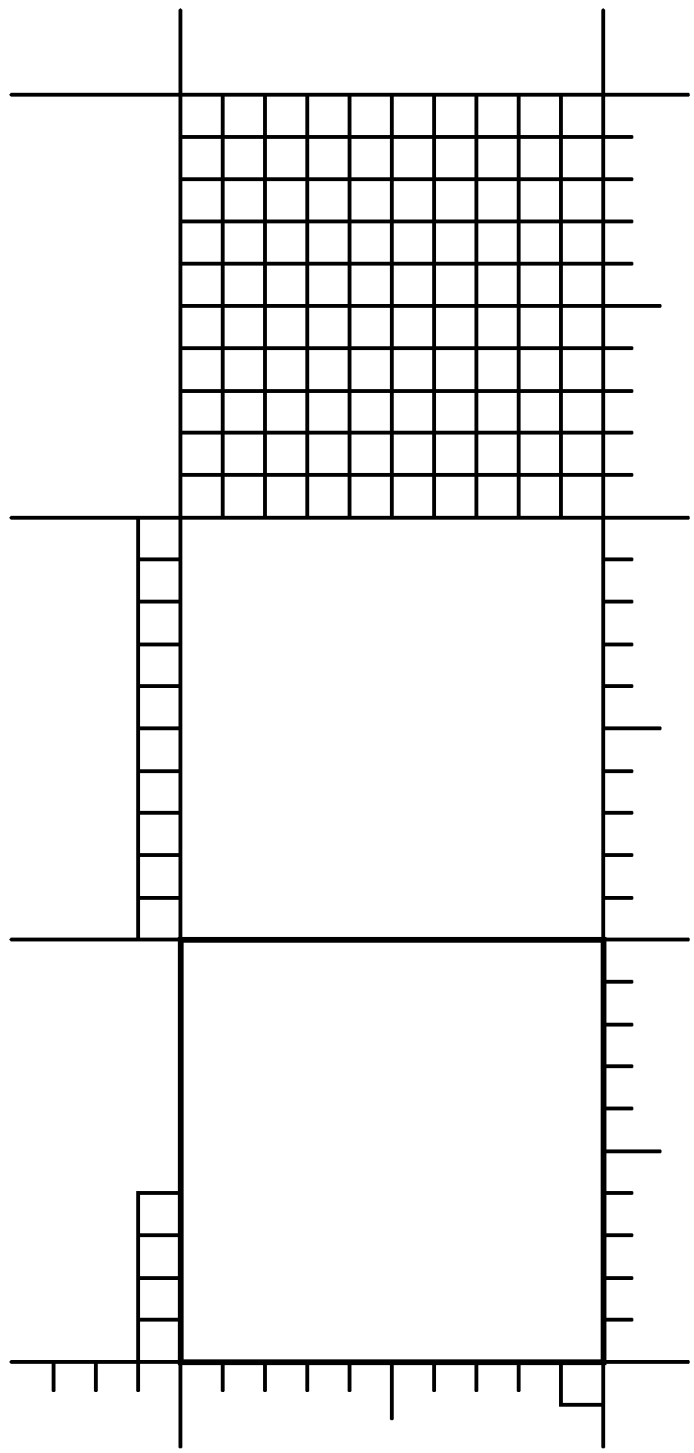
FIG. 24 is a diagram illustrating an example of integration results of cell groups that straddle a specified rectangular region.

According to processing as described above, the cell groups illustrated in FIG. 22 are combined such as illustrated in FIG. 24.

FIG. 24 is a diagram illustrating an example of a result of combining cell groups that straddle a specified rectangular region. As illustrated in the drawing, 100 cell groups with $1/10000$ degrees included in the cell Ca in FIG. 23 are combined into the one cell Ca. However, the number of cell groups with $1/10000$ degrees included in the cell Cc is 99, and accordingly, the cell groups are not combined into the cell Cc.

As described above, according to the processing in FIG. 16 through FIG. 19, the rectangular region group illustrated in FIG. 20 is divided into cell groups such as illustrated in FIG. 24.

Note that, in step S283, the position key generating section 125 returns the list L, which includes the position key groups that serve as the processing results.

Figure 25:
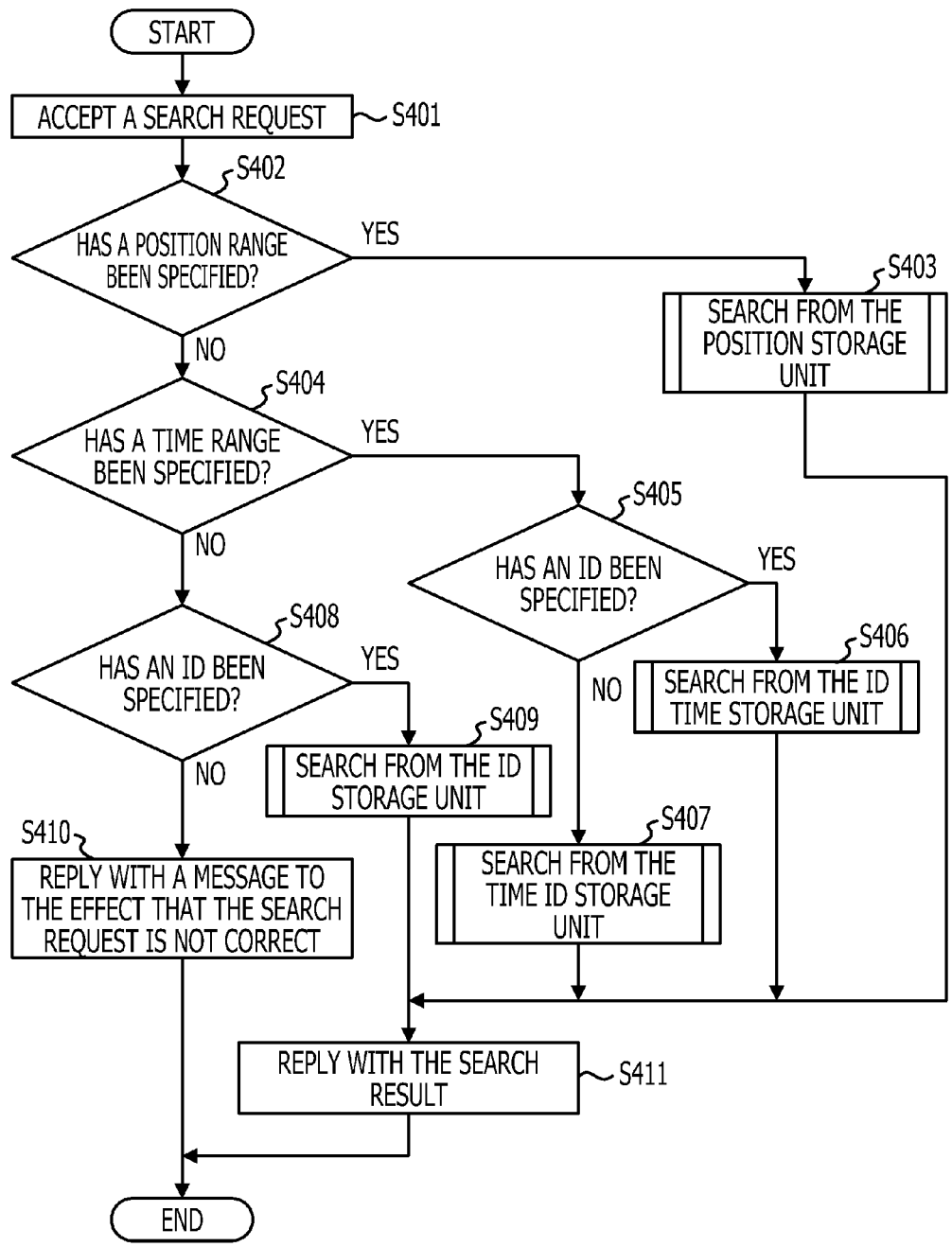
FIG. 25 is a flowchart for describing an example of a procedure of search processing for mobile information.

Next, mobile information search processing will be described. FIG. 25 is a flowchart for describing an example of a processing procedure of mobile information search processing.

In step S401, the search request accepting unit 127 accepts a mobile information search request from the service section 11. For example, in response to a search request from the mobile terminal 20 or a fixed terminal that is not illustrated, the service section 11 inputs the search request to the search request accepting unit 127.

The search request specifies information that indicates a search range for the position of mobile information (hereinafter, "position range"), a mobile ID, a search range for time (hereinafter, "time range"), or a combination of a time range and a mobile ID.

The position range is specified with the same format as with the size information of a mobile device. That is to say, the position range is specified with a group of rectangular regions. A specifying method for each of the rectangular regions is also the same as with size information. Accordingly, the position range is represented with a data structure such as illustrated in FIG. 6.

The meaning of a position range is something that the position range includes, that is, information that indicates whether to search for something included in the position range, or to search for something that includes this position range, in other words, information that indicates whether to search for something that includes the position range. For example, if searching for information of another mobile device included in the range of a certain mobile device, this case corresponds to the first kind of search. Also, for example, if performing a search to identify a mobile device within a given XX area, this case corresponds to the second kind of search.

Next, the search request accepting section 127 determines whether a position range has been specified in the search request (S402). If a position range has been specified (Yes in S402), search processing of the position storage unit 134 is executed (S403).

If no position range has been specified (No in S402), the search request accepting section 127 determines whether a time range has been specified in the search request (S404). If a time range has been specified (Yes in S404), the search request accepting section 127 determines whether a mobile ID has been specified in the search request (S405). If a mobile ID has been specified (Yes in S405), search processing of the ID time storage unit is executed (S406). If no mobile ID has been specified (No in S405), search processing of the time ID storage unit 132 is executed (S407).

If no time range has been specified (No in S404), the search request accepting section 127 determines whether a mobile ID has been specified in the search request (S408). If a mobile ID has been specified (Yes in S408), search processing of the ID storage unit 133 is executed (S409). If no mobile ID has been specified (No. in S408), the search request accepting unit 127 replies to the service section 11 with a message to the effect that the search request specification is not correct (S410).

If the search processing in step S403, S406, S407, or S409 has been executed, the searching section 129 replies to the service section 11 with data indicting search results (result data) to be generated by the searching processing (S411).

Figure 26:
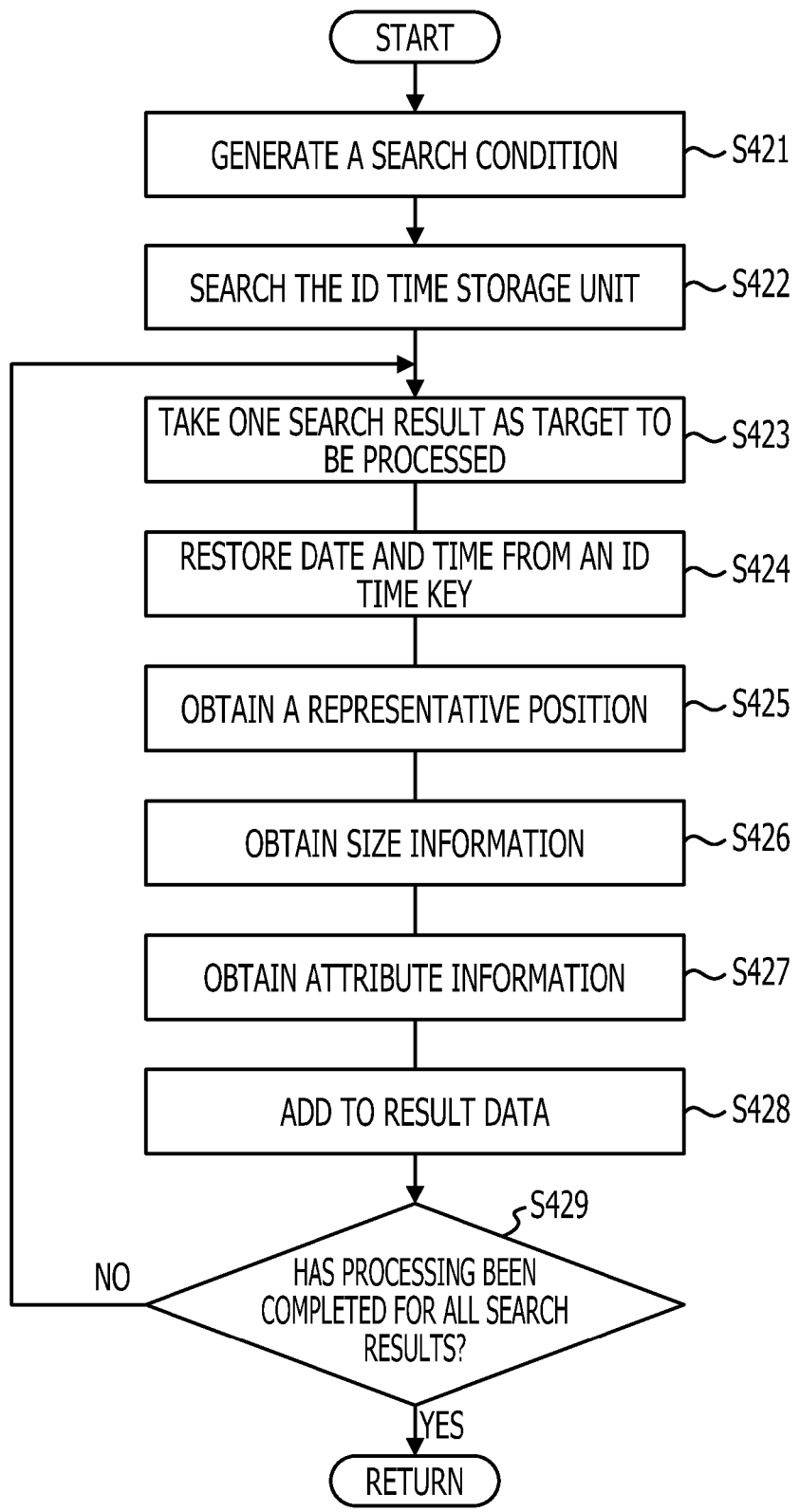
FIG. 26 is a flowchart for describing an example of a procedure of search processing of the ID time storage unit.

Next, the details of step S406 will be described. FIG. 26 is a flowchart for describing an example of a procedure for search processing of the ID time storage unit 131.

In step S421, the search condition generating section 128 generates a search condition based on a time range and a mobile ID specified in the search request. Specifically, the time range specifies the start date and time as well as the end date and time of the time range. The search condition generating section 128 uses the ID time key generating section 122 to generate an ID time key for the start date and time (hereinafter, "start ID time key") based on the mobile ID and start date and time, and to generate an ID time key for the end date and time (hereinafter, "end ID time key"), based on the mobile device ID and end date and time. The method for generating an ID time key is as described in step S111 in FIG. 7.

Next, the searching section 129 performs range search of the ID time storage unit 131 based on the start ID time key and end ID time key (S422). The range search searches for an ID time key included in a range between the end ID time key and the start ID time key, and a value correlated with the ID time key. In the present embodiment, an ID time key is generated so that later date and time has a smaller value than an earlier date and time, and accordingly, the range is stipulated between the end ID time key and the start ID time key.

Next, the searching section 129 takes a search result out of the search result group as the target to be processed (S423). The search result mentioned here is a set of an ID time key and a value. Next, the searching section 129 restores date and time from the ID time key of the search result of the target to be processed (S424). Specifically, a character string from which the mobile ID of the head portion of the ID time key has been removed is converted into a numeric value. Date and time that the ID time key indicates is restored by adding a value, obtained by subtracting the numeric value from the maximum value of an integer-type variable, to the reference date and time.

Next, the searching section 129 obtains the latitude and longitude of the representative position from the values of the search result of the target to be processed (S425). Next, the searching section 129 obtains size information from the values of the search result of the target to be processed (S426). Next, the searching section 129 obtains attribute information from the values of the search result of the target to be processed (S427). Next, the searching section 129 adds information obtained in steps S424 through S427 to result data as one entry (S428).

Upon steps S423 through S428 being executed for all of the search results in step S422 (Yes in S428), the processing in FIG. 26 ends. The result data at the end of the procedure in FIG. 26 is returned to the service section 11 in step S411 in FIG. 25.

With the search of the ID time storage unit 131 as described above, for example, a history of positions and date and time, and so forth may be searched at high speed as a mobile history in an arbitrary time range for a particular mobile device.

Figure 27:
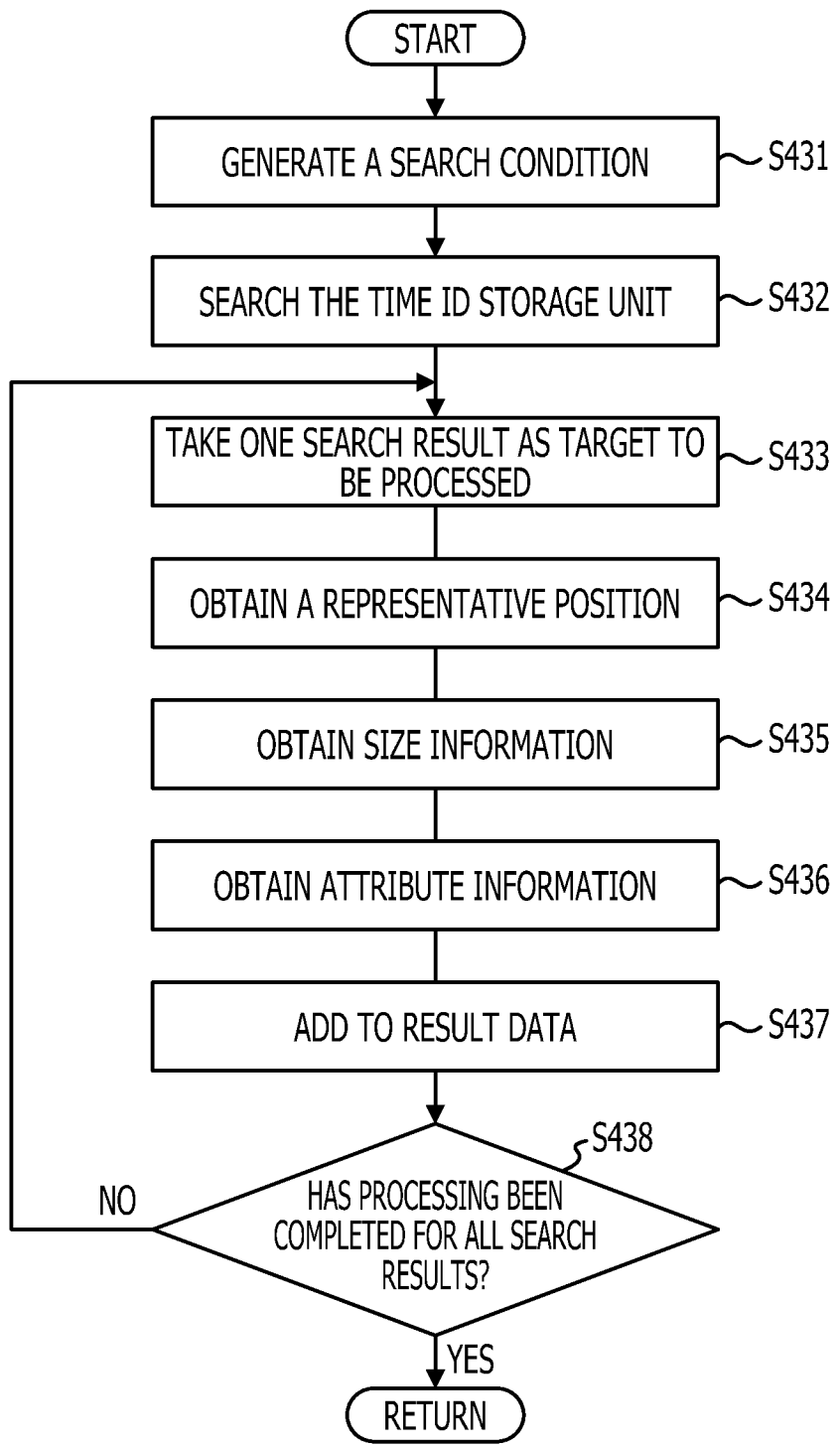
FIG. 27 is a flowchart for describing an example of a procedure of search processing of the time ID storage unit.

Next, the details of step S407 in FIG. 25 will be described. FIG. 27 is a flowchart for describing an example of a procedure for search processing of the time ID storage unit 132.

In step S431, the search condition generating section 128 generates a search condition based on the time range specified in the search request. Specifically, the search condition generating section 128 generates a start key and an end key. The start key is a revised value of the start date and time of the time range that has been taken as a character string. The end key is revised value of the end date and time of the time range that has been taken as a character string. A revised value mentioned here is a value obtained by the same method as when revising a date and time using the reference date and time and the maximum value of an integer-type when generating a time ID key.

Next, the searching section 129 performs a range search of the ID time storage unit 131 based on the start key and end key (S432). With this range search, one portion ahead is searched. In other words, a portion corresponding to the date and time is searched for a time ID key included in a range that is greater than or equal to the end key and less than or equal to the start key, and a value that corresponds to this time ID key.

Steps S433 to S438 are similar to steps S423 to S429 in FIG. 26. However, processing corresponding to step S424 may be left unexecuted. The result data at the end of the processing procedure in FIG. 27 is returned to the service section 11 in step S411 in FIG. 25.

According to the search of the time ID storage unit 132 as described above, for example, a history of positions and date and time, and so forth may be searched at high speed as a mobile history of each mobile device in an arbitrary time range. Now, let us say that a mobile ID is included in attribute information that the time ID storage unit 132 stores (see FIG. 10). Tentatively, if no mobile ID is included in the attribute information, an arrangement may be made wherein a mobile ID is extracted from the time ID key and added to the result data for steps S433 to S438.

Note that, via a search of the ID time storage unit 131, it is difficult to search a history of positions and date and time in an arbitrary time range at high speed for a particular mobile device. If using the ID time storage unit 131, an ID time key, in which a mobile ID has been added to the head, is registered as a key. Accordingly, in order to perform a search at high speed wherein the time range has been determined but no mobile ID has been determined, a range search is desired to be performed for a backward portion of the ID time key. However, such a search method is difficult with a KVS. Accordingly, this may be a reason why the time ID storage unit 132 exists.

Figure 28:
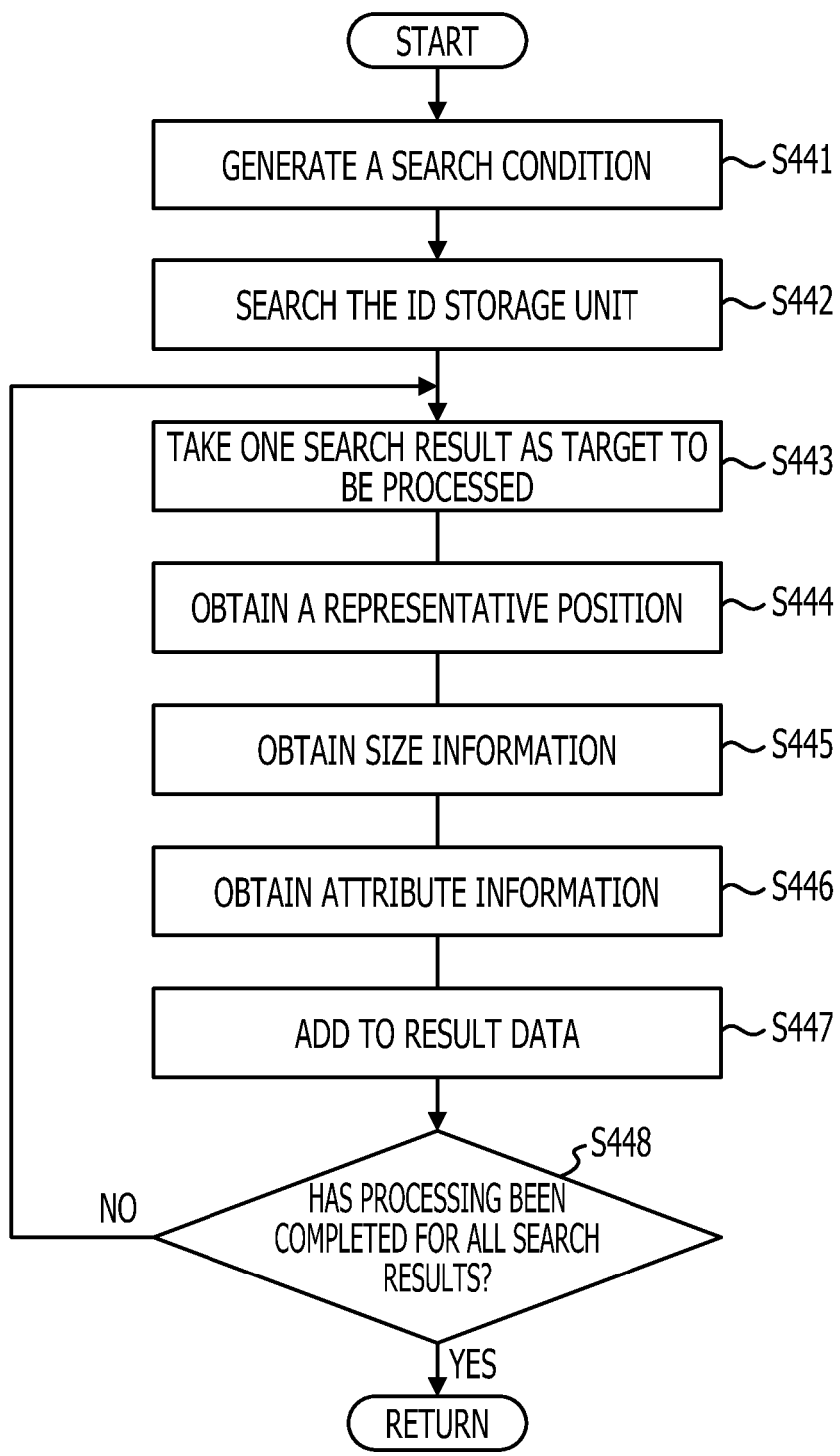
FIG. 28 is a flowchart for describing an example of a procedure of search processing of the ID storage unit.

Next, the details of step S409 in FIG. 25 will be described. FIG. 28 is a flowchart for describing an example of a procedure for search processing of the ID storage unit.

In step S441, the search condition generating section 128 uses the ID key generating section 124 to generate an ID key for a mobile ID included in the search request. This ID key becomes a search condition for the ID storage unit 133.

Next, the searching section 129 searches the ID storage unit 133 for both an ID key that agrees with the ID key serving as a search condition and a value that corresponds to the ID key (S442).

Steps S443 to S448 are similar to steps S423 to S429 in FIG. 26. However, processing corresponding to step S424 may be left unexecuted. The result data at the end of the procedure in FIG. 28 is returned to the service section 11 in step S411 in FIG. 25.

According to the search of the ID storage unit 133 as described above, for a particular mobile device, in a state in which the time range is not restricted, a history of positions and date and time and so forth may be searched at high speed as a mobile device history, for example.

Figure 29:
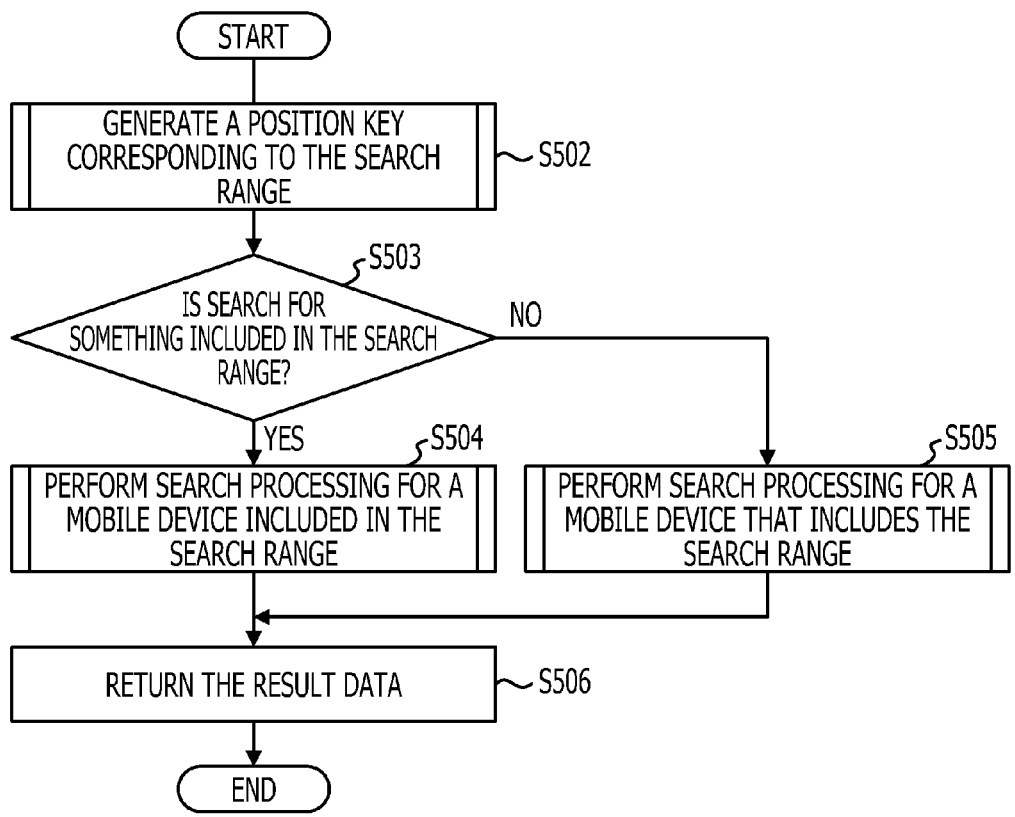
FIG. 29 is a flowchart for describing an example of a procedure of search processing of the position storage unit.

Next, the details of step S403 in FIG. 25 will be described. FIG. 29 is a flowchart for describing an example of a procedure for search processing of the position storage unit. Referring to a search range below means a search range for positions (position range).

In step S502, the search condition generating section 128 generates one or more position keys that correspond to a search range specified in the search request. Specifically, a group of latitude and longitude of the lower left apex of each cell is generated if the search range is divided into cells according to the precision of the latitude and longitude specified in the search request. Also, if a cell with a digit higher than the precision of latitude and longitude specified in the search request is included in the search range, cell groups of lower digits are replaced with this upper digit cell. That is to say, cell groups are standardized. Accordingly, the precision of each position key after conversion, that is, the effective number of digits below the decimal point, are not necessarily common.

The generated position key is used in a search. In order to avoid confusion between the generated position key and a position key that serves as searched information registered in the position storage unit 134, the generated position key will hereinafter be referred to as "search key". Note that, as will be described later, search keys included in a group of search keys to be generated differ according to the meaning of a search range specified in the search request.

Next, the search condition generating section 128 determines based on the meaning of a search range specified in the search request whether the search range is a search for a mobile device that the search range includes, or a search for a mobile device in which the search range is included (S503). If a search for a mobile device that the search range includes (Yes in S503), the searching section 129 executes search processing for a mobile device that the search range includes (S504). If a search for a mobile device in which the search range is included (No in S503), the searching section 129 executes search processing for a mobile device in which the search range is included (S505). Next, the searching section 129 returns the result data to the service section 11 as a search result (S506). The result data mentioned here is data in which mobile information from a search result is stored as part of the search processing in step S504 or S505. Thereafter, the search result is returned by the service section 11 to the mobile terminal 20 or a fixed terminal which is not illustrated or the like, which is the source of the search request. However, the search result does not have to be returned without change. The service section 11 may perform a process on the search result, or, based on this search result, perform further searching and so forth with respect to the low-level section 12, and may return a result to the search request source.

Figure 30:
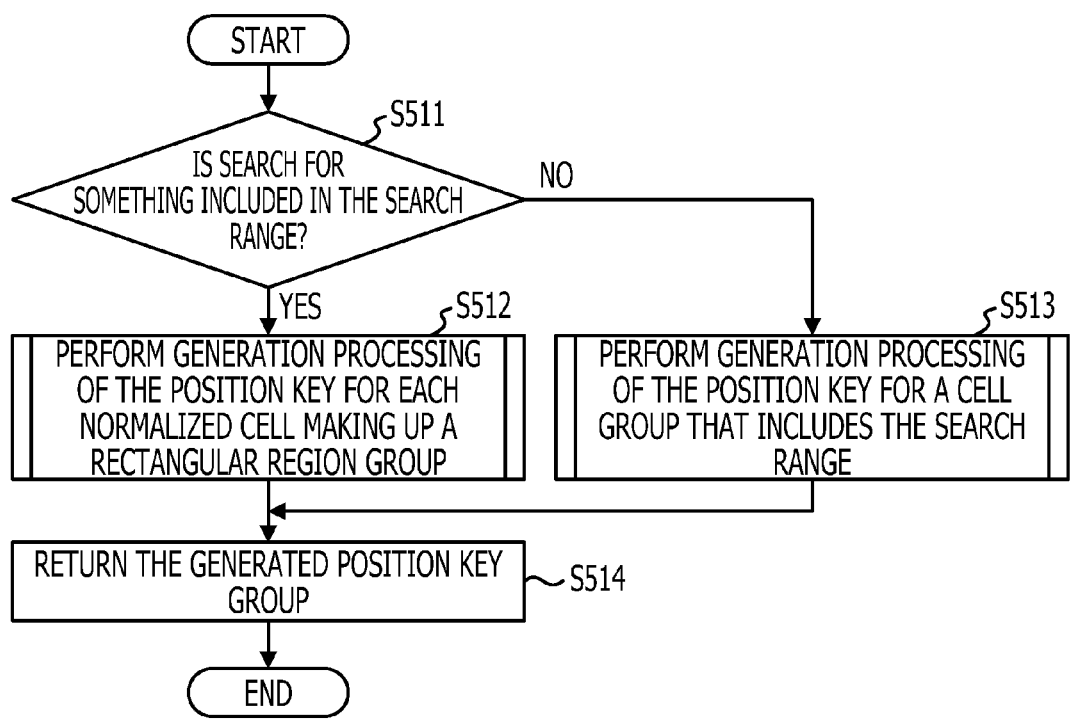
FIG. 30 is a flowchart for describing an example of a procedure of generation processing of a search key corresponding to a search range.

Next, the details of step S502 will be described. FIG. 30 is a flowchart for describing an example of a procedure for generation processing of a search key corresponding to a search range.

In step S511, the search condition generating section 128 determines, based on the meaning of a search range specified in the search request, whether the search range is a search for a mobile device that the search range includes, or a search for a mobile device in which the search range is included. If a search for a mobile device that the search range includes (Yes in S511), the position key generating section 125 executes generation processing of the position key for each normalized cell making up a group of rectangular regions according to the search range (S512). That is to say, with regard to a group of rectangular regions for the search range, processing described in FIG. 16 through FIG. 19 is executed. As a result, a position key is generated for each cell included in a normalized cell group making up a rectangular region according to the search range, and stored in the list L. This position key is used as a search key for searching for a mobile device that the search range includes.

If a search for a mobile device in which the search range is included (No in S511), the search condition generating section 128 executes generation processing of a position key for searching for a mobile device in which the search range is included (S513). The generated position key is used as a search key to search for a mobile device in which the search range is included.

Next, the search condition generating section 128 returns the list L in which the position key group generated in step S512 or S513 is stored (S514). The generated position key group is a group of search keys.

Figure 31:
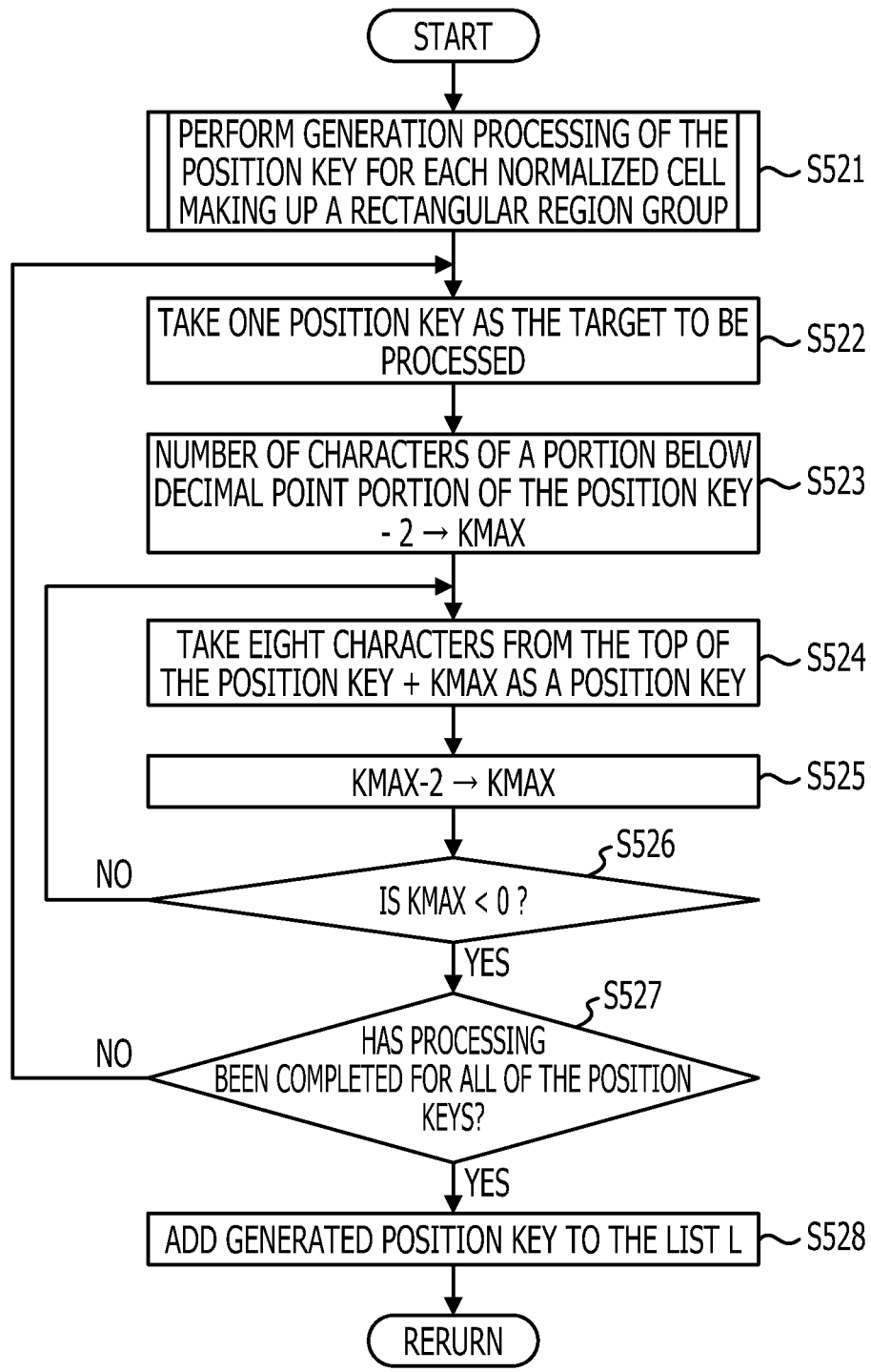
FIG. 31 is a flowchart for describing an example of a procedure for generation processing of a position key for searching for a mobile device that includes a search range.

Next, the details of step S513 in FIG. 30 will be described. FIG. 31 is a flowchart for describing an example of a procedure for generation processing of a position key for searching for a mobile device in which a search range is included.

In step S521, the position key generating section 125 executes generation processing of a position key for each normalized cell making up a group of rectangular regions according to the search range. That is to say, for a group of rectangular regions according to the search range, processing described in FIG. 16 through FIG. 19 is executed. As a result, a position key is generated for each cell included in a normalized cell group making up a rectangular region according to the search range, and stored in the list L.

Next, the search condition generating section 128 takes one position key of a position key group included in the list L (hereinafter, "target key") as the target to be processed (S522). Next, the search condition generating section 128 assigns the number of characters of a portion below a decimal point of the target key −2 to a variable KMAX (S523). With the position keys according to the present embodiment, an integer portion is made up of six characters (three characters of latitude+three characters of longitude), and a sign portion (for example, "++") is made up of two characters. Accordingly, a value obtained by subtracting 8 from the number of characters of a target key, and further subtracting 2 therefrom is substituted for the variable KMAX.

Next, the search condition generating section 128 records a position key that is a character string of the number of characters from the head of the target key to 8+the variable KMAX in a storage region for work (work region) (S524). Accordingly, first, a position key from which two characters worth of the tail end of the target key have been removed is added to the work region. Note that the position key from which the two characters worth of the tail end have been removed is a position key corresponding to the latitude and longitude after one digit at the tail end of the latitude and longitude that the target key indicates has been removed, that is, a position key corresponding to (rounded off to) a digit that is one digit higher than the target key.

Next, the search condition generating section 128 subtracts 2 from the variable KMAX (S525). Steps S524 and S525 are repeated until the value of the variable KMAX becomes less than 0 (S526). As a result, for the latitude and longitude of the target key, a position key is generated and added to the work region for each digit up to the digits of the integer portion. As a specific example, if we say that the target key is "++10339515262132", the following position keys are added to the list L.

++10339515262132++103395152621++ 1033951526++10339515++103395

Upon steps S522 through S526 being executed for all of the position keys included in the list L (Yes in S527), the search condition generating section 128 adds a position key group recorded in the work region to the list L (S528). That is to say, the position keys newly generated in steps S522 through S526 are taken as search keys.

In this way, if searching for a mobile device including the search range, with the list L, a position key group wherein each position key thereof is rounded off to an upper digit is taken as a search key in addition to a position key group originally included in the list L. The reason is described later. Note that, if distinguishing a position key originally included in the list L from a round-off position key, the former will be referred to as "original search key", and the latter will be referred to as "rounded-off search key".

Figure 32:
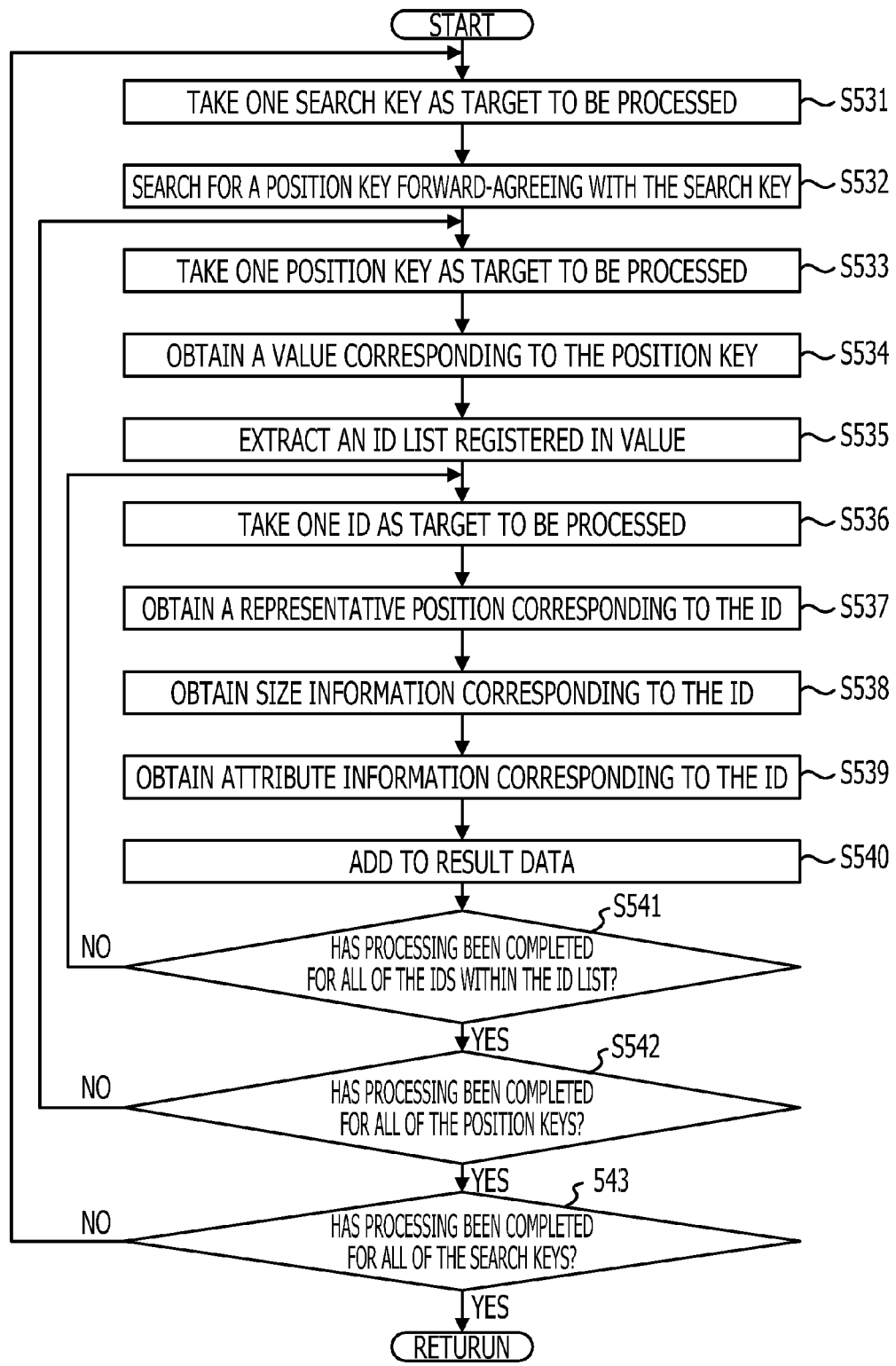
FIG. 32 is a flowchart for describing an example of a procedure for search processing of a mobile device that a search range includes.

Next, the details of step S504 in FIG. 29 will be described. FIG. 32 is a flowchart for describing an example of a procedure for search processing for a mobile device that the search range includes.

In step S531, the searching section 129 takes one search key of a search key group included in the list L generated in step S502 in FIG. 29 as the target to be processed. Next, the searching section 129 searches for position keys that forward-agree with the search key from the position storage unit 134 (S532). Note that the position keys forward-agreeing with the search key mentioned here are position keys that either a portion or all of which all include the search key from the front of the search key. If the search key is included entirely from the front to the end, this is equivalent to complete agreement.

The position keys forward-agreeing with the search key are equivalent to position keys that correspond to the lower left apex of a cell making up a mobile device that a range (cell) that the search key indicates includes. Description is made regarding a reason why a position key forward-agreeing with the search key results in the range (cell) that the search key indicates includes a cell according to the position key.

Figure 33:
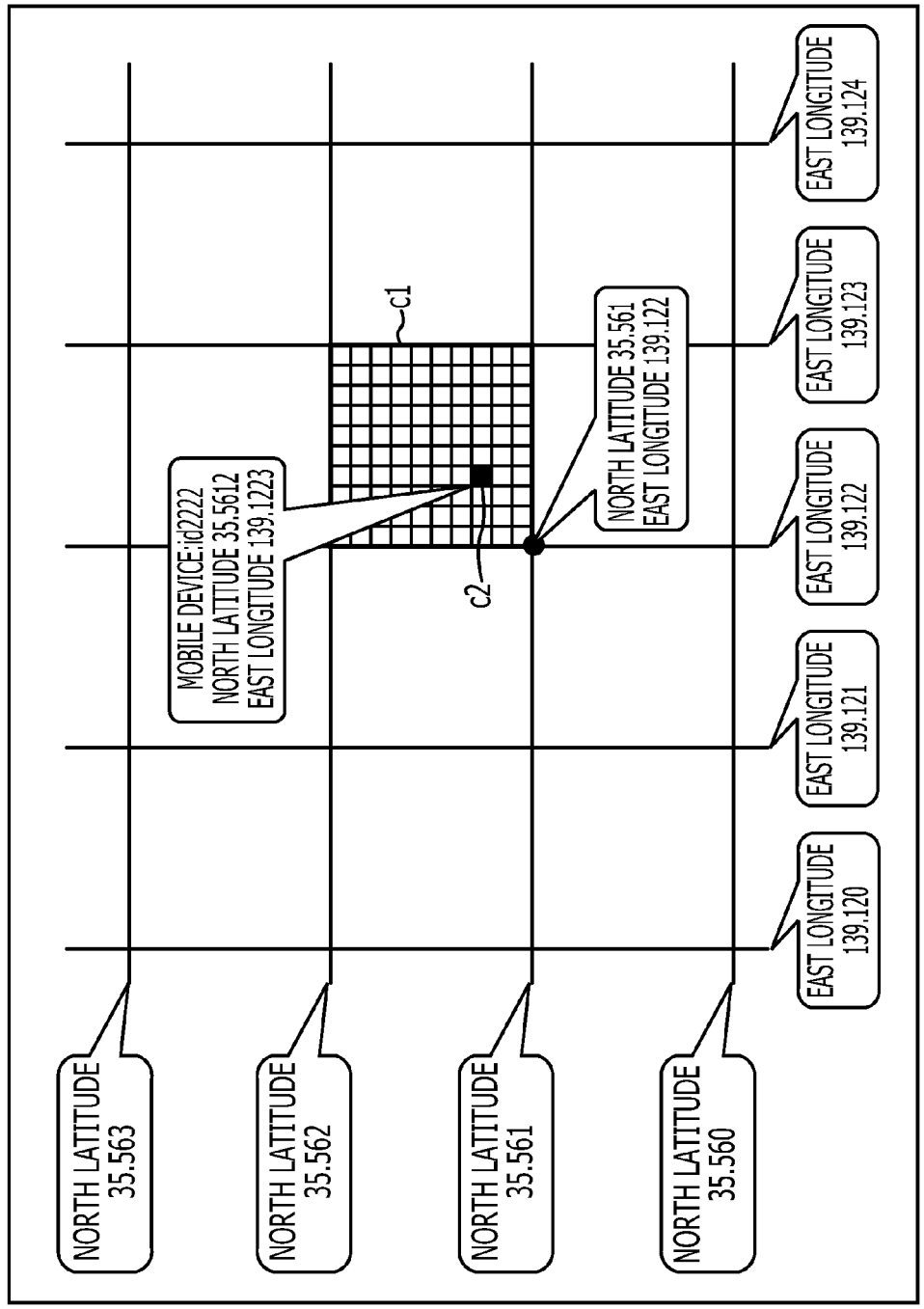
FIG. 33 is a diagram for describing the significance of forward agreement with a search key.

FIG. 33 is a diagram for describing the meaning of forward agreement with the search key. In the drawing, an example is illustrated wherein latitude and longitude corresponding to the search key are (35.561, 139.122), and latitude and longitude corresponding to a position key of a mobile device stored in the position storage unit 134 are (35.5612, 139.1223). In this case, a cell that the search key indicates is equivalent to a cell c1 surrounded with a thick line in the drawing. A cell that the position key of a mobile device indicates is equivalent to a cell c2 indicated with a black rectangle in the drawing. As apparent from the drawing, the cell c1 includes the cell c2.

Converting (35.561, 139.122) into a search key becomes "++103395152621". Converting position information for (35.5612, 139.1223) into a position key becomes "++10339515262132". Thus, the position key forward-agrees with the search key.

As described above, if a position key forward-agrees with the search key, a cell that the position key indicates is included in or agrees with a cell that the search key indicates. According to such a property of the position keys, with the present embodiment, a mobile device included in a certain range may be searched at high speed.

In other words, with the present embodiment, if latitude and longitude are taken as a key for a KVS, when searching for the key in a certain range, in order to enable the above-described high-speed search using forward agreement, the latitude and longitude are converted into the format of a position key, and used as a key for the KVS. Tentatively, if using a character string simply connected in order of the latitude and longitude as a position key, high-speed search using forward agreement as described above is difficult. With a character string simply connected in order of the latitude and longitude, with the example in FIG. 33, the search key becomes "+35561+139122". Also, the position key of a mobile device becomes "+355612+1391223". The position key does not forward-agree with the search key. Also, due to the properties of a KVS, it is difficult to perform a key search with a regular expression such as "+35561*+139122*". Note that "*" here indicates a wild card.

Note that, as described above, the size of a cell depends on the precision of latitude and longitude that indicate the lower left apex of the cell. With regard to the cell c1, the latitude and longitude of the lower left apex are in units of 1/1000 degrees. Accordingly, the cell c1 is equivalent to a rectangular region of which one side is 1/1000 degrees. With regard to the cell c2, the latitude and longitude of the lower left apex are in units of 1/10000 degrees. Accordingly, the cell c2 is equivalent to a rectangular region of which one side is 1/10000 degrees. Tentatively, if indicating a cell that has the same position as with the cell c1 as the lower left apex, and with one side being 1/10000 degrees, the lower left apex of the cell indicated may be specified as (35.5610, 139.1220). If specifying a range having the same size as the cell c1 with the lower left apex being taken as (35.5611, 139.1221), this range is specified with 100 cells with this latitude and longitude being taken as the lower left apex, and with one side being 1/10000 degrees, included in a rectangular region having the same size as the cell c1.

Next, the searching section 129 takes one of the searched position key groups as the target to be processed (hereinafter, "target key") (S533). Next, the searching section 129 obtains a value corresponding to the target key from the position storage unit 134 (S534). Next, the searching section 129 extracts a list of mobile IDs from the obtained value (S535). That is to say, the value of an id is obtained from each row included in this value. Next, the searching section 129 takes one mobile ID from this mobile ID group list as the target to be processed (S536). Next, the searching section 129 obtains a representative position correlated with the mobile device ID to be processed (S537). Next, the searching section 129 obtains size information corresponding to the mobile ID taken as the target to be processed (S538). Next, the searching section 129 obtains attribute information corresponding to the mobile ID taken as the target to be processed (S539). Next, the searching section 129 adds the data obtained in steps S537 through S539 to the result data (S540). The result data is data for storing a search result. Steps S536 through S540 are executed for all of the mobile IDs extracted in step S535 (S541). Also, steps S533 through S541 are executed for all of the position keys searched in step S532 (S542).

Upon steps S531 through S542 being executed for all of the search keys (Yes in S543), the processing in FIG. 32 ends. Accordingly, the result data at this point is returned in step S506 in FIG. 29.

Figure 34A:
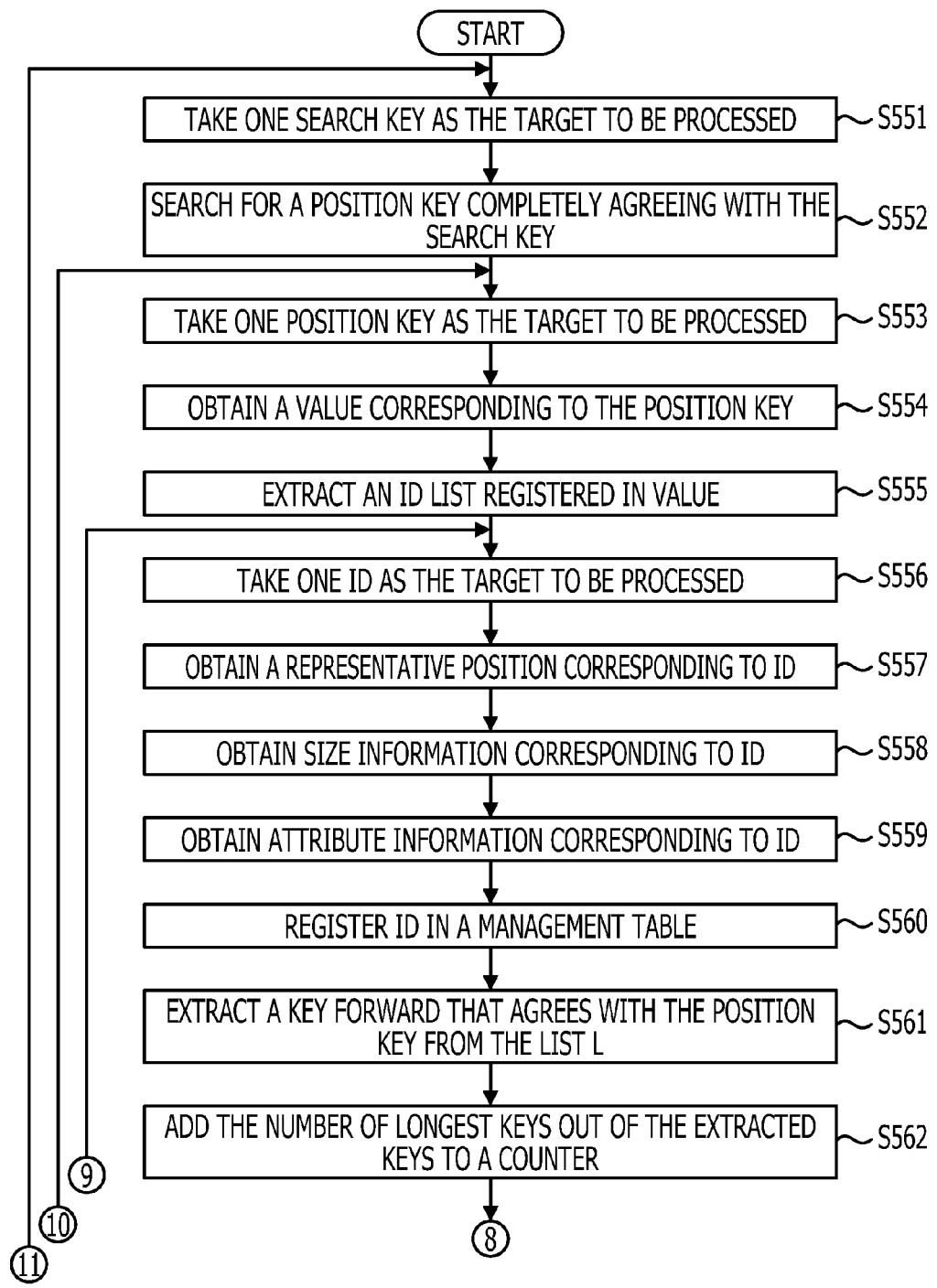
FIGS. 34A and 34B are flowcharts for describing an example of a procedure for search processing of a mobile device in which a search range is included.
Figure 34B:
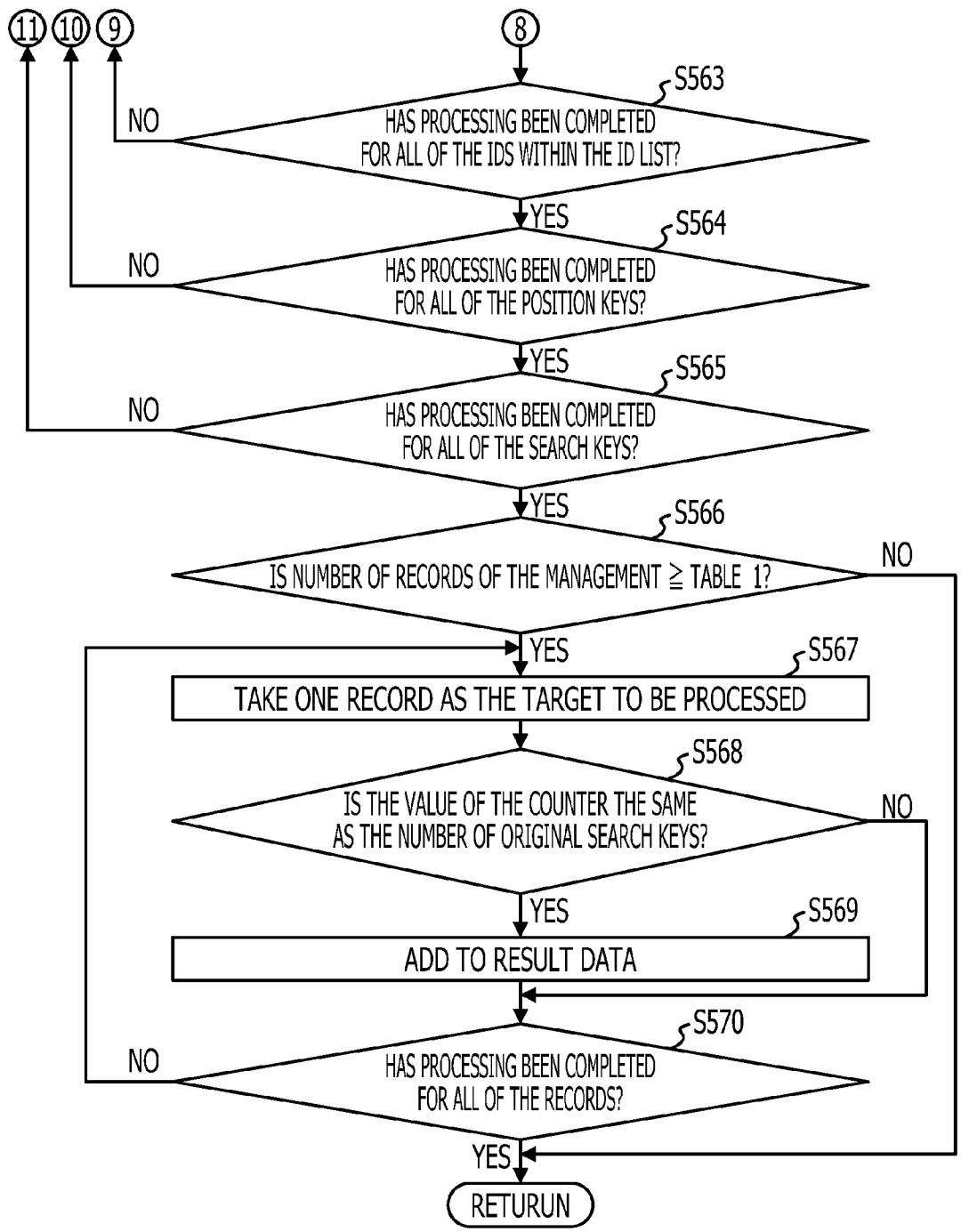

Next, the details of step S505 in FIG. 29 are described. FIGS. 34A and 34B are flowcharts for describing an example of a procedure for search processing for a mobile device in which the search range is included.

In step S551, the searching section 129 takes one search key of a search key group included in the list L generated in step S502 in FIG. 29 as the target to be processed. Next, the searching section 129 searches the position storage unit 134 for position keys that completely agree with the search key (S552).

According to the processing described in FIG. 31, a rounded-off search key is included in the list L in addition to the original search key. Accordingly, for example, if the rounded-off search key is the search key in step S552, a position key that completely agrees with this search key is a position key corresponding to a cell that includes a cell corresponding to the original search key. Also, if the original search key is the search key in step S552, a position key that completely agrees with this search key is a position key corresponding to a cell that agrees with a cell corresponding to the original search key.

Note that a cell corresponding to one search key is not restricted to a region that includes all of the rectangular regions groups specified as a search range. A cell that corresponds to a search key is a cell that includes at least a portion of the search range. Accordingly, in step S552, a search is performed with a position key that corresponds to a cell that includes at least a portion of the search range. Subsequent steps S553 through S559 are the same as steps S533 through S539 in FIG. 32, and description thereof is omitted.

Next, the searching section 129 registers a mobile ID that serves as the target to be processed in a management table (S560).

FIG. 35 is a diagram illustrating an example of the configuration of the management table. In the drawing, a record in the management table may store a mobile ID, a counter, attribute information, and so forth. The initial value of the counter is "0". The management table is a storage region that is temporarily generated, and may be realized by using the memory device 103 or auxiliary storage device 102 or the like, for example.

In step S560, if there is no record with the same mobile ID as a mobile ID serving as the target to be processed, a new record is generated, and a mobile ID to be processed is recorded in this record. Also, information obtained in steps S557 through S559 is recorded in this record as attribute information or the like.

On the other hand, if there is a record with the same mobile ID as a mobile ID serving as the target to be processed, generation of a record is not performed. That is to say, the number of records to be recorded in the management table for the same mobile ID is one at most.

Next, the searching section 129 extracts position keys that forward-agree with the search key from the list L (S561). Next, the searching section 129 adds the number of position keys with the maximum number of characters (longest position keys) out of the extracted position keys to the counter of a record that corresponds to the mobile ID serving as the target to be processed in the management table (S562). A position key with the maximum number of characters out of the extracted position keys is the original search key for the search key. Accordingly, the number of original search keys for the search key is added to the counter.

Next, meaning of the processing in steps S560 through S562 will be described. With search for a mobile device in which the search range is included, a mobile device that includes all of the cells making up the search range is desired to be searched. A search key that corresponds to a cell making up the search range is the original search key. Accordingly, for the cells that correspond to all of the original search keys, if there is a mobile device that is part of or all of the cells, this is an intended mobile device. However, with the original search keys, it is difficult to search for a mobile device that includes the search range at high speed.

Therefore, with the present embodiment, a rounded-off search key is employed. The significance of existence of a rounded-off search key is in that the rounded-off search key includes a cell that corresponds to the original search key, and a cell for the mobile device that is larger than this cell is searched at high speed. That is to say, a certain position key that completely agrees with a rounded-off search key means a cell corresponding to this position key that includes a cell corresponding to the original search key that is the origin of this rounded-off search key. Accordingly, it may be said that a search result according to a rounded-off search key is the search result of the original search key.

Thus, if the number of hits for the search based on a rounded-off search key for each mobile device has been recorded, it may be said that a mobile device with an accumulated value of the number of hits that agrees with the total number of the original search keys is a mobile device that includes all of the cells making up the search range. An item for recording the number of hits of this search is the counter of the management table.

However, a rounded-off search key may be common to a plurality of original search keys as illustrated in FIG. 36.

FIG. 36 is a diagram illustrating an example wherein one rounded-off search key is common to a plurality of original search keys.

In this drawing, there are illustrated cells $c21$, $c22$, and $c23$ each indicated with a black square in the drawing, which are cells with units of 1/10000 degrees, and a cell $c11$ indicated with a thick line in the drawing including these cells, which is a cell with units of 1/1000 degrees. If we say that the position key of each of the cells $c21$, $c22$, and $c23$ is an original search key, the position key of the cell $c11$ is a rounded-off search key common to the cells $c21$, $c22$, and $c23$.

Accordingly, a hit from searching based on the rounded-off search key according to the cell $c11$ means getting a hit from searching based on the three original search keys.

In step S562, in light of such a case given above, of the extracted position keys, the number of position keys having the maximum number of characters, that is, the number of the longest position keys, is added to the counter instead of simply adding one to the counter. Note that the position keys having the maximum number of characters means the original search keys. Specifically, with regard to the cells $c21$, $c22$, and $c23$, in FIG. 36, a rounded-off search key with units of 1/1000 degrees, 1/100 degrees, 1/10 degrees, or 1 degree is generated. Tentatively, let us say that the search key for the target to be processed is a rounded-off search key with 1/100 degrees. In this case, not only the original search key according to the cells $c21$, $c22$, or $c23$ but a rounded-off search key of each of 1/100 degrees and 1/1000 degrees are also included in the position key group extracted from the list L as position keys forward-agreeing with the rounded-off search key of 1/100 degrees. In the position key group, the number of characters of the original search key according to the cell $c21$, $c22$, or $c23$ is the longest. Accordingly, in step S562, of the extracted position keys, the number of position keys having the maximum number of characters, that is, the number of the longest position keys is added to the counter, which means that the number of the original search keys alone is added to the counter.

Subsequent steps S563 through S565 are the same as steps S541 through S543 in FIG. 32, and description thereof is omitted. That is to say, steps S556 through S562 are executed for all of the mobile IDs extracted in step S555 (S563). Also, steps S553 through S563 are executed for all of the position keys searched in step S552 (S564). Furthermore, steps S551 through S564 are executed for all of the search keys included in the list L (S565).

Next, the searching section 129 determines whether the number of records in the management table is greater than or equal to 1 (S566). If the number of records in the management table is greater than or equal to 1 (Yes in S566), the searching section 129 takes one record as the target to be processed (S567). Next, the searching section 129 determines whether the value of the record counter is the same as the number of the original search keys (S568). As described regarding steps S560 through S562, the value of the counter is the same as the number of original search keys, which means that a mobile device according to a mobile ID recorded in this record includes the search range, that is, means that the search range is included in the mobile device. Accordingly, if the value of the counter is the same as the number of original search keys (Yes in S568), the searching section 129 adds the attribute information and so forth in this record to the result data (S569). Upon steps S567 through S569 being executed for all of the records recorded in the management table (Yes in S570), the processing in FIGS. 34A and 34B ends.

Note that, although the search processing for mobile information has been described above, if the search request accepting section 127 has also accepted a search request for facility information or area information, essentially the same procedure is executed. That is to say, the mobile terminal 20 which one person or one vehicle carries is represented as a rectangular region with the finest precision in the present system. Accordingly, the same concept may be applied to even search for a store or area having a wider area than a mobile device.

Search processing of the position storage unit 134 is described with reference to a specific example. FIG. 37A through FIG. 37D are diagrams illustrating a first specific example of search processing of the position storage unit 134. In the drawing, an example is illustrated wherein, as part of a search request Req1, (139.1219, 35.5609) has been specified as the lower left apex of a search range A1, and (139.1231, 35.5621) has been specified as the upper right apex, and a search for a mobile device that this search range includes has been requested.

In this case, the effective number of digits KMAX is "4". That is to say, the precision of the search range A1 is 0.0001 degrees. Accordingly, the search range A1 is, as illustrated in (1) in the drawing, divided into 144 cell groups with one side being taken as 0.0001 degrees. However, cell groups included in a cell with (35.561, 139.122) being taken as the lower left apex, and with (35.562, 139.123) being taken as the upper right apex are combined into a cell $C1a$ illustrated (2) in the drawing. That is to say, one position key corresponding to the lower left apex (35.561, 139.122) of the cell $C1a$, and 44 position keys corresponding to the lower left apexes of 44 cell groups C1*b* respectively are added to the list L as search keys.

As a result thereof, the position storage unit 134 is searched for position keys that forward-agree with any search key included in the list L. For example, as illustrated in (3) in the drawing, if mobile information of three mobile devices A, B, and C is stored in the position storage unit 134, a position key of the mobile device A, and a position key of the mobile device B positioned in the search range A1 forward-agrees with any search key included in the list L. On the other hand, the position key of the mobile device C, which is positioned outside of the search range A1, does not forward-agree with any search key included in the list L. Accordingly, the position key of the mobile device A, and the position key of the mobile device B are included in the result data Res1.

FIG. 38A through FIG. 38D are diagrams illustrating a second specific example of search processing of the position storage unit 134. In the drawing, an example is illustrated wherein, with a search request Req2, (139.122, 35.561) has been specified as the latitude and longitude of the lower left apex of a search range A2, and (139.123, 35.562) has been specified as the upper right apex, and a search for a mobile device that the search range includes has been requested.

In this case, the effective number of digits KMAX is "3". That is to say, the precision of the search range A2 is 0.001 degrees. Accordingly, the search range A2 is, as illustrated in (2) in the drawing, treated as one cell C2 with one side being 0.001 degrees. That is to say, one position key that corresponds to the lower left apex (139.122, 35.561) of the cell C2 is added to the list L as a search key.

As a result, the position storage unit 134 is searched for position keys that forward-agree with any search key included in the list L. For example, as illustrated in (3) in the drawing, if the mobile information of three mobile devices A, B, and C is stored in the position storage unit 134, a position key of the mobile device A, and a position key of the mobile device B positioned in the search range A2 forward-agree with a search key included in the list L. However, a position key of the mobile device C positioned outside of the search range A2 does not forward-agree with a search key included in the list L. Accordingly, the position key of the mobile device A, and the position key of the mobile device B are included in the result data Res2.

FIG. 39A through FIG. 39D are diagrams illustrating a third specific example of search processing of the position storage unit 134. In the drawing, an example is illustrated wherein, with a search request Req3, (139.1221, 35.5611) has been specified as the latitude and longitude of the lower left apex of a search range A3, and (139.123, 35.562) has been specified as the upper right apex, and search for a mobile device that this search range includes has been requested.

In this case, the effective number of digits KMAX is "4". That is to say, the precision of the search range A3 is 0.0001 degrees. Accordingly, the search range A3 is, as illustrated in (2) in the drawing, divided into 81 cell groups C3 with one side being taken as 0.0001 degrees. That is to say, 81 position keys corresponding to the cells included in the cell group C3 are added to the list L as search keys.

As a result, the position storage unit 134 is searched for position keys that forward-agree with any search key included in the list L. For example, as illustrated in (3) in the drawing, if the mobile information of three mobile devices A, B, and C is stored in the position storage unit 134, a position key of the mobile device A, and a position key of the mobile device B positioned in the search range A3 forward-agree with any search key included in the list L. On the other hand, a position key of the mobile device C positioned outside of the search range A3 does not forward-agree with any search key included in the list L. Accordingly, the position key of the mobile device A, and the position key of the mobile device B are included in the result data Res3.

FIG. 40A through FIG. 40D are diagrams illustrating a fourth specific example of the search processing of the position storage unit 134. In the drawing, an example is illustrated wherein, with a search request Req4, (139.1221, 35.5611) has been specified as the latitude and longitude of the lower left apex of a search range A4, and (139.1225, 35.5614) has been specified as the upper right apex, and search for a mobile device that this search range includes has been requested.

In this case, the effective number of digits KMAX is "4". That is to say, the precision of the search range A4 is 0.0001 degrees. Accordingly, the search range A4 is, as illustrated in (2) in the drawing, divided into 12 cell groups C4 with one side being taken as 0.0001 degrees. That is to say, 12 position keys corresponding to the cells included in the cell group C4 are added to the list L as search keys.

As a result, the position storage unit 134 is searched for position keys that forward-agree with any search key included in the list L. For example, as illustrated in (3) in the drawing, if the mobile information of three mobile devices A, B, and C is stored in the position storage unit 134, a position key of the mobile device A positioned in the search range A4 forward-agrees with any search key included in the list L. On the other hand, a position key of the mobile device B, and a position key of the mobile device C that are positioned outside of the search range A4 do not forward-agree with any search key included in the list L. Accordingly, the position key of the mobile device A is included in the result data Res4.

FIG. 41A through FIG. 41D are diagrams illustrating a fifth specific example of search processing of the position storage unit 134. In the drawing, an example is illustrated wherein, with a search request Req5, (139.1219, 35.5609) has been specified as the latitude and longitude of the lower left apex of a search range A5, and (139.1225, 35.5614) has been specified as the upper right apex, and search for a mobile device that this search range includes has been requested.

In this case, the effective number of digits KMAX is "4". That is to say, the precision of the search range A5 is 0.0001 degrees. Accordingly, the search range A5 is, as illustrated in (2) in the drawing, divided into 30 cell groups C5 with one side being taken as 0.0001 degrees. That is to say, 30 position keys corresponding to the cells included in the cell groups C5 are added to the list L as search keys.

As a result, the position storage unit 134 is searched for position keys that forward-agree with any search key included in the list L. For example, as illustrated in (3) in the drawing, if the mobile information of three mobile devices A, B, and C are stored in the position storage unit 134, a position key of the mobile device A positioned in the search range A5 forward-agrees with any search key included in the list L. However, a position key of the mobile device B, and a position key of the mobile device C that are positioned outside of the search range A5 do not forward-agree with any search key included in the list L. Accordingly, the position key of the mobile device A is included in the result data Res5.

FIG. 42A through FIG. 42D are diagrams illustrating a sixth specific example of the search processing of the position storage unit 134. In the drawing, an example is illustrated wherein, with a search request Req6, (139.1219, 35.5609) has been specified as the latitude and longitude of the lower left apex of a search range A6, and (139.1225, 35.5614) has been specified as the upper right apex, and search for a mobile device that this search range includes has been requested.

In this case, the effective number of digits KMAX is "4". That is to say, the precision of the search range A6 is 0.0001 degrees. Accordingly, the search range A6 is, as illustrated in (2) in the drawing, divided into 30 cell groups C6 with one side being 0.0001 degrees. That is to say, 30 position keys corresponding to the cells included in the cell groups C6 are added to the list L as search keys.

As a result, the position storage unit 134 is searched for position keys that forward-agree with any search key included in the list L. For example, as illustrated in (3) in the drawing, say that mobile information of two mobile devices A and B is stored in the position storage unit 134. The range of the mobile device A includes five cells. Accordingly, for the mobile device A, five position keys are stored in the position storage unit 134. On the other hand, the range of the mobile device B includes three cells. Accordingly, for the mobile device B, three position keys are stored in the position storage unit 134.

One cell Aa that makes up the range of the mobile device A is in the search range A6. Accordingly, the position key of the cell Aa forward-agrees with any search key included in the list L. However, the position key of another cell that makes up the mobile device A and that is positioned outside of the search range A6, and the position keys of all of the cells that make up the mobile device B do not forward-agree with any search key included in the list L. Accordingly, the position key of the cell Aa is included in result data Res6. The cell Aa is a cell making up the mobile device A, and accordingly, the mobile device A is taken to be included in the search range.

That is to say, with the present embodiment, not only a mobile device alone completely included in the search range but also a mobile device wherein a portion thereof overlaps with the search range are included in search results. Tentatively, when attempting to obtain search results in which only a mobile device that is completely included in the search range is a search result, if the position keys of all of the cells that make up the mobile device forward-agree with the search key, the searching section 129 may take the position keys of all of the cells as search results.

FIG. 43A through FIG. 43D are diagrams illustrating a seventh specific example of the search processing of the position storage unit 134. In the drawing, an example is illustrated wherein, with a search request Req7a, (139.1223, 35.5612) has been specified as the latitude and longitude of the lower left apex of a search range A7, and (139.1224, 35.5613) has been specified as the upper right apex, and a search for a mobile device that includes this search range has been requested. Note that, as indicated in a search request Req7b, if (139.1223, 35.5612) has been specified as one set of latitude and longitude in units of 1/10000 degrees as well, the same rectangular region as with the search range A7 has consequently been specified.

In this case, the effective number of digits KMAX is "4". That is to say, the precision of the search range A7 is 0.0001 degrees. Accordingly, for the search range A7, as illustrated in (2) in the drawing, one cell C7 with one side being taken as 0.0001 degrees is generated. This is a search for a mobile device that includes the search range A7, and accordingly, not only the original search key corresponding to the cell C7 but also a rounded-off search key where a portion below a decimal point of the original search key is deleted one digit at a time (two characters at a time) are added to the list L (see FIG. 31). In the drawing, a cell C8 one digit higher than the cell C7, and a cell C9 two digits higher than the cell C7 are illustrated. Though cells for digits higher than those are omitted for convenience, a position key corresponding to each such upper digit cell is added to the list L as a rounded-off search key.

As a result, position keys that completely agree with any search key included in the list L are searched from the position storage unit 134. For example, as illustrated in (3) in the drawing, if mobile information of two mobile devices M and N is stored in the position storage unit 134, a position key of the mobile device M that includes the search range A7 completely agrees with a rounded-off search key with 1/1000 degrees included in the list L. While the number of cells in the search range A7 is "1", for the position key of the mobile device M, the number of times a search key included in the list L is completely agreed with is once. However, the position key for the mobile device N that does not include the search range A7 does not completely agree with any search key included in the list L. Accordingly, the position key of the mobile device M is included in the result data Res7.

As described above, according to the present embodiment, mobile information of one mobile device is managed associated with a key with different properties at each of the ID time storage unit 131, time ID storage unit 132, ID storage unit 133, and position storage unit 134. Accordingly, in response to various search requests with one of a position range, a mobile ID, a time range, or a combination of a time range and a mobile ID being specified, search may be executed at high speed. That is to say, according to the present embodiment, a search result may be returned with practical performance.

Also, according to the present embodiment, latitude and longitude are registered in a KVS as a key in a format for a position key. Accordingly, with regard to corresponding information that corresponds to the position key, high-speed search may be performed. Specifically, for example, if searching for mobile information included in a position range, with a position key group corresponding to the specified position range being taken as a search key group, intended mobile information may be searched for by searching for a position key that forward-agrees with any search key.

Note that, with the present embodiment, regarding the format of a position key, although an example is indicated wherein each digit of latitude and longitude is alternately arrayed in the sequence of longitude and latitude, the sequence of latitude and longitude may be reversed.

Also, all of the digits of latitude and longitude do not necessarily have to be alternately arrayed. That is to say, digits that are higher than the precision when searching are not desired to be alternately arrayed. The precision when searching is the precision of a search key. For example, with the example in FIG. 33, the precision of a search key is the third place below a decimal point. Accordingly, digits that are higher than the third place below a decimal point may be arrayed in the sequence of a longitude character string and a latitude character string. Specifically, according to the example in FIG. 33, a search key in this case becomes "+3556+1391221". Also, a position key of a mobile device becomes "+3556+139122132". With either of these, with regard to below the third place below a decimal point, the characters of a latitude character string and a longitude character string are alternately arrayed. In this case, the position key forward-agrees with the search key.

Thus, position keys according to the present embodiment are character strings where for every latitude and longitude, or in order from a given upper digit counted from the least significant digit, the same digits are alternately arrayed one digit at a time. Some digits from the least significant digit mentioned here means digits below the third place below a decimal point in the immediately preceding example.

Also, with the present embodiment, the range of latitude has been taken as +90 degrees (north latitude) through −90 degrees (south latitude), and the range of longitude has been taken as +180 degrees (east longitude) through −180 degrees (west longitude). However, the range of latitude may be taken as 0 degree through 180 degrees, and the range of longitude may be taken as 0 degrees through 360 degrees. In this case, a character indicating a sign (+ or −) does not have to be included as the first two characters of a position key.

Note that, for cell groups that are to be generated for a rectangular region group that makes up a position range, the reason to perform integration into an upper digit cell is to consistently enable search of a mobile device that the position range includes by using search according to forward agreement with a search key, regardless of the precision of a position key registered in the position storage unit 134. For example, suppose that mobile information of a mobile device that has the range of the cell C1*a* indicated in (2) in FIG. 37B has been registered in the position storage unit 134. In this case, a position key for the cell C1*a* is in units of $1/1000$ degrees.

Figure 37A:
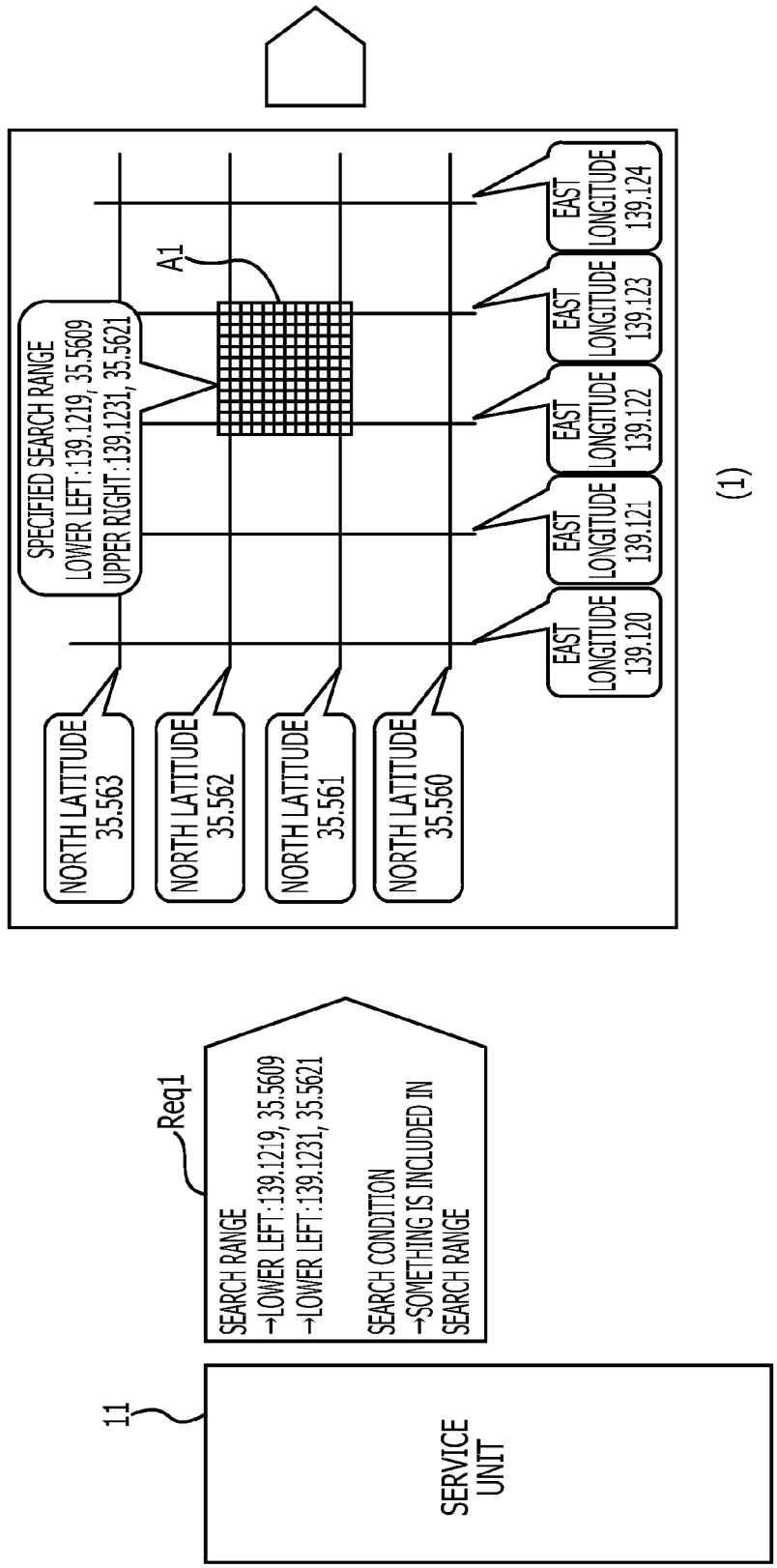
FIGS. 37A, 37B, 37C and 37D are diagrams illustrating a first specific example of search processing of the position storage unit.

However, if we say that a rectangular region making up the position range A1 has been specified in units of $1/10000$ degrees, the rectangular region is first, as illustrated in (1) in FIG. 37A, divided into cell groups in units of $1/10000$ degrees. Even if searching for a position key that forward-agrees with a search key corresponding to each of the cell groups as it is, a position key corresponding to the cell C1*a* is not searched. This is because the search key is longer than the position key to be searched.

In order to exclude such a situation, cell groups making up a rectangular region group that make up a position range are combined into an upper digit cell as much as possible.

On the other hand, the reason why combination into an upper digit is performed for cell groups to be generated for a rectangular region group that indicates size information of a mobile device (that is, the range of a mobile device) when registering mobile information is to consistently enable search of at least a part of mobile devices that include the position range by complete agreement with a search key when searching with a mobile device that includes a position range.

For example, let us say that a rectangular region indicated with A1 in FIG. 37A has been specified as a rectangular region that indicates size information (range) of a mobile device, and registration has been requested. Although the rectangular region indicated with A1 is a position range A1, suppose that this is the range A1 of a mobile device. In this case, if we say that this rectangular region has been specified in units of $1/10000$ degrees, this rectangular region is first, as illustrated in (1), divided into cell groups in units of $1/10000$ degrees. If we say that these cell groups have not been combined, and the mobile information has been registered, the mobile information is correlated with 144 position keys with precision of $1/10000$ degrees.

Figure 37B:
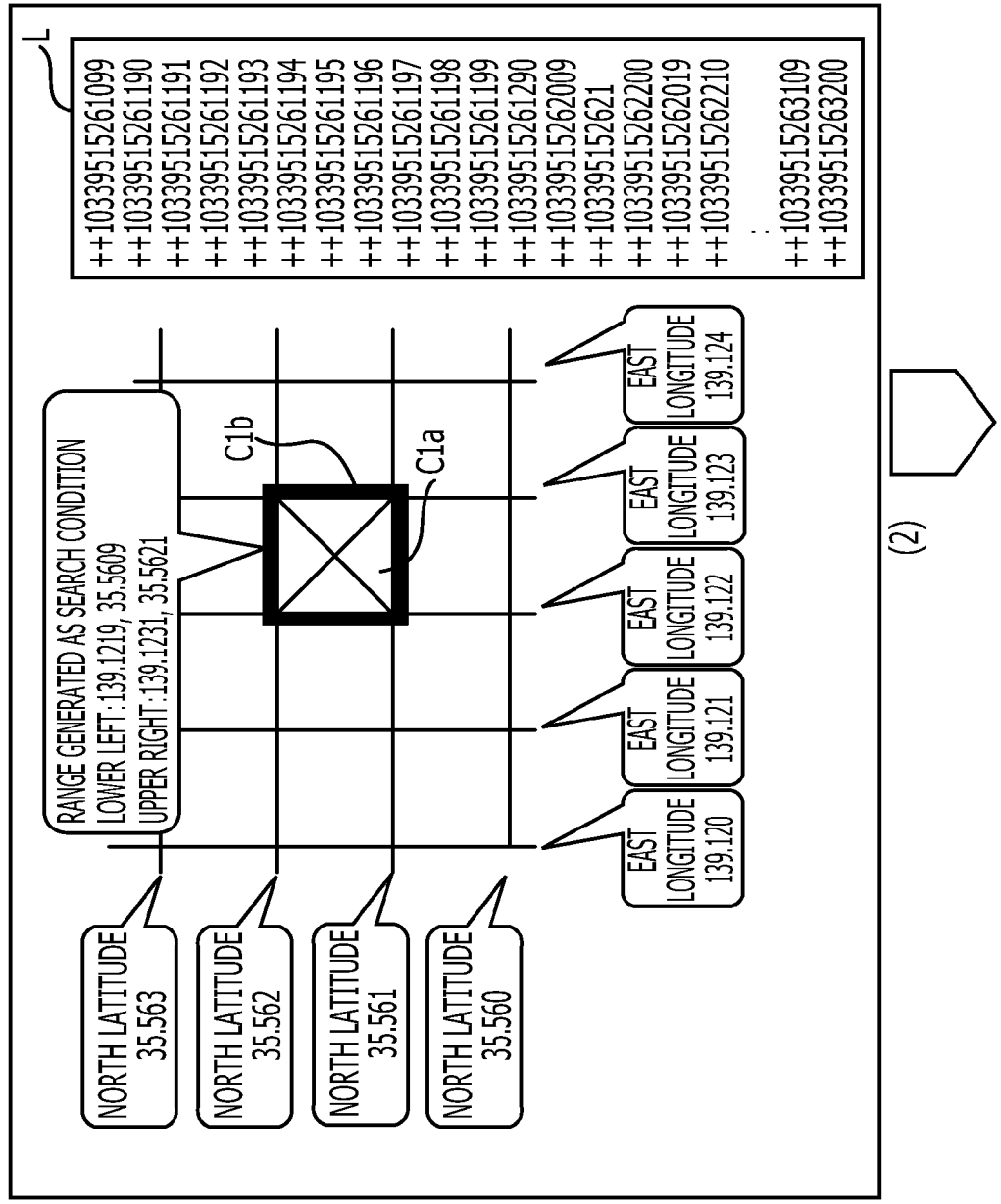
Figure 37C:
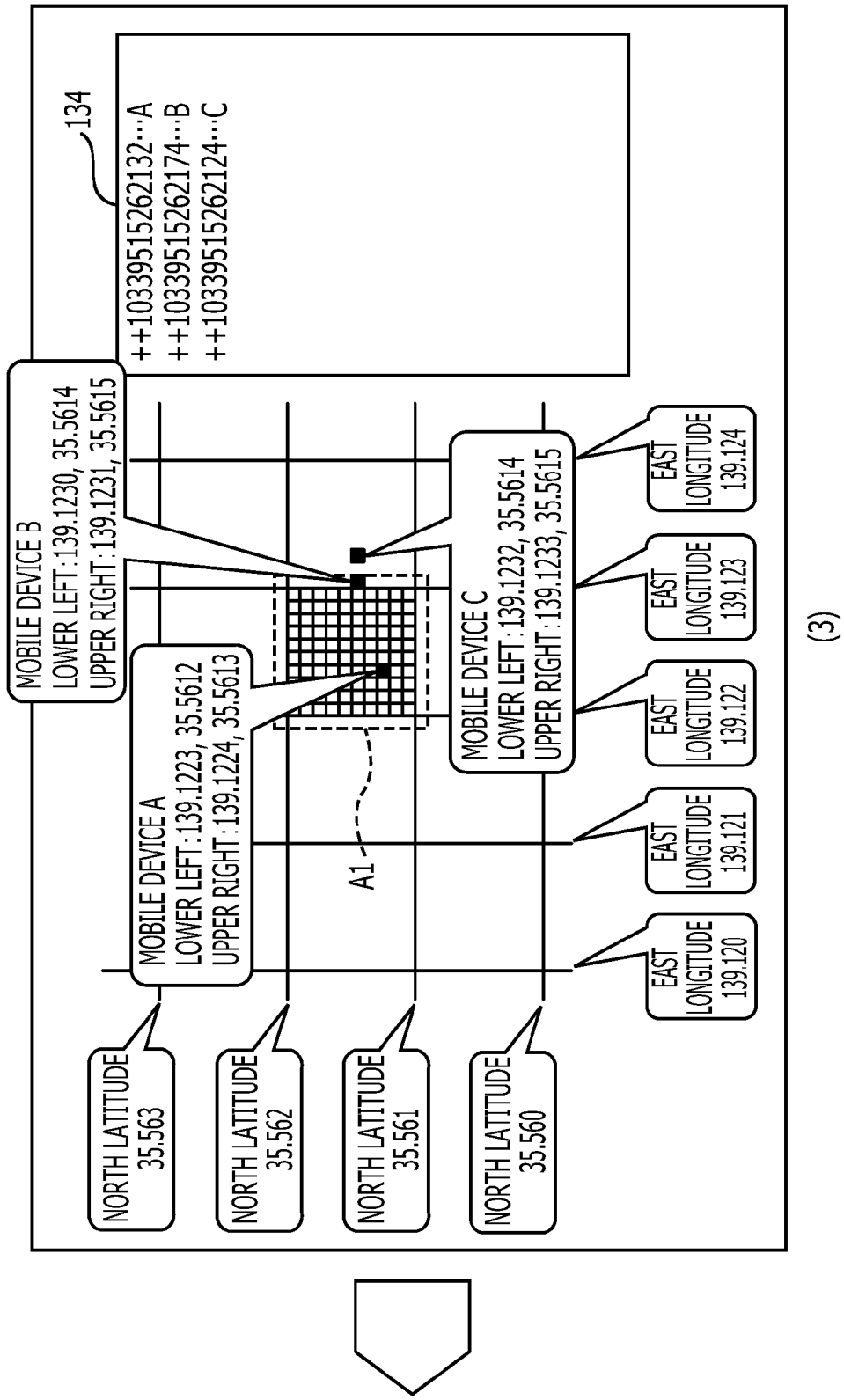
Figure 37D:
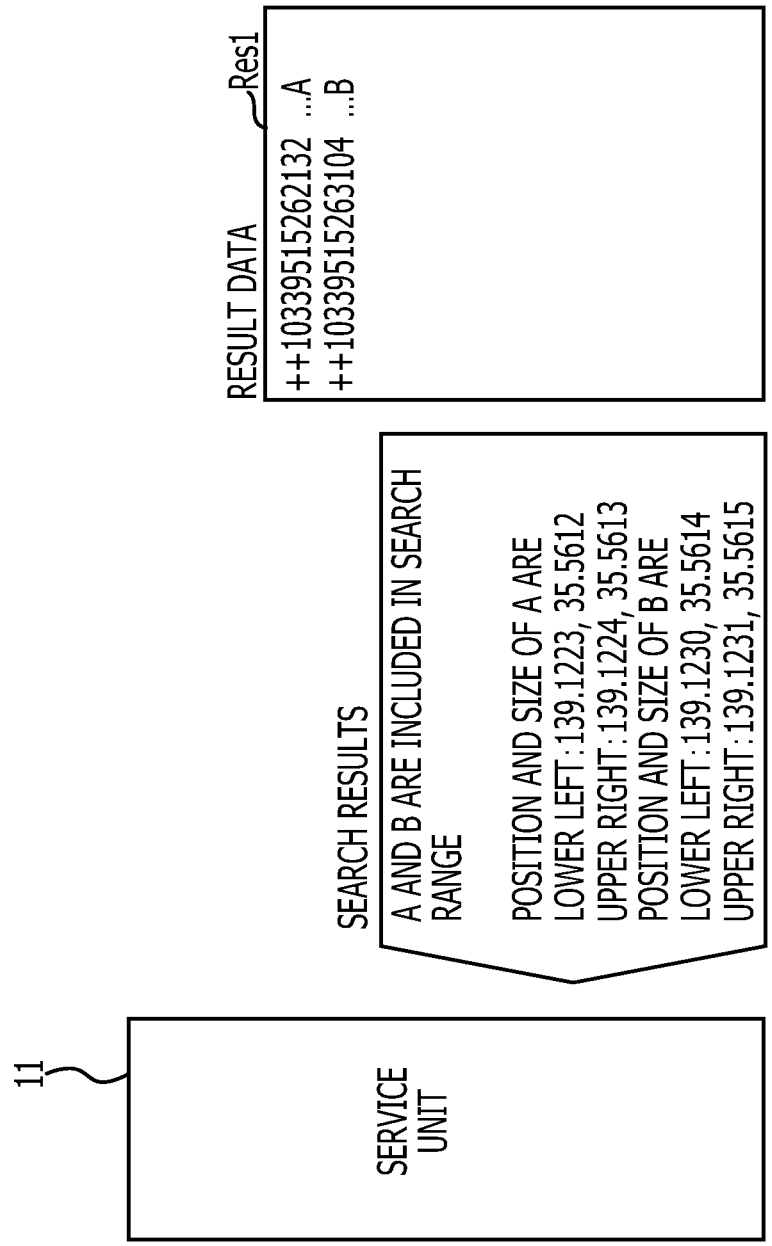
Figure 40D:
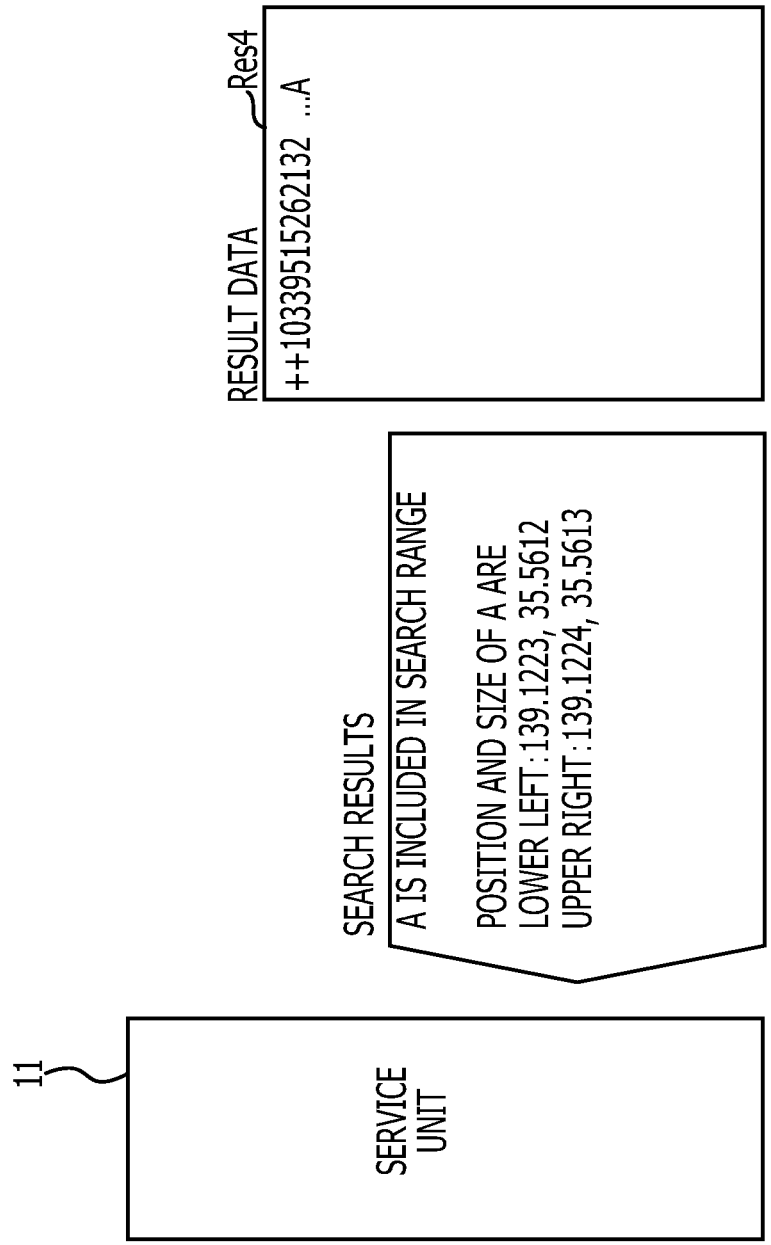
Figure 41A:
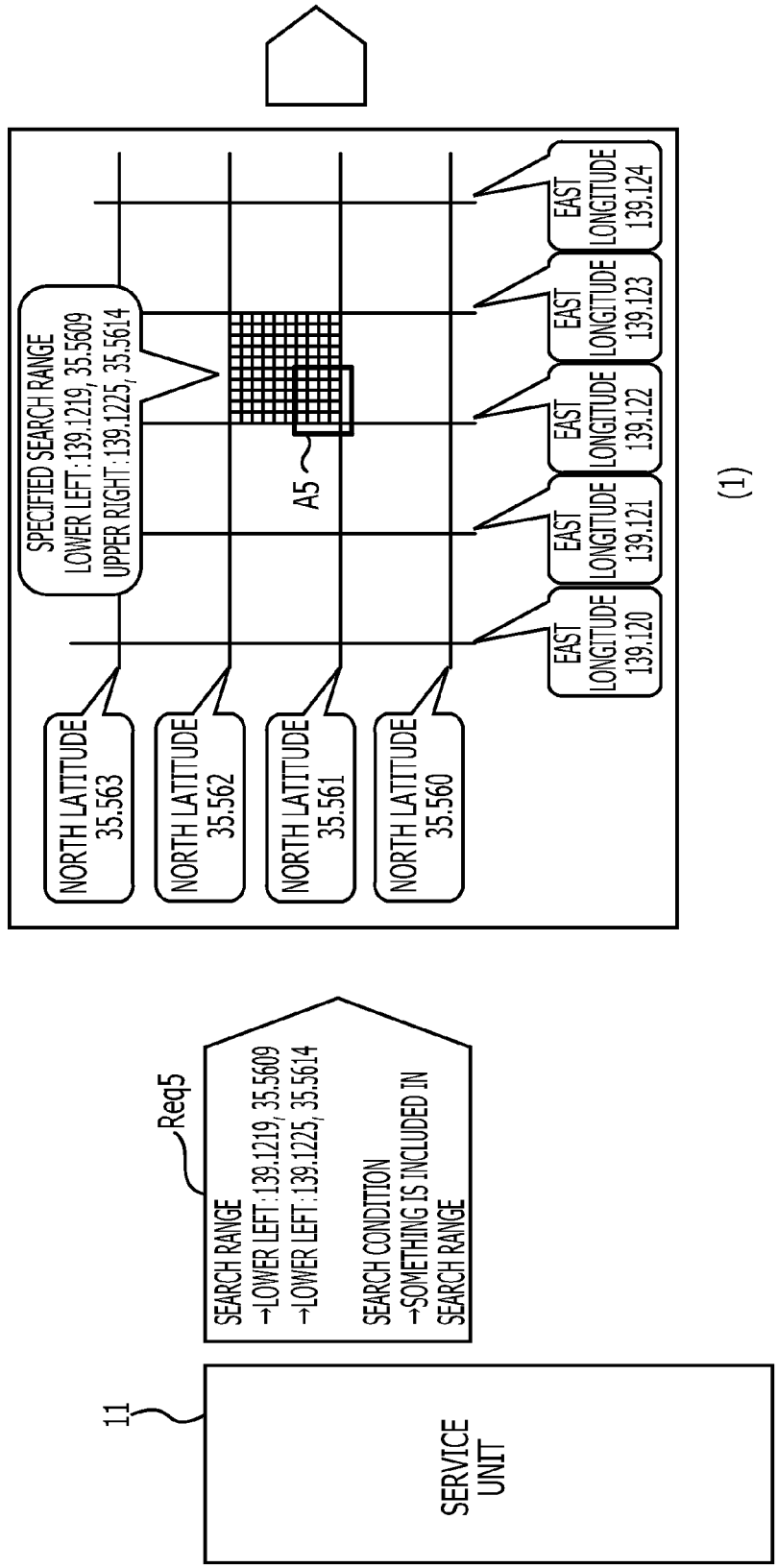
Figure 41D:
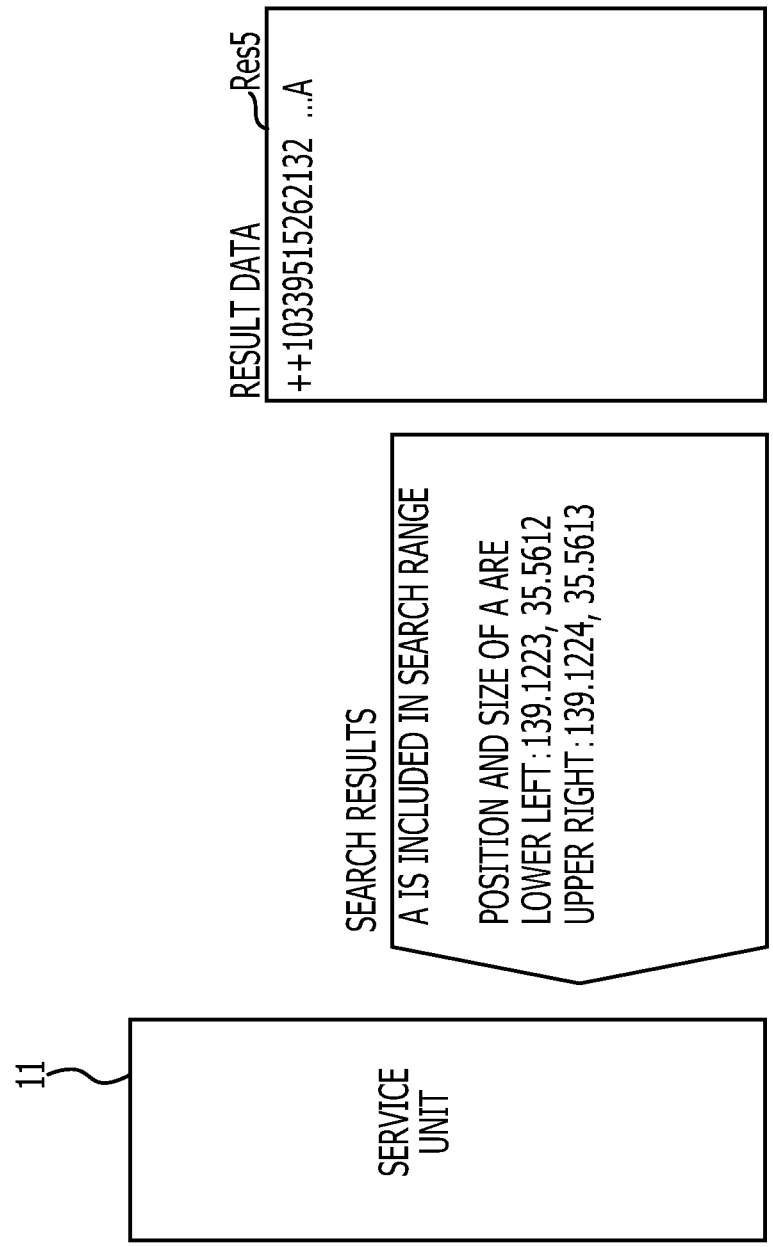
Figure 42B:
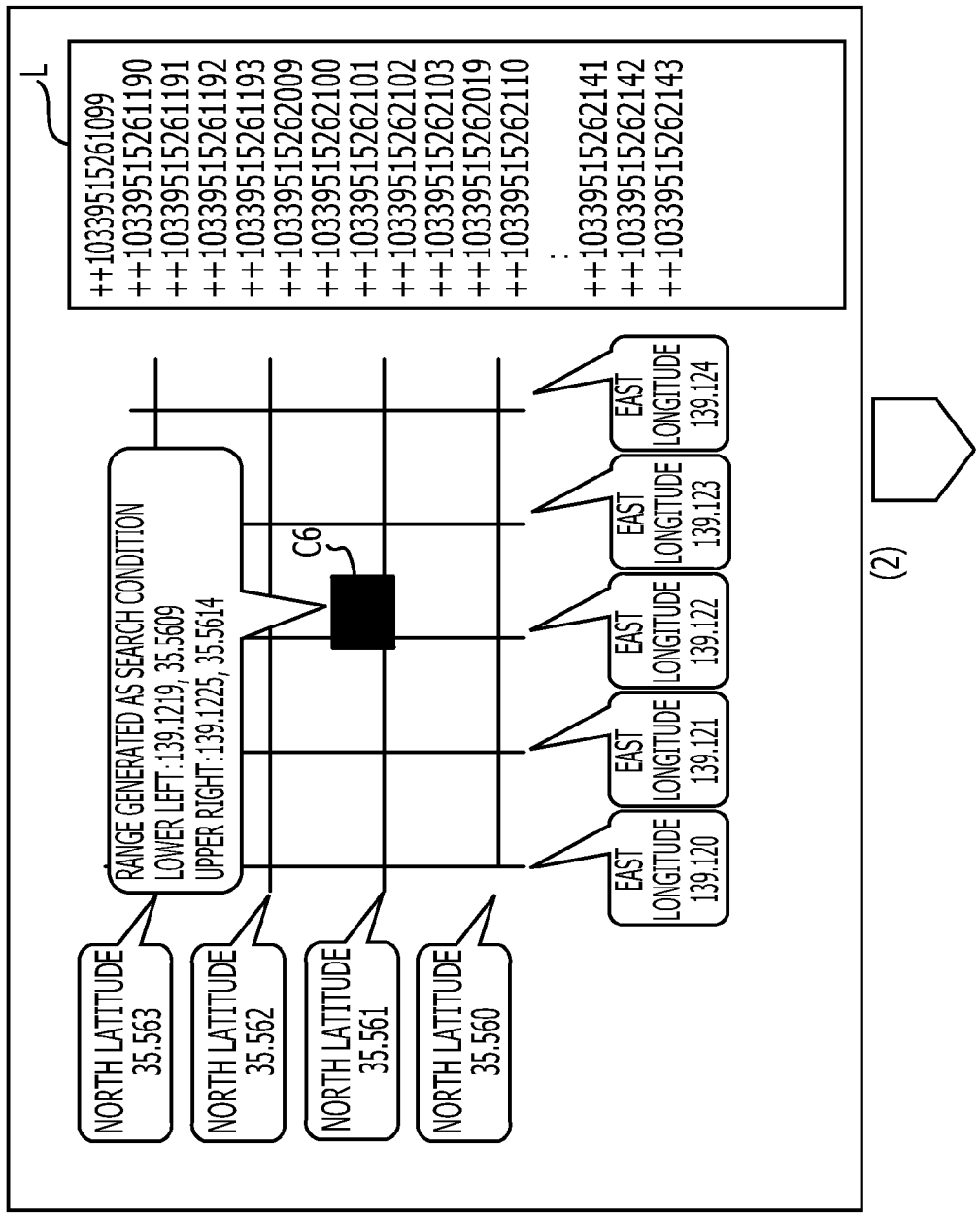
Figure 42D:
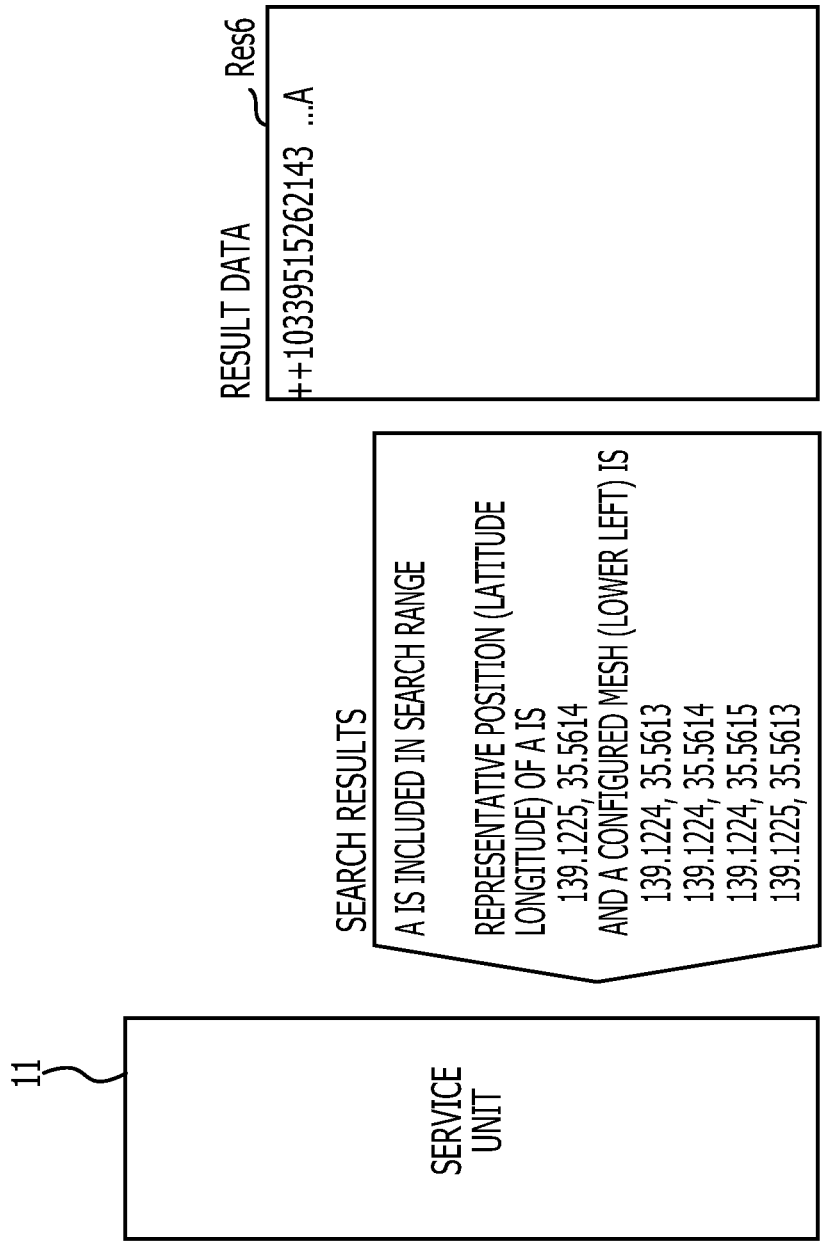

Let us say that, in such a state, with a search request for a mobile device that includes a position range, the same latitude and longitude as with the lower left apex of a cell C1*a* in (2) in FIG. 37B has been specified as the lower left apex of this position range. That is to say, let us say that the same range as with the cell C1*a* has been specified as a position range. The latitude and longitude are in units of $1/1000$ degrees. Accordingly, a search key according to this position range is generated in units of each of $1/1000$ degrees, $1/100$ degrees, $1/10$ degrees, and 1 degree. If attempting to search for a position key that completely agrees with any of these search keys, there is no position key completely agreeing with these search keys of the 144 position keys with precision of $1/10000$ described above. That is to say, a mobile device according to the range A1 is consequently not included in the search result that includes cell C1*a* regardless of including the cell C1*a*.

On the other hand, if some cell groups included in the range A1 are, as illustrated in (2) in FIG. 37B, combined into the cell C1*a* that has units of $1/1000$ degrees, a position key corresponding to this cell C1*a* completely agrees with a search key with $1/1000$ degrees of the above search keys. Accordingly, the mobile device according to the range A1 is searched assuming that the mobile device includes the cell C1*a*.

Though the embodiment of the present disclosure has been described in detail so far, the present disclosure is not restricted to a particular embodiment, and various modifications and changes may be made within the scope of the present disclosure laid forth in the Claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information management method to be executed by a computer, the information management method comprising:

accepting a registration request that includes identification information of a mobile device, and position information of the mobile device that includes latitude and longitude;

generating a value that includes the identification information followed by information that indicates a date and time when the registration request is accepted;

storing the position information in a first storage unit associated with the value as a first key;

generating another value that includes the information that indicates the date and time followed by the identification information;

storing the position information in a second storage unit associated with the other value as a second key;

storing the position information in a third storage unit associated with the identification information as a third key; and storing the identification information in a fourth storage unit associated with the position information as a fourth key;

accepting a search request in which there is specified at least one of latitude to be searched and longitude to be searched, information indicating time, and the identification information;

selecting, by the computer, a search destination from the first storage unit, the second storage unit, the third storage unit, and the fourth storage unit based on the search request; and searching for the search destination based on the search request, wherein the first storage unit is selected as the search destination when the information indicating time, and the identification information are specified in the search request, wherein the second storage unit is selected as the search destination when the information indicating time is specified, and also the identification information is not specified in the search request, wherein the third storage unit is selected as the search destination when the identification information is specified, and also the information indicating time is not specified in the search request, and wherein the fourth storage unit is selected as the search destination when the latitude to be searched and the longitude to be searched are specified in the search request.

2. The information management method according to claim 1, wherein the storing in the fourth storage unit comprises:

generating, for the latitude and longitude included in the registration request, a first character string in which the same digit of each of the latitude and the longitude is alternately arrayed one digit at a time in order from the most significant digit of all of the digits of each of the latitude and the longitude, or in order from the least significant digit to a given significant digit, and storing the identification information in the fourth storage unit associated with the first character string as the forth key, and wherein the searching comprises:

generating, for the latitude to be searched and the longitude to be searched, a second character string in which the same digit of each of the latitude to be searched and the longitude to be searched is alternately arrayed one digit at a time in order from the most significant digit of all of the digits of each of the latitude to be searched and the longitude to be searched, or in order from the least significant digit to a given significant digit, and searching the identification information associated with the forth key that forward-agrees with the second character string, with reference to the fourth storage unit.

3. The information management method according to claim 1, wherein the storing in the fourth storage unit comprises:

generating, for the latitude and longitude included in the registration request, a first character string in which the same digit of each of the latitude and the longitude is alternately arrayed one digit at a time in order from the most significant digit of all of the digits of each of the longitude and latitude, or in order from the least significant digit to a given significant digit, and storing the identification information in the fourth storage unit associated with the first character string as the forth key, and wherein the searching comprises:

generating, for the latitude to be searched and the longitude to be searched, a second character string in which the same digit of each of the latitude to be searched and the longitude to be searched is alternately arrayed one digit at a time in order from the most significant digit of all of the digits of each, or in order from the least significant digit to a given significant digit, generating a third character string in which a portion, which is below a decimal point of the latitude to be searched and the longitude to be searched, is deleted two characters at a time from the tail end of the second character string, and searching for the identification information associated with the forth key that agrees with the third character string, with reference to the fourth storage unit.

4. An information management apparatus comprising:

a processor configured to:

accept a registration request that includes identification information of a mobile device, and position information of the mobile device that includes latitude and longitude, generate a value that includes the identification information followed by information that indicates a date and time when the registration request is accepted, store the position information in a first storage unit associated with the value as a first key, generate another value that includes the information that indicates the date and time followed by the identification information, store the position information in a second storage unit associated with the other value as a second key, store the position information in a third storage unit associated with the identification information as a third key, store the identification information in a fourth storage unit associated with the position information as a fourth key, accept a search request in which there is specified at least any one of latitude to be searched and longitude to be searched, information indicating time, and the identification information, select a search destination from the first storage unit, the second storage unit, the third storage unit, and the fourth storage unit based on the search request, and search for the search destination based on the search request, wherein the first storage unit is selected as the search destination when the information indicating time, and the identification information are specified in the search request, wherein the second storage unit is selected as the search destination when the information indicating time is specified, and also the identification information is not specified in the search request, wherein the third storage unit is selected as the search destination when the identification information is specified, and also the information indicating time is not specified in the search request, and wherein the fourth storage unit is selected as the search destination when the latitude to be searched and the longitude to be searched are specified in the search request.

5. The information management apparatus according to claim 4, wherein the processor is further configured to:

generate, for the latitude and longitude included in the registration request, a first character string in which the same digit of each of the latitude and the longitude is alternately arrayed one digit at a time in order from the most significant digit of all of the digits of each of the latitude and the longitude, or in order from the least significant digit to a given significant digit, and store the identification information in the fourth storage unit associated with the first character string as the forth key, generate, regarding the latitude to be searched and the longitude to be searched, a second character string in which the same digit of each of the latitude to be searched and the longitude to be searched is alternately arrayed one digit at a time in order from the most significant digit of all of the digits of each of the latitude to be searched and the longitude to be searched, or in order from the least significant digit to a given significant digit, and search the identification information associated with the forth key that forward-agrees with the second character string, with reference to the fourth storage unit.

6. The information management apparatus according to claim 4, wherein the processor is further configured to:
generate, for the latitude and longitude included in the registration request, a first character string in which the same digit of each of the latitude and the longitude is alternately arrayed one digit at a time in order from the most significant digit of all of the digits of each of the longitude and latitude, or in order from the least significant digit to a given significant digit, and
store the identification information in the fourth storage unit associated with the first character string as the forth key,
generate, for the latitude to be searched and the longitude to be searched, a second character string in which the same digit of each of the latitude to be searched and the longitude to be searched is alternately arrayed one digit at a time in order from the most significant digit of all of the digits of each, or in order from the least significant digit to a given significant digit,
generate a third character string in which a portion, which is below a decimal point of the latitude to be searched and the longitude to be searched, is deleted two characters at a time from the tail end of the second character string, and
search for the identification information associated with the forth key agreeing with the third character string with reference to the fourth storage unit.

* * * * *